(12) United States Patent
Yamakawa et al.

(10) Patent No.: US 8,153,931 B2
(45) Date of Patent: Apr. 10, 2012

(54) METHOD OF AND SYSTEM FOR SETTING LASER PROCESSING CONDITIONS, LASER PROCESSING SYSTEM, COMPUTER PROGRAM FOR SETTING LASER PROCESSING CONDITIONS, COMPUTER READABLE MEDIA AND RECORDING DEVICE ON WHICH LASER PROCESSING CONDITIONS ARE RECORDED

(75) Inventors: Hideki Yamakawa, Osaka-fu (JP); Koji Yoshimoto, Osaka-fu (JP)

(73) Assignee: Keyence Corporation, Osaka (JP)

( * ) Notice: Subject to any disclaimer, the term of this patent is extended or adjusted under 35 U.S.C. 154(b) by 577 days.

(21) Appl. No.: 11/770,104

(22) Filed: Jun. 28, 2007

(65) Prior Publication Data

US 2008/0017619 A1 Jan. 24, 2008

(30) Foreign Application Priority Data

Jun. 30, 2006 (JP) ................................ 2006-182839

(51) Int. Cl.
*B23K 26/04* (2006.01)
(52) U.S. Cl. ................................ 219/121.81
(58) Field of Classification Search ............. 219/121.83, 219/121.62, 121.68, 121.8
See application file for complete search history.

(56) References Cited

U.S. PATENT DOCUMENTS

| | | | |
|---|---|---|---|
| 4,864,112 A | 9/1989 | Imai et al. | |
| 4,978,202 A | 12/1990 | Yang | |
| 5,001,718 A | 3/1991 | Burrows et al. | |
| 5,067,086 A | 11/1991 | Yamazaki et al. | |
| 5,646,765 A | 7/1997 | Laakmann et al. | |
| 5,660,747 A | 8/1997 | Drouillard et al. | |
| 5,864,114 A * | 1/1999 | Fukuda | 219/121.83 |
| 5,897,797 A | 4/1999 | Drouillard et al. | |
| 6,043,452 A | 3/2000 | Bestenlehrer | |
| 6,180,914 B1 * | 1/2001 | Jones et al. | 219/121.68 |
| 6,210,401 B1 * | 4/2001 | Lai | 606/12 |

(Continued)

FOREIGN PATENT DOCUMENTS

JP 62263889 11/1987

(Continued)

OTHER PUBLICATIONS

Office Action issued by the U.S. Patent and Trademark Office in corresponding U.S. Appl. No. 11/585,356 dated Sep. 25, 2008 (14 pages).

(Continued)

*Primary Examiner* — Henry Yuen
*Assistant Examiner* — Thien S Tran
(74) *Attorney, Agent, or Firm* — Kilyk & Bowersox, P.L.L.C.

(57) ABSTRACT

A method of setting processing data for a computer-assisted laser processing apparatus is disclosed, along with a system for setting a laser processing data. The method comprises a function of setting a profile of a three-dimensional object and a processing pattern, a function of generating processing data representing the processing condition, a function of visually displaying representation of the processing data on a display and a function of detecting an defective area of the object surface that is processable but defectively with the laser beam under the printing conditions by making a calculation based on the object profile and an incident angle of the laser beam incident upon the object surface and hiding a processing pattern from the display means when the processing pattern cuts across the defective area.

39 Claims, 57 Drawing Sheets

U.S. PATENT DOCUMENTS

| | | | |
|---|---|---|---|
| 6,344,625 B1 * | 2/2002 | Kim et al. | 219/121.62 |
| 6,438,445 B1 | 8/2002 | Yoshida et al. | |
| 6,469,729 B1 | 10/2002 | Ryan | |
| 6,483,071 B1 | 11/2002 | Hunter et al. | |
| 6,552,300 B1 | 4/2003 | Kerner | |
| 6,594,926 B1 | 7/2003 | Wujciga | |
| 6,617,544 B1 | 9/2003 | Tsukamoto et al. | |
| 6,888,542 B1 * | 5/2005 | Clauss | 345/420 |
| 7,069,108 B2 | 6/2006 | Saarela et al. | |
| 7,380,717 B2 | 6/2008 | Lubow | |
| 7,705,870 B2 | 4/2010 | Sato | |
| 2001/0031960 A1 | 10/2001 | Kliewer et al. | |
| 2001/0044668 A1 | 11/2001 | Kimbrough et al. | |
| 2003/0057609 A1 | 3/2003 | Ratcliffe | |
| 2005/0049500 A1 | 3/2005 | Babu et al. | |
| 2005/0205781 A1 * | 9/2005 | Kimba | 250/311 |
| 2006/0066877 A1 | 3/2006 | Benzano | |
| 2006/0089747 A1 | 4/2006 | Sakai | |
| 2006/0118733 A1 | 6/2006 | Kiyohara et al. | |
| 2006/0180582 A1 * | 8/2006 | Andreasch et al. | 219/121.83 |
| 2006/0228525 A1 | 10/2006 | Dakowski | |
| 2007/0086822 A1 * | 4/2007 | Sato | 400/129 |
| 2007/0100492 A1 | 5/2007 | Idaka et al. | |
| 2007/0252006 A1 | 11/2007 | Heck et al. | |
| 2008/0011854 A1 | 1/2008 | Idaka | |
| 2008/0023455 A1 | 1/2008 | Idaka et al. | |
| 2008/0067251 A1 | 3/2008 | Yoshimoto et al. | |

FOREIGN PATENT DOCUMENTS

| | | |
|---|---|---|
| JP | 02198412 | 8/1990 |
| JP | 03-264176 | 11/1991 |
| JP | 11028586 | 2/1999 |
| JP | 2000-202655 | 7/2000 |
| JP | 2001-067108 | 3/2001 |
| JP | 2002-268718 | 9/2002 |
| JP | 2003136260 | 5/2003 |
| JP | 2003-311450 | 11/2003 |
| JP | 2004-042119 | 2/2004 |
| JP | 2004-114112 | 4/2004 |
| JP | 2004-230443 | 8/2004 |
| JP | 2005175566 A | 6/2005 |
| JP | 2006007257 A | 1/2006 |
| WO | 2005046926 A1 | 5/2005 |
| WO | 2006061959 A1 | 6/2006 |

OTHER PUBLICATIONS

Office Action issued by the U.S. Patent and Trademark Office in corresponding U.S. Appl. No. 11/585,356 dated Jun. 8, 2009 (15 pages).

Office Action issued by the U.S. Patent and Trademark Office in corresponding U.S. Appl. No. 11/585,356 dated Mar. 16, 2010 (18 pages).

Office Action issued by the U.S. Patent and Trademark Office in corresponding U.S. Appl. No. 11/769,131 dated Nov. 13, 2009 (14 pages).

Office Action issued by the U.S. Patent and Trademark Office in corresponding U.S. Appl. No. 11/769,131 dated Jun. 3, 2010 (10 pages).

Office Action issued by the U.S. Patent and Trademark Office in corresponding U.S. Appl. No. 11/855,448 dated Jun. 23, 2009 (16 pages).

Office Action issued by the U.S. Patent and Trademark Office in corresponding U.S. Appl. No. 11/855,448 dated Mar. 10, 2010 (15 pages).

Office Action issued by the U.S. Patent and Trademark Office in corresponding U.S. Appl. No. 11/585,356 dated Nov. 9, 2010 (22 pages).

Office Action issued by the U.S. Patent and Trademark Office in corresponding U.S. Appl. No. 11/828,505 dated Feb. 7, 2011 (15 pages).

* cited by examiner

Fig. 26A  Fig. 26B  Fig. 26C
 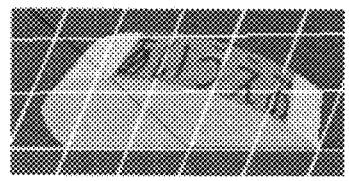 
Fig. 27
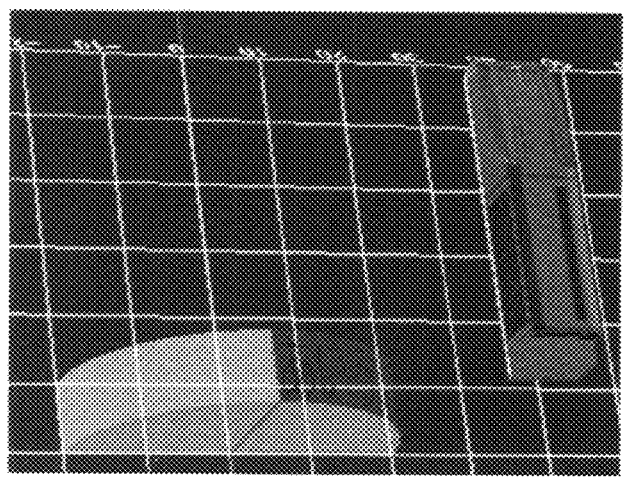

(a)  (b)

(c)  (d)

METHOD OF AND SYSTEM FOR SETTING LASER PROCESSING CONDITIONS, LASER PROCESSING SYSTEM, COMPUTER PROGRAM FOR SETTING LASER PROCESSING CONDITIONS, COMPUTER READABLE MEDIA AND RECORDING DEVICE ON WHICH LASER PROCESSING CONDITIONS ARE RECORDED

BACKGROUND OF THE INVENTION

1. Field of the Invention

The present invention relates to a method and a system for setting processing conditions of a laser processing system, such as a laser marker, which performs processing such as printing or marking including characters, symbols and graphics on a work surface with a laser beam, a computer program for setting processing conditions for a laser processing system, a computer-readable recording media or device on which laser processing conditions are recorded.

2. Description of Related Art

A laser processing system scans a given scan field of a subject surface of works (work surfaces) such as components and finished products with a laser beam to apply processing, such as printing and marking of characters, symbols and/or graphics, to the work surfaces. Referring to FIGS. 1 and 2 for the purpose of providing a brief description of a configuration of a laser processing system by way of example, the laser processing system comprises a laser control unit 1, a laser output unit 2 and an input unit 3. Excitation light generated by a laser excitation device 6 of the laser control unit 1 excites a laser media 8 of a laser oscillator 50 of the laser output unit 2. A laser beam L emanating from the laser media 8 is expanded in beam diameter by a beam expander 53 and directed toward a scanning head 9. The scanning head 9 deflects the laser beam L so as to scan a work W in a given scan field, thereby processing, by marking or printing, the work W.

There has been known a laser processing system which is provided with a two dimensional scanning device 9 as shown in FIG. 2. The scanning device 9 comprises a pair of galvanic mirrors that form an X-axis scanner 14a and a Y-axis scanner 14b, and a pair of galvanic motors 51a and 51b to which the galvanic mirrors are mounted for rotation. The X-axis scanner 14a and the Y-axis scanner 14b are arranged so that their axes of rotation perpendicularly intersect with each other and deflect an incoming laser beam so as to scan a scan field in X and Y directions perpendicularly intersecting with each other. The scanning device 9 is provided with focusing means such as an fθ lens system for focusing the laser beam in a given scan field.

There has been known a laser processing system which is provided with a three-dimensional scanning device 14 as shown in FIG. 3. The scanning device 14 comprises a Z-axis scanner comprising a lens system capable of varying its focal length which is referred to as a working distance to a given scan field.

However, since the three-dimensional laser processing system is used for processing three-dimensional works, it is essential to specify a processing pattern such as a character string in three dimensions. A laser processing condition setting program designed to process three-dimensional works requires specifying a processing pattern in three dimensions. On the other hand, three-dimensional works are difficult to be processed in three dimensions according to relative positions between the works and a laser output head of the laser processing system. For example, in the case where it is intended to print a print pattern thoroughly on a top surface of a work W in the shape of a frustum of pyramid on which a rectangular solid WR is put as shown in FIG. 84, when printing the work W with a laser beam L thrown obliquely from above the work W, an area in the shadow of the rectangular solid WR is unexposed to the laser beam and is unprintable consequently. Nevertheless, if going ahead with printing, a print pattern cuts across partly the rectangular solid WR. Even if the laser beam is not cut across by the rectangular solid WR when it is intended to print a print pattern on an inclined side surface of the work W as shown in FIG. 85, an angle of the laser beam L incident upon the side surface may be too small, and, consequently, it is difficult to print a print pattern on the side surface as desired. As shown in an enlarged form, as an incident angle θ of the laser beam L (which is referred to as an angle with a normal line L of the side surface) gets closer to 90°, it becomes difficult to print the side surface with acceptable precision. A critical incident angle or higher limit angle (processing limitation angle) is usually 60°.

Furthermore, a problem encountered by the three-dimensional processing system is that an operative speed of one of three scanners (X, Y and Z scanners) fails to follow up operative speeds of the other two. In an example shown in FIG. 86, since an inclined end surface of the work W has a Z-axis component that is greater than a X-axis component, the Z-axis scanner has a momentum greater than the X-axis scanner. However, since, in general, the Z-axis scanner has a scan speed smaller than the X-axis scanner, the Z-axis scanner is difficult to operate following up the X-axis scanner, so that the laser beam defocuses and, in consequence, forms an elliptical spot in a given scan field. This results in imprecise printing.

As just described above, for various reasons, the three-dimensional laser processing system provides room for an occurrence of a disabling area (in which processing is impossible) and/or a defective processing area (in which processing is possible but defectively) on a work surface. The conventional laser processing system has neither means for detecting of processing defects such as partially chipped print and too light print nor means for detecting a possible occurrence of processing defects. Therefore, the conventional laser processing system relies on the user to ensure that that printing is carried out in a laser beam exposable area and laser beam processable area. Accordingly, if the user has carried out printing without catching on that the settings that the user specified contain a disabling area, the printing causes printing defects such as shear in printing, dull printing, printing in wrong position and the like. Such a printing failure should be avoided in printing of essential indications such as product quality verification, a statement of product liability, a best-before period of food and drinks and the like. Works with printing defects should be disposed. In the case of a laser marking system, since a pattern printing process is often a final stage of a production line, works having printing defects are wasted and are a source of economical loss.

Another problem in avoiding the occurrence of printing defects where the user has to repeat an evaluation as to whether an actually printed pattern is acceptable or not and, if not, he has to adjust settings such as, for example, a printing position. Then, the user tries to print out with the altered settings until a desired result is obtained. This is quite troublesome and a task takes user time and effort.

It is conceivable to use a laser processing condition setting program that confirms, before execution of printing, whether a printing position that the user specified is appropriate or not. An alteration of settings will be performed as described below. After specifying a work and a print pattern, the laser processing condition setting program transfers laser processing data representing the settings to a controller so as thereby to alter a previous content of printing. Subsequently, the controller expands the laser processing data and executes checking on whether a print pattern falls exactly within a printable work surface area for acceptable print. If the print pattern is unprintable, then, the user is informed about the fact by a warning. However, although this approach provides convenient means allowing the user to alter the settings when the settings are improper, it needs to transfer processing data to the controller once and then to expand it. This wastes time in data processing.

SUMMARY OF THE INVENTION

It is therefore an object of the present invention to provide a method of and a laser processing condition setting system, and a laser processing system which enables one to check up on whether settings are properly specified to let a processing pattern fall within a processable area of a work.

It is therefore another object of the present invention to provide a computer program executing the laser processing condition setting method.

It is a further object of the present invention to provide a computer-readable recording media or device on which a laser processing condition setting sequence is written.

The foregoing and other objects and features of the present invention are accomplished by a laser processing system for processing a work surface within a working area with a predetermined processing pattern by the use of a laser beam. The laser processing system comprises laser generating means for generating a laser beam, scanning means for scanning a work surface with the laser beam within a scanning area, control means for controlling the laser generating means and the scanning means so as to apply the laser processing to the work surface according to laser processing conditions, processing condition setting means for setting the laser processing conditions by specifying a three-dimensional profile of the work surface and a processing pattern, data generating means for generating laser processing data for the work surface according to the laser processing conditions, display means for displaying a representation of the laser processing data in three dimensions, a defective area detection device or unit for detecting a defective work surface area of the work surface that is only defectively processable with the laser beam under the printing conditions by making a calculation based on the three-dimensional profile of the work surface and an angle at which the laser beam is expected to impinge onto the work surface, and a warning unit or device for displaying the processing pattern on the display means at an instant of specifying the processing pattern by the processing condition setting means, and providing a warning on the display means when the defective work surface area cuts across partly or entirely the defective work surface area.

According to another aspect of the present invention, the laser processing system comprises laser generating means for generating a laser beam, scanning means for scanning a work surface with the laser beam within a scanning area, control means for controlling the laser generating means and the scanning means so as to apply the laser processing to the work surface according to laser processing conditions, processing condition setting means for setting the laser processing conditions by specifying a three-dimensional profile of the work surface and a processing pattern, data generating means for generating laser processing data for the work surface according to the laser processing conditions, display means for displaying a representation of the laser processing data in three dimensions, a defective area detection device or unit for detecting a defective work surface area of the work surface that is hard to be processed with the laser beam under the printing conditions by making a calculation based on the three-dimensional profile of the work surface and an angle at which the laser beam is expected to impinge onto the work surface, and a warning unit or device for displaying the processing pattern specified by the processing condition setting means on the display means, and providing a warning on the display means when the defective work surface area cuts across at least part of the work surface area.

According to another aspect of the present invention, the laser processing system comprises laser generating means for generating a laser beam, scanning means for scanning a work surface with the laser beam within a scanning area, control means for controlling the a laser generating means and the scanning means so as to apply the laser processing to the work surface according to laser processing conditions, laser processing condition setting means for setting the laser processing conditions by specifying a three-dimensional profile of the work surface and a processing pattern, data generating means for generating laser processing data for the work surface according to the laser processing conditions, display means for displaying a representation of the laser processing data in three dimensions, a defective area detection device or unit for detecting an unprocessable work surface area of the work surface that fails to be processed with said laser beam under the printing conditions and a defective work surface area of the work surface that is only defectively processable, with the laser beam under the printing conditions by making a calculation based on the three-dimensional profile of the work surface and an angle at which the laser beam is expected to impinge onto the work surface, a warning device or unit for displaying the processing pattern specified by the laser processing condition setting means on the display means when the processing pattern is thoroughly outside the unprocessable work surface area and hiding the processing pattern from the display means when the processing pattern cuts across at least part of the unprocessable work surface area, and a highlighting device or unit to display and highlight the defective work surface area on the display means distinctly from the processable work surface area.

The scanning means is preferred to comprise a beam expander having a lens system which includes at least two lenses which are coaxially disposed at an incident side and an exit side, respectively, for varying a focal length of the laser beam by varying a relative distance between the two lenses, a first scan mirror for deflecting the laser beam coming from the beam expander in a first direction to scan the work surface within the scanning area in the first direction, and a second scan mirror for deflecting the laser beam reflected by the first scan mirror in a second direction perpendicular to the first direction to scan the work surface within the scanning area in the second direction and is characterized in that the first scan mirror, the second scan mirror and the beam expander scan the work surface within the scanning area in the first direction in the X-, Y- and Z-axis directions, respectively.

The warning device may display a frame in place of the processing pattern on the display means, or otherwise, may display the processing pattern in the frame on the display means. The unprocessable work surface area includes a work surface area hidden from laser beam irradiation.

According to another aspect of the present invention, a laser processing data setting system for setting laser processing data according to a processing pattern based on which a laser processing system processes a work surface within a working area with the processing pattern by use of a laser beam, the laser processing data setting system comprises laser processing condition setting means for setting the laser processing conditions by specifying a three-dimensional profile of the work surface and a processing pattern, data generating means for generating laser processing data for the work surface according to the laser processing conditions, display means for displaying a representation of the laser processing data in three dimensions, a defective area detection device or unit for detecting a defective work surface area of the work surface that is unprocessable with the laser beam under the printing conditions by making a calculation based on the three-dimensional profile of the work surface and an angle at which the laser beam is expected to impinge onto the work surface, and a warning device or unit for hiding the processing pattern from the display means when the processing pattern cuts across at least part of the unprocessable work surface area.

According to another aspect of the present invention, a method of setting laser processing data according to a processing pattern based on which a laser processing system processes a work surface within a working area with the processing pattern by use of a laser beam, the laser processing data setting method comprises the steps of setting laser processing conditions by specifying a three-dimensional profile of the work surface and the processing pattern, displaying the processing pattern on the display means, detecting an unprocessable work surface area of the work surface that is unprocessable with the laser beam under the printing conditions by making a calculation based on the three-dimensional profile of the work surface and an angle at which the laser beam is expected to impinge onto the work surface, and hiding the processing pattern from the display means when the processing pattern cuts across at least part of the unprocessable work surface area.

According to still another aspect of the present invention, a computer program for setting laser processing data according to a processing pattern based on which a laser processing system processes a work surface within a working area with the processing pattern by use of a laser beam comprises a function of setting laser processing conditions by specifying a three-dimensional profile of the work surface and the processing pattern, a function of displaying the processing pattern on display means, and a function of detecting an unprocessable work surface area of the work surface that is unprocessable with the laser beam under the printing conditions by making a calculation based on the three-dimensional profile of the work surface and an angle at which the laser beam is expected to impinge onto the work surface and hiding the processing pattern from the display means when the processing pattern cuts across at least partly the unprocessable work surface area.

According to a further aspect of the present invention, a computer-readable storage media or a storage device carries a computer program as set forth above and stored thereon. The computer-readable storage media includes magnetic disks such as CD-ROM, CD-R, CD-RW, a flexible disk, a magnetic tape, DVD-ROM, DVD-RAM, DVD-R, DVD+R, DVD-RW, DVD+RW, BLU-RAY (trade name), FD and DVD; optical disks, magnetic optical disks, semiconductor memories and other media capable of storing a computer program. The program includes a program that is downloaded through network communications such as an internet, as well as a program stored on the storage media. The storage media includes dedicated or multipurpose equipments in which the computer program is mounted in a viable state in the form of software or firmware. Processing and functions of the computer program may be executed by program software which a computer executes. The functions may further be realized by hardware such as a predetermined gate array such as FPGA and ASIC or in the mixed form of program software and a partial hardware module that realizes hardware partially.

According to the present invention, in the course of setting processing conditions, it is possible to check up on whether a processing pattern falls exactly within a processable work area or not with ease.

BRIEF DESCRIPTION OF THE DRAWINGS

The foregoing and other objects and features of the present invention will be clearly understood from the following detailed description when reading with reference to the accompanying drawings wherein same or similar parts or mechanisms are denoted by the same reference numerals throughout the drawings and in which:

FIGS. 26A, 26B and 26C are photographic illustrations showing initial print positions for columnar, conical and spherical elemental profiles, respectively;

FIG. 27 is a photographic illustration showing a default initial position of a print block;

DETAILED DESCRIPTION OF THE PREFERRED EMBODIMENTS

Figure 1:
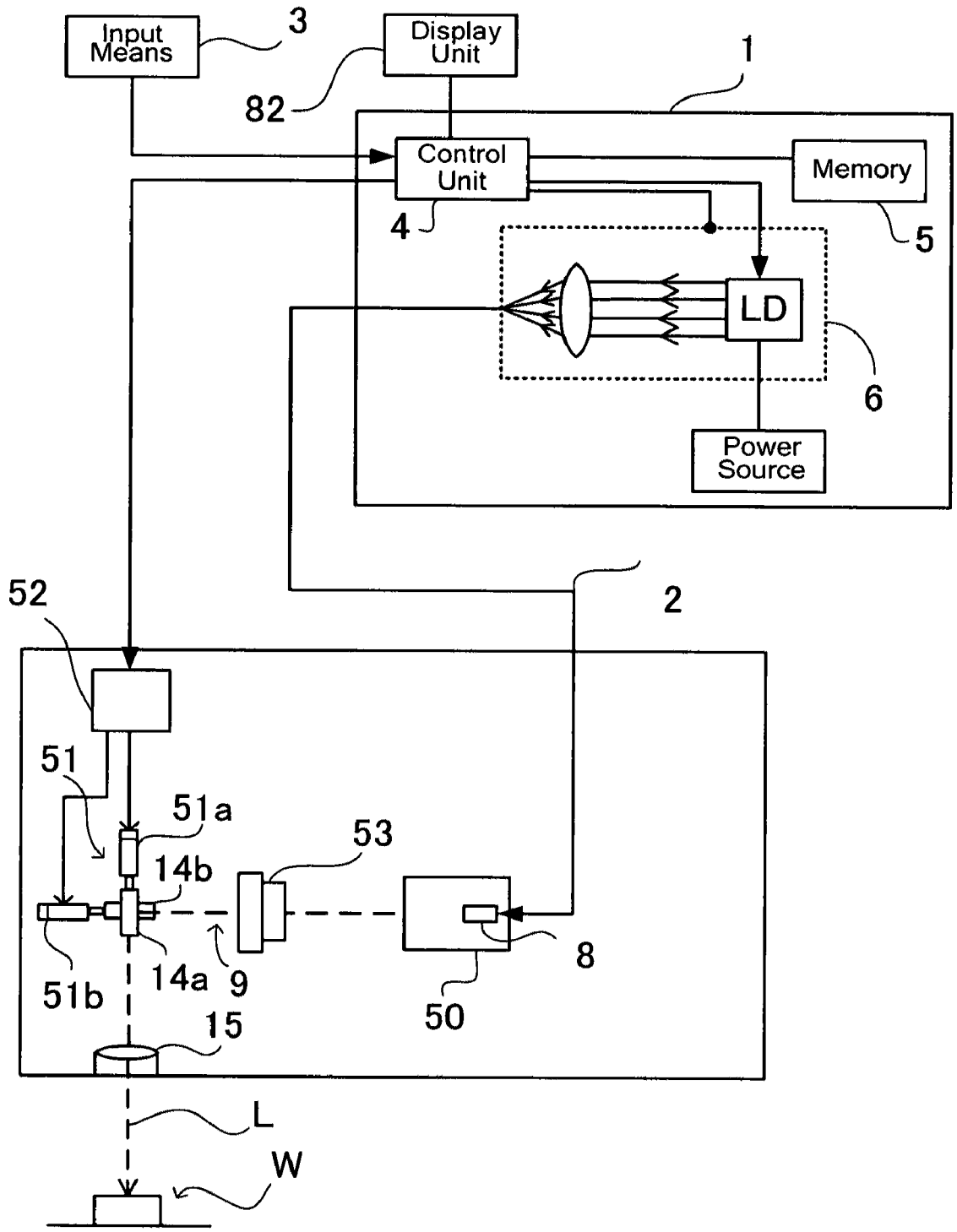
FIG. 1 is a block diagram schematically illustrating a laser processing system according to an embodiment of the present invention.

Hereinafter, embodiments of the present invention will be concretely described with reference to the accompanying drawings. The following description is directed to a method of and a system for setting processing conditions of a laser processing system, such as a laser marker, which performs processing, such as printing or marking including characters, symbols and graphics on a work with a laser beam, a computer program for setting processing conditions for a laser processing system, a computer-readable recording media or device on which laser processing conditions are recorded. Nevertheless, it should be appreciated that the present invention has broader applications and is not limited to these particular embodiments.

Further, in the following description, various changes and modifications may be made in form, size, relative arrangement of constituent components and means of the described system and apparatus unless otherwise specified distinctively. It is intended that all matter contained in the description and as shown in the accompanying drawings shall be interpreted as illustrative and not in a limiting sense unless otherwise specified distinctively. The same or similar components or means of the described system and apparatus in the accompanying drawings are referred by the same names and denoted by the same or similar reference numerals. Some components and means of the described system and apparatus are illustrated with exaggeration for clear understanding in the accompanying drawings. Further, some components and means of the described system and apparatus may be formed in the form of an integral part, or vice versa.

In the following description, "connection" of the laser processing system to a computer, a printer, external memory devices, and other peripheral equipments which are used for operating, controlling, inputting and outputting information or data to and displaying information or data on the laser processing apparatus is made by means of electrical communication through a wired connection, such as serial connection, parallel connection or a network. Examples of the serial connection include IEEE1394, RS-232x, RS-422, RS-423, RS-485, USB, PS2, and the like. Examples of the network includes 10BASE-T, 100BASE-TX, 1000BASE-T, and the like. The connection is not limited to wired connection and may be a wireless connection, including a wireless LAN such as IEEE802, 1x and OFDM, and radio frequency communication, infrared communication or optical communication such as BLUETOOTH (trademark). The memory device for storing data of an object and settings of the system or apparatus may be any processor-readable media, including, but not limited to, a memory card, a magnetic disk, an optical disk, a magnetic optical disk, a semiconductor memory, etc. and any combination of two or more of the foregoing.

Although a laser marker is exemplified as a typical laser processing system, nevertheless, embodiments of the present invention are suitable for use on all types of laser-assisted processing systems or apparatus including laser oscillators, laser processing devices for boring, marking, trimming, scribing, surface finishing, light source devices such as a light source for read and write of high-density optical disk such as DVD and BLU-RAY (trademark), a light source for a laser printer, an illumination light source, a light source for a display equipment, and various medical equipments. Further, in the following embodiment, the laser marker is described as used for printing. However, the present invention is suitable for use on all types of laser-assisted processing, including fusion or exfoliation of a subject surface, surface oxidization, surface shaving, discoloring, and the like.

As utilized hereinafter, the term "printing" shall mean and refer to printing or marking of characters, symbols and graphics, besides any processing described above.

The term "processing pattern" or "print pattern" as used herein shall mean and refer to various characters or letters, numerical characters, graphics, signs, pictorial symbols, icons, logos, barcodes, two-dimensional codes, or combinations of two or more of them. In particular, the term "character" and "symbol" as used herein shall mean and refer to optically readable characters and symbols. Examples of the two-dimensional code, stack type or matrix type, include a QR code, a micro QR code, a data matrix or data code, a Veri code, an Aztec code, PDF417, a Maxi code, a composite code, an RSS (Reduced Space Symbology) code such as RSS14, RSS Stacked, RSS Limited, RSS Expanded, etc. The composite code, which is a composition of a bar code and a stack type two dimensional code, may be of any type having EAN/UPC (WAN-13, EAN-8, UPC-A, UPC-E), EAN/UPC128 or a RS S family (RSS14, RSS Limited, RSS Expanded) as a base barcode. As additional code may be one of two dimensional symbols, including MicroPDF417 and PDF417. In the following example, a combination of a barcode and a micro QR code which is a two dimensional matrix code is employed.

Referring to the accompanying drawings in detail, and in particular, to FIG. 1 showing a laser processing system 100 in accordance with an embodiment of the present invention, the laser processing system 100 comprises a laser control unit 1, a laser output unit 2 and an input unit 3. The input unit 3 is connected to the laser control unit 1. Information necessary to set job control data of the laser output unit 2 is entered via input unit 3 and sent to the laser control unit 1. The setting information includes operating conditions of the laser output unit 2, marking job information such as a print pattern to be printed on a work surface and the like. The input unit 3 is a console including a keyboard and a mouse. In order to check up on settings, a display unit 82 such as an LCD device or a CRT may be provided to display the setting information entered through the input unit 3 for checking. A touch panel is available for a terminal device serving both as an input device and a display.

The laser control unit 1 comprises at least a controller 4, a memory device 5, a laser excitation unit 6 and a power source 7. The data of settings are inputted via the input unit 3, sent to the controller 4, and are stored in a data storage media of the memory device 5. The controller 4 reads out data representing the settings from the data storage media of the memory device 5 as needed to drive the laser excitation unit 6 for excitation of a laser media 8, such as a laser rod, of the laser output unit 2 according to control signals representing a processing pattern such as a mark or a text to be printed. The data storage media may be a built-in type memory, preferably a semiconductor memory such as RAM or ROM. The storage media may be of a removable type such as a semiconductor memory card including a PC card and a SD card or a memory card including a hard disc. When the memory device 5 comprises a memory card which can be easily rewritten by external equipment, such as a computer, data setting is performed without connecting the input unit 3 to the control unit 1 by writing the contents set by a computer in the memory card and placing the memory card in the control unit 1. The laser processing system 100 is quite easily configured with the memory card placed in the memory device 5 without keying in data for the desired job control through the input unit 3. Write or rewrite of data in the memory card can be easily carried out by the use of an external equipment such as a computer. Typically, a semiconductor memory is employed because of high data read/write rate, vibration-proof structure and prevention of data disappearance due to a crash.

The controller 4 provides scan signals for driving a scanner 9 of the laser output unit 2 through a laser excitation device 6 so as to scan a work surface with a laser beam L. Specifically, the power source 7, which is a constant voltage power source, supplies a specified constant voltage to the laser excitation device 6. The scan signals for controlling a marking or print job of the laser output unit 2 comprise pulse width modulation (PWM) signals corresponding to pulse widths of the laser beam. In this instance, the intensity of the laser beam depends on a duty ratio, or on both a frequency and a scanning rate, according to a frequency of the PWM.

Figure 4:
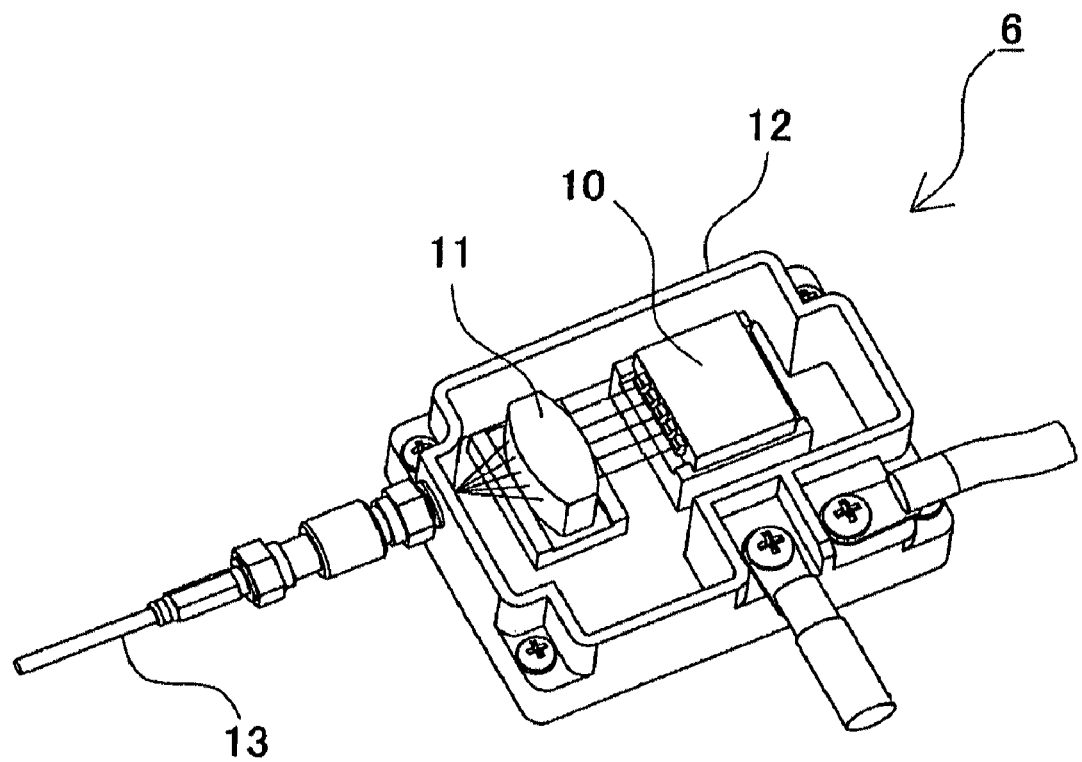
FIG. 4 is a perspective view showing an internal arrangement of a laser excitation unit.

As specifically shown in FIG. 4 by way of example, the laser excitation device 6 comprises a laser excitation light source 10, such as a semiconductor laser or a lamp, and a focusing lens system (schematically depicted by a single lens) 11 fixedly installed in a casing 12. This casing 12, which is made of a metal having good thermal conduction such as brass, effectively releases heat generated by the laser excitation light source 10. The laser excitation light source 10 comprises a laser diode array made up of a plurality of laser diodes 10a arranged in a straight row. Laser beams emanating from the respective laser diodes 10a are focused on an incident end of an optical fiber cable 13 by the focusing lens system 11 and exits as an excitation beam from the optical fiber cable 13. The optical fiber cable 13 is optically connected to the laser media 8 directly or through a coupling fiber rod (not shown).

The laser output unit 2 includes a laser oscillator schematically shown by a reference numeral 50 for exciting the laser media 8 and causing it to oscillate to generate a laser beam L in what is called an end-pumping excitation method, a scanner 9 for scanning a work surface area in three dimensions which will be described in detail in connection with FIGS. 5 to 7 later, and a drive circuit 52 for driving the scanner 9. The scanner 9 comprises X, Y and Z-axis scanners 14a, 14b and 14c which is built in a beam expander 53 and an fθ lens (not shown). The laser oscillator 50 comprises, in addition to the laser media 8, an output mirror and a total reflection mirror oppositely disposed at a specified distance, an aperture disposed between these mirrors and a Q-switching cell, all of which are arranged in a given path of an induced emission light. The induced emission light from the laser media 8 is amplified by multiple reflections between the output mirror and the total reflection mirror, switched at a short cycle, selected in mode by the aperture, and then exits as a laser beam L from the laser oscillator 50 through the output mirror. The laser oscillator 50 is known in various forms and may take any form well known in the art. The laser media 8 used in this embodiment is an Nd:YVO$_4$ solid state laser rod which has absorption spectra whose central wavelength is 809 nm. In order to excite the Nd—YVO$_4$ solid state laser rod, the laser diodes 10a are adjusted to emit a laser beam at a wavelength of 809 nm. Solid state laser medias available for the laser media 8 include a rare earth-doped YAG, LiSrF, LiCaF, YLF, NAB, KNP, LNP, NYAB, NPP, GGG and the like. It is practicable to convert a wavelength of the laser beam from the solid state laser media by the use of a wavelength conversion element in combination with the solid state laser media. A fiber laser in which a fiber is employed for the laser media in place of a bulk may be applied also. Further, the laser media 8 is not restricted to a solid state laser media and it is practicable to use a gas laser, such as a carbon dioxide gas laser. It is also practicable to exclude the laser media 8 by the use of a wavelength conversion element for converting a wavelength of the laser diode 10a of the laser excitation light source 10. Available examples of the wavelength conversion element include KTP (KTiPO$_4$); organic non-linear optical medias and inorganic non-linear optical medias such as KN (KNbO$_3$), KAP (KASpO$_4$), BBO and LBO; and bulk type polarizing-inverting elements such as LiNbO$_3$, PPLN (Periodically Polled Lithium Niobate), LiTaO$_3$ and the like. Further, it is allowed to use a laser excitation semiconductor laser of an up-conversion type using a fluoride fiber doped with a rare earth, such as Ho, Er, Tm, Sm, Nd, and the like.

Figure 5:
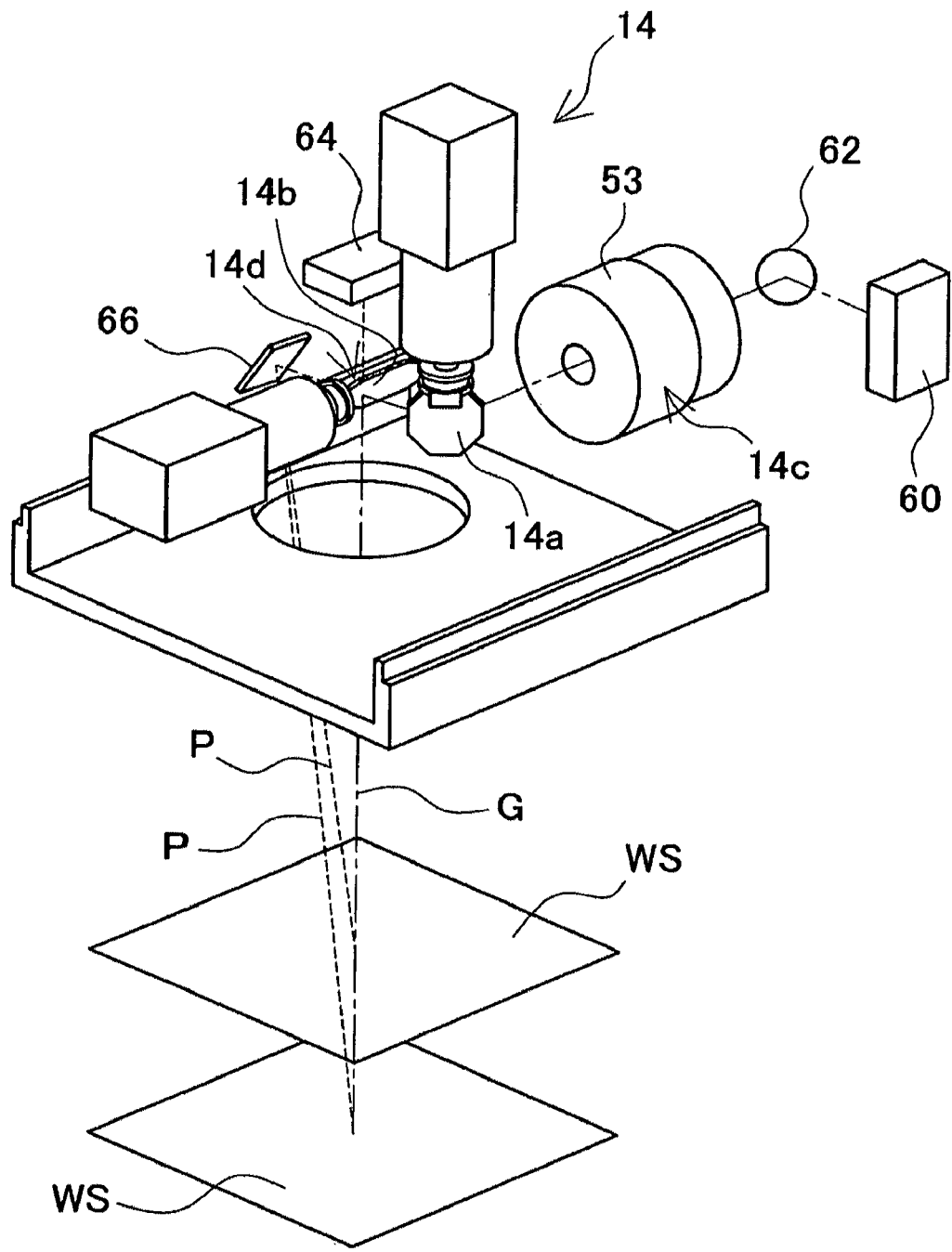
FIG. 5 is a perspective view of a marking head including the laser beam scanner of a laser marking system according to an embodiment.
Figure 6:
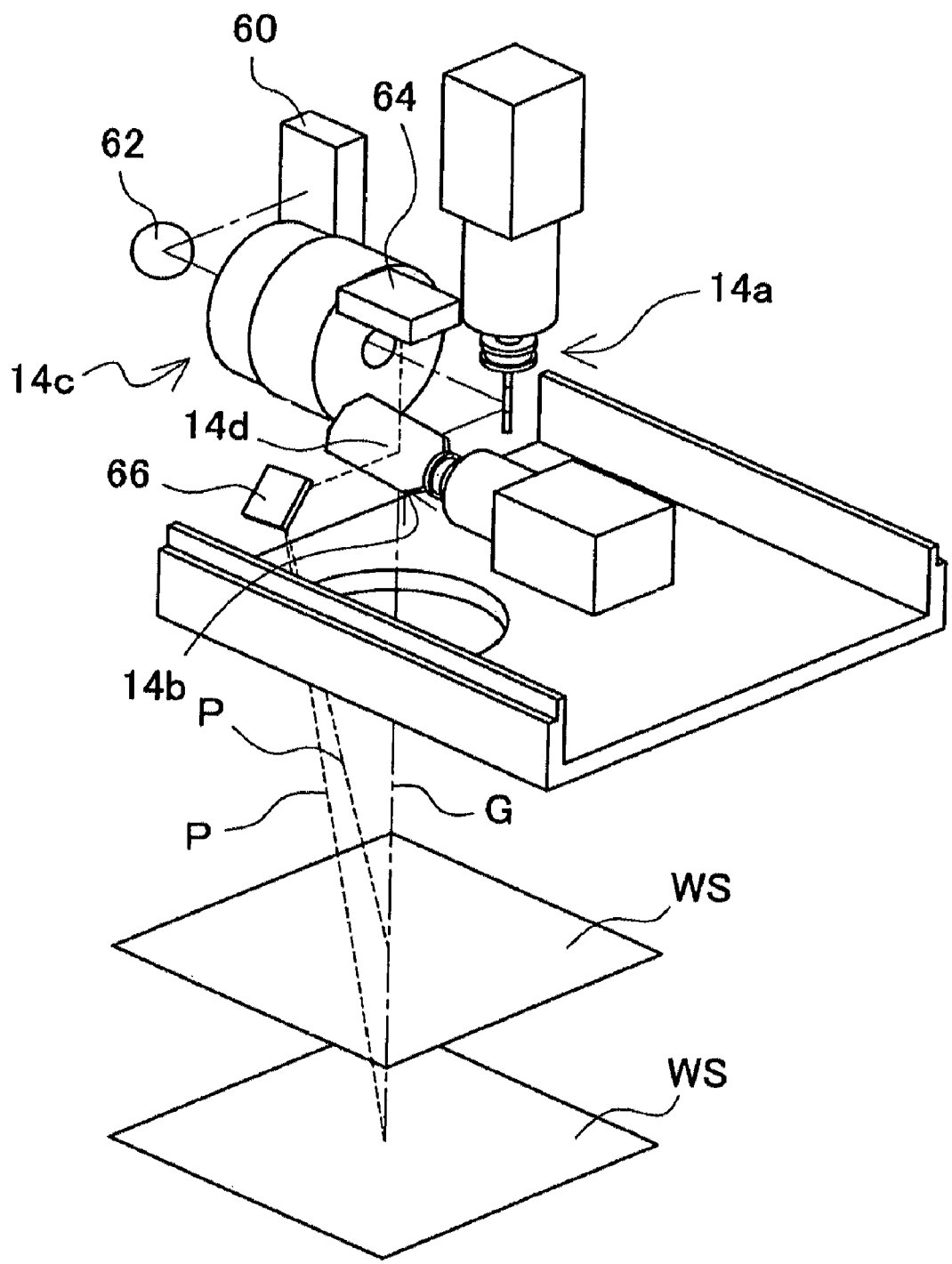
FIG. 6 is a perspective rear view of the marking head.
Figure 7:
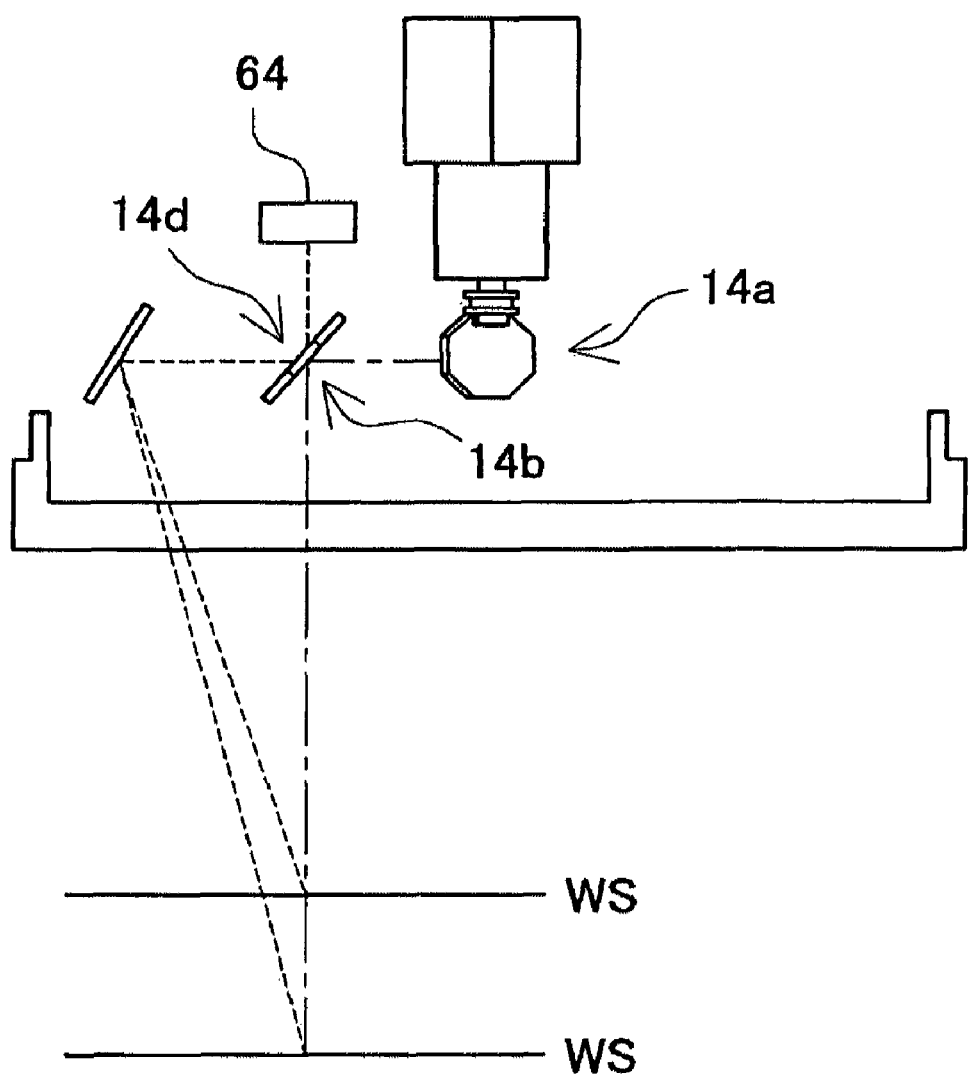
FIG. 7 is a side view of the marking head.
Figure 8:
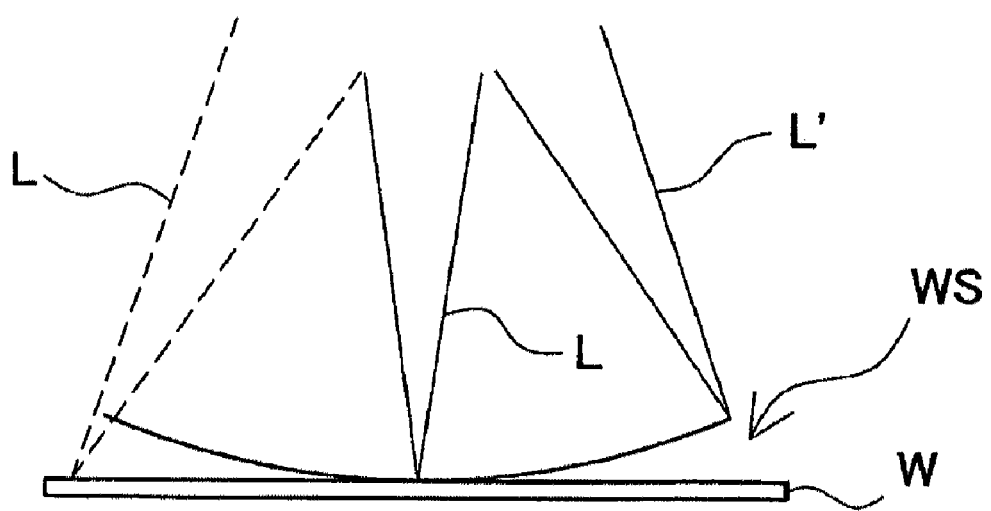
FIG. 8 is an photographic illustration showing a focal track of a laser beam with respect to a work surface.

Referring to FIGS. 5 to 7, the laser scanner 14 comprises an X-axis scanner 14a, a Y-axis scanner 14b, and a Z-axis scanner 14c built in a beam expander 53. The beam expander 53 has an optical axis coaxial with the laser beam L emanating from the laser media 8. The X-axis scanner 14c and the Y-axis scanner 14b have scanning directions perpendicular to each other. The Z-axis scanner 14c has a scanning direction perpendicular to both scanning directions of the X-axis scanner 14c and the Y-axis scanner 14b. The X-axis scanner 14c and the Y-axis scanner 14b scan a work surface area WS in two dimensions with the laser beam L emanating from the laser media 8. The Z-axis scanner 14c scans the work surface area WS in an axial direction with the laser beam L by changing a focal distance of the laser beam L through the beam expander 53. In FIGS. 5 through 7, an fθ lens, which is a focusing lens system, is not shown. Because the laser processing system focuses a laser beam on a working plane by the use of the second mirror, i.e. the Y-axis scanner, it is usual to dispose an fθ lens between the second mirror and the working plane so as thereby to make Z-directional correction. Specifically, the fθ lens focuses the laser beam always onto a plane work surface Was shown in FIG. 8. In the case where a laser marker is required to focus a laser beam with a spot of a diameter less than 50 μm, it is preferred to use such an fθ lens. On the other hand, in the case where a laser marker is required to focus a laser beam with a spot of a diameter greater than 50 μm, which is ordinarily about 100 μm, the correction in the Z-direction is performed by the expander in place of an fθ lens.

Each of the scanners 14a, 14b and 14c is made up of a galvanometer mirror comprising a total reflection mirror and a motor for rotating a reflective surface about an axis of a rotary shaft of the motor. The scanners 14a, 4b and 14c are provided with a rotational position sensor for detecting a rotational position of a rotary shaft of the motor and providing a signal representing a rotational position of the rotary shaft. The scanner drive circuit 52 (see FIG. 1) drives the X-, Y- and Z-axis scanners 14a, 14b and 14c according to control signals provided by the controller 4 of the laser control unit 1. For example, the scanner drive circuit 52 controls drive currents to the respective scanners 14a, 14b and 14c according to control signals provided by the controller 4 of the laser control unit 1. Further, the scanner drive circuit 52 has a function of adjusting a time rate of rotational angle of the scanner with respect to the control signal. This adjustment function can be embodied by a semiconductor element such as a variable resistor operative to change parameters for the scanner drive circuit 52.

Figure 9:
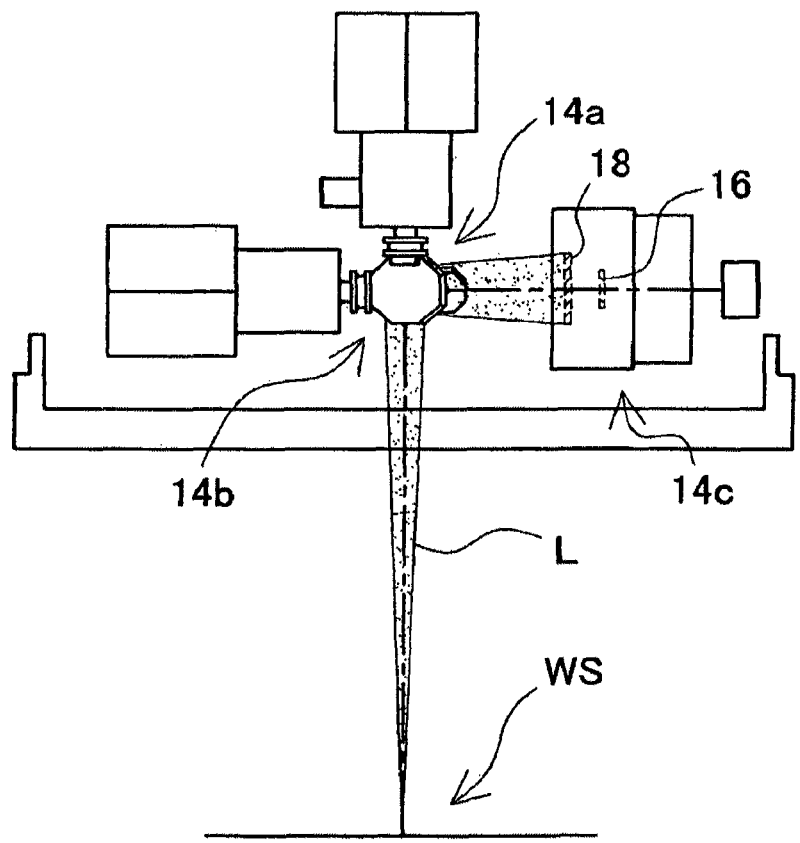
FIG. 9 is a side view of the laser beam scanner with a laser beam adjusted at a long focal distance.
Figure 10:
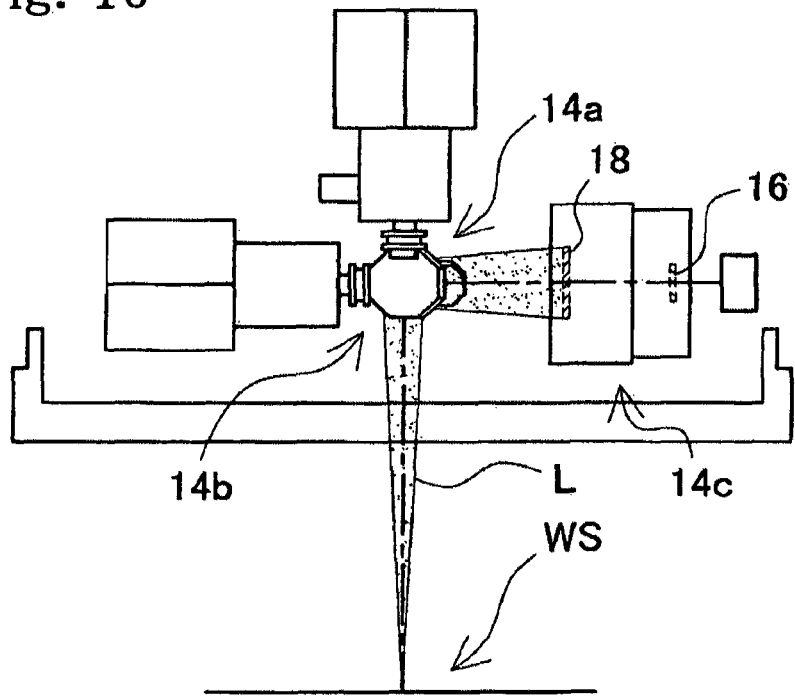
FIG. 10 is a side view of the laser beam scanner with a laser beam adjusted at a short focal distance.
Figure 11A:
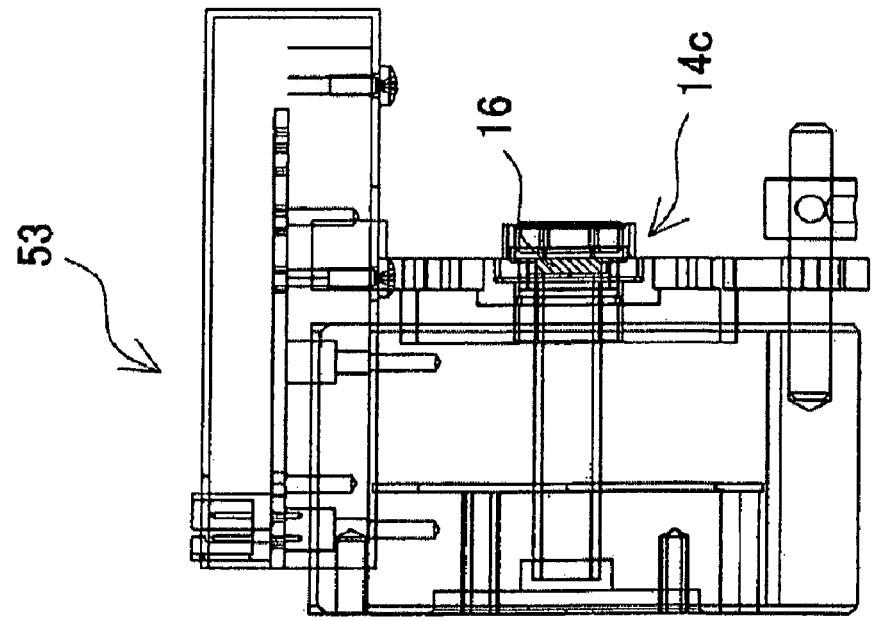
FIGS. 11A and 11B are front and side views of the Z-axis scanner, respectively.
Figure 11B:
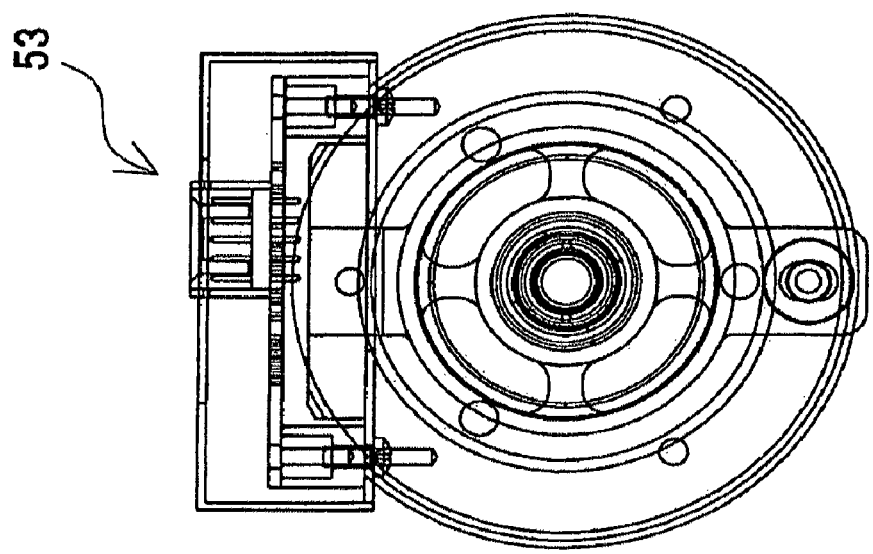

Referring to FIGS. 9 to 11, the Z-axis scanner 14c is accompanied by the beam expander 53 which varies a focal length so as to adjust a spot size of the laser beam L on a given work surface area as small as possible. The expander 53, which comprises two lenses or lens groups at incident and exit sides, respectively, varies its focal length by changing a relative axial distance between the two lenses. In other words, the beam expander 53 varies a focal distance (which is hereinafter referred to as a working distance in some cases) at which a minimum size of the beam spot of laser beam L is formed on a given work surface. In order to effectively vary the focal distance, the beam expander 53 is disposed before the galvanometer mirror of the Z-axis scanner 14c as shown in FIG. 5. In order to provide a more specific explanation, reference is made to FIGS. 9 to 11. As shown, the Z-axis scanner 14c includes a variable-focal length lens system comprising a movable lens or lens group 16 at an incident side and a stationary lens or lens group 18 at an exit side. The movable lens 16 is axially moved back and forth by a driving mechanism including a galvanometer (not shown). The drive mechanism includes a movable element for holding the lens 16 and a coil and magnet assembly for causing axial movement of the movable element. As shown in FIG. 9, when bringing the lenses 16 and 18 close to each other, the variable-focal length lens system changes to a longer focal length, so as to make the working distance longer. On the other hand, as shown in FIG. 10, when bringing the lenses 16 and 18 far away from each other, the variable-focal length lens system changes to a shorter focal length, so as to make the working distance shorter. In this instance, the stationary lens and the movable lens may be replaced with each other or may be both movable.

The three-dimensional laser processing system, which is capable of processing in a direction of work height, besides in length and breadth, may employ a manner of moving a focusing lens or a manner of moving a laser output unit or a laser processing head itself, instead of the Z-axis scanner adjustment.

The laser scanner 14 shown in FIGS. 5 and 6 is provided with a distance pointer. As shown in FIGS. 5 and 6, the laser scanner 14 is provided with a distance pointer which comprises an optical axis alignment means comprising a light source 60 for producing a guide beam G and an adjustable beam guide element 62 in the form of a reflective mirror and distance pointing means comprising a light source 64 for producing a pointing beam P and a pointer scanner 14d in the form of a reflective mirror formed on the back of the Y-axis scanner 14b and a stationary mirror 66 for reflecting the pointing beam P toward a scanning area. The beam guide element 62 is adjusted so as to bring the guide beam G into alignment with an optical axis of the laser scanner 14. The distance pointer projects a spot of the pointing beam P on a line along the guide beam G for indicating a focal point at which a scan laser beam should focuses.

Although, in the above embodiment, the laser scanner 14 is enabled to perform three-dimensional processing by the use of a focal length or distance adjusting mechanism, it may be permitted to move a work table up and down so as to put a work surface on the work table in a focal plane in which the laser beam is focused. Similarly, the laser scanner may be replaced with a mechanism for moving the work table in X-direction and/or Y-direction. This alteration is suitable for laser processing devices for use with a work table in place of a belt conveyer system.

Figure 12:
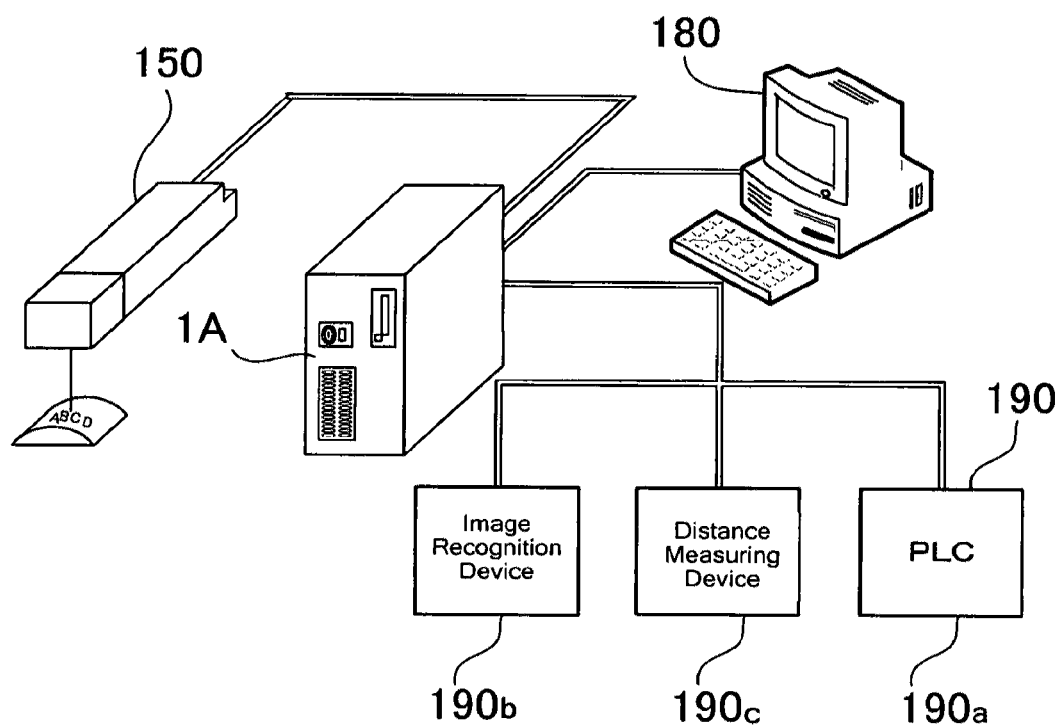
FIG. 12 is a schematic block diagram illustrating a laser marker system capable of printing in three dimensions.

FIG. 12 shows a three-dimensional laser marking system as a laser processing apparatus according to an embodiment of the present invention. The laser marking system comprises at least a laser marking head 150 as a laser output unit, a control unit 1A connected to and controlling the laser marking head 150, and a laser processing data setting system 180 connected to the control unit 1A for data communication with the control unit 1A through which three-dimensional laser processing data representing a print pattern is set to the laser control system 180. In this embodiment, the laser processing data setting system 180 comprises a computer on which a three-dimensional laser processing data setting program is installed. The laser processing data setting system 180 may be comprised by a programmable logic controller (PLC) equipped with a touch panel or other specialized hardware, as well as a computer. The laser processing data setting system 180 may be used as an integrated controller for performing the function of laser processing data setting and the function of operation control of a laser processing device such as the laser marking head. Furthermore, the laser processing data setting system 180 may be provided separately from the laser processing device or may be integrated as a single means with the laser processing device. For example, the laser processing data setting system 180 may be provided in the form of a laser processing data setting circuit incorporated into the laser processing device.

The control unit 1A is further connected to external equipment, such as a programmable logic controller (PLC) 190a, a distance measuring device 190b and an image recognition device 190c, as well as a photo diode (PD) sensor and other sensors (not shown). The programmable logic controller (PLC) 190a controls the system according to a given sequence logic. The image recognition device 190c, which may comprise an image sensor, detects attributes such as type, position and the like of a work conveyed in a processing line. The distance measuring device 190b, which may be a displacement pickup 190b, acquires information about a distance between a work and the marking head 150. This external equipment is connected to the control unit 1A for data communication.

Figure 13:
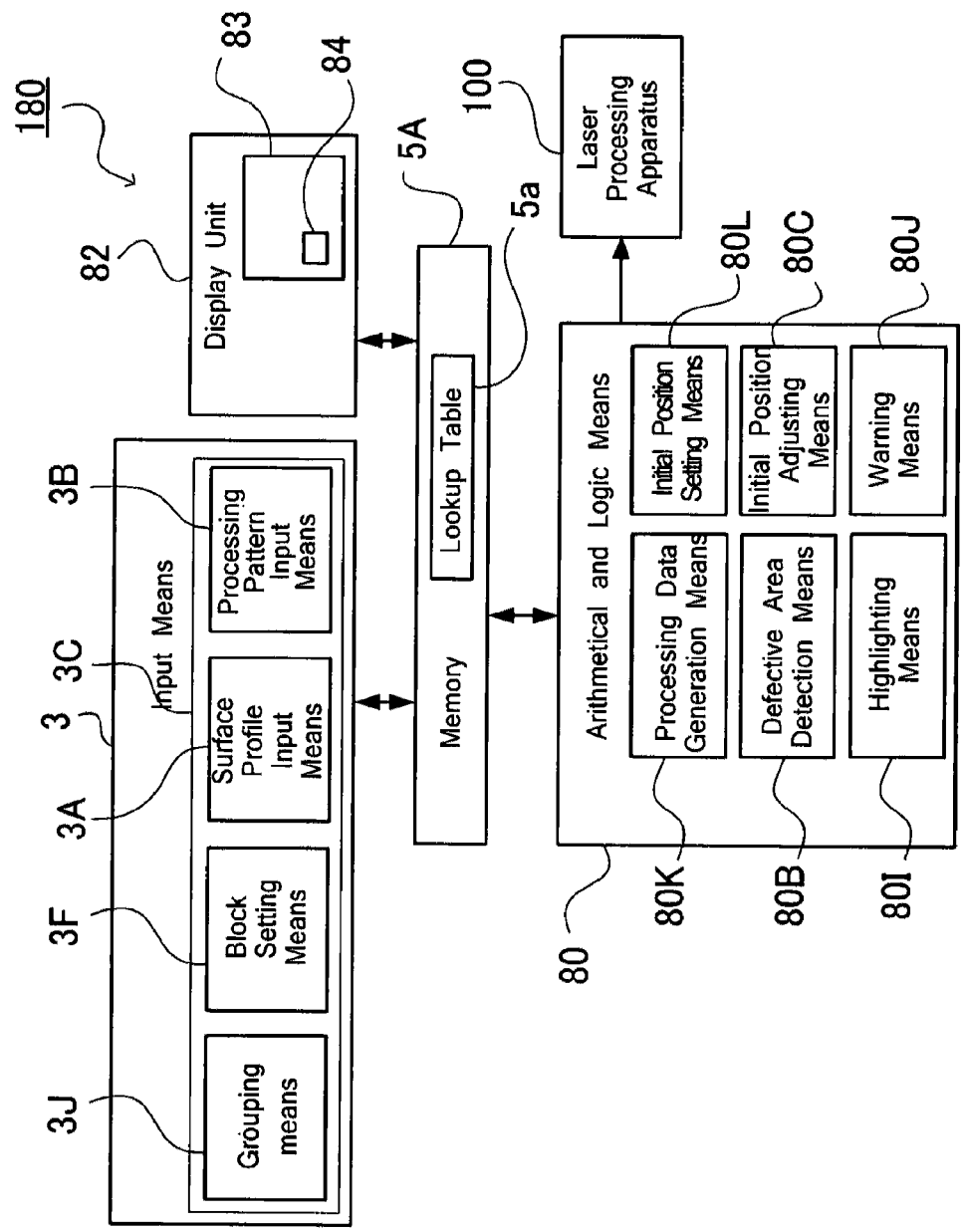
FIG. 13 is a schematic block diagram illustrating a system architecture of a laser processing data setting system.

Referring to FIG. 13 illustrating the architecture of the marking data setting system 180 for setting laser marking or printing data to perform printing of a planar print pattern in three dimensions as an example of the laser processing apparatus, the laser processing data setting system 180 comprises an input unit 3 through which information about an intended three-dimensional printing job is entered, an arithmetical and logic unit 80 for generating laser processing or printing data based the information entered through the input unit 3, a display unit 82 for displaying representation of the generated laser printing data, and a memory device 5A for storing the laser printing data. The memory device 5A has a reference table 5a maintaining a plurality of combinations of processing parameters that are correlated with one another. The display unit 82 includes an object display section 83 for displaying a work surface of an object in three dimensions and a head display section 84 for displaying a laser marking head when displaying a work surface of an object on the object display section 83. The input unit 3 includes a processing condition setting means 3C for inputting printing conditions necessary to perform a given printing in a desired pattern. Specifically, the processing condition setting means 3C comprises a work surface profile input means 3A for inputting information about a profile of the three-dimensional work surface, processing pattern input means 3B for inputting information about a process pattern such as a print pattern, a process block generating means 3F for creating a process block of a plurality of process patterns for block processing, and a process block grouping means 3J for grouping the blocks established by the process block generating means 3F. The memory section 5A, which corresponds to the memory device 5 shown in FIG. 1 and stores data representing the information about a profile of three-dimensional work surface, a given process or print pattern, processing patterns and the like inputted through the input unit 3, may comprise a semiconductor memory, as well as a storage media such as a fixed storage device. The display unit 82 may be exclusively provided for the three-dimensional laser processing system or may be a monitor of a computer connected to the three-dimensional laser processing system.

The arithmetical and logic unit 80, which comprises a large-scale integrated circuit or an integrated circuit for data processing, has a processing data generation means 80K for generating actual processing data, an initial position setting means 80L for determining an initial end position on a work surface to which a representation of three-dimensional processing data is justified on the display unit 82, a defective surface area detection device or unit 80B for detecting a defective work surface area which is only defectively processable, or unprocessable, by performing calculations, a highlighting device or unit 80I for displaying a work surface with a defective work surface areas highlighted differently from a processable work surface area, and a warning device or unit 80J for providing a warning that a processing pattern has a defective work surface area, even partly, when setting the processing pattern through the processing condition setting means 3C. If necessary, the arithmetical and logic unit 80 may have a processing condition adjusting means 80C for adjusting processing conditions so as to enable laser processing to be applied to the defective work surface area and coordinate conversion means for converting information about a plane processing pattern into special three-dimensional special coordinate data so as to make the processing pattern virtually fit a three-dimensional work surface.

Although, in FIG. 13, the laser processing data setting system 180 is made up by dedicated hardware, however, laser processing data setting may be performed by the use of software. In particular, as shown in FIG. 12, a general purpose computer with a laser processing data setting program installed therein may be used. Furthermore, although the laser processing data setting system 180 and the laser processing apparatus 100 are separately provided, they may be integrated as one unit.

Figure 14:
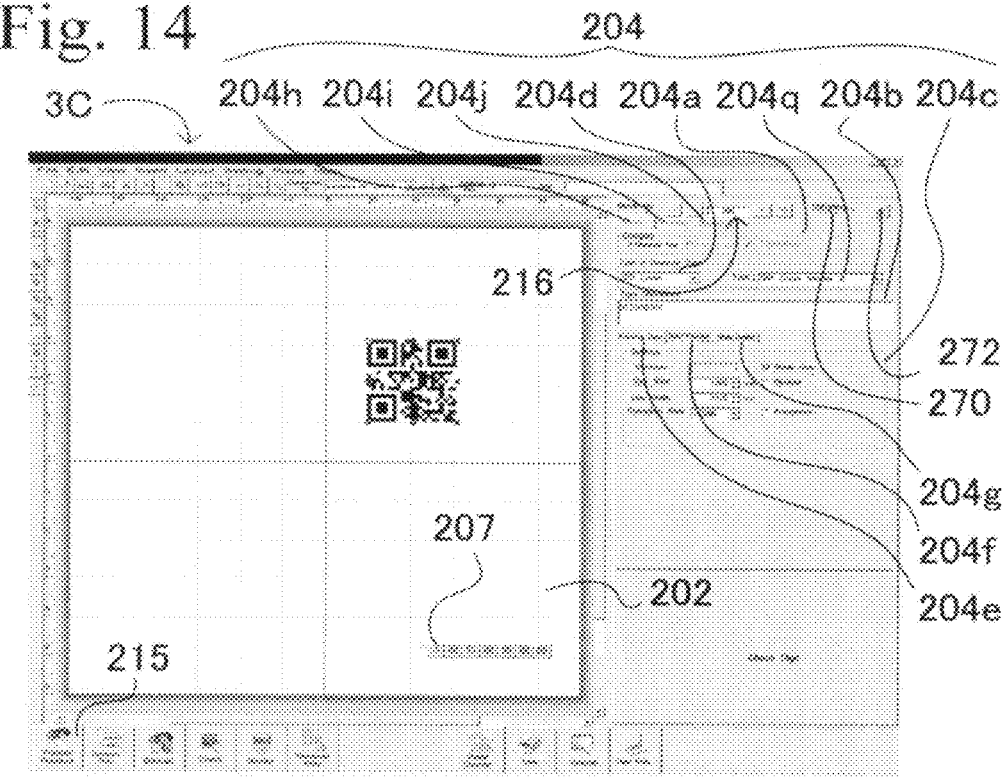
FIG. 14 is a photographic illustration showing a user interface window, namely an edit display window, of a laser processing data setting program which displays an object in a 2D edit mode.
Figure 15:
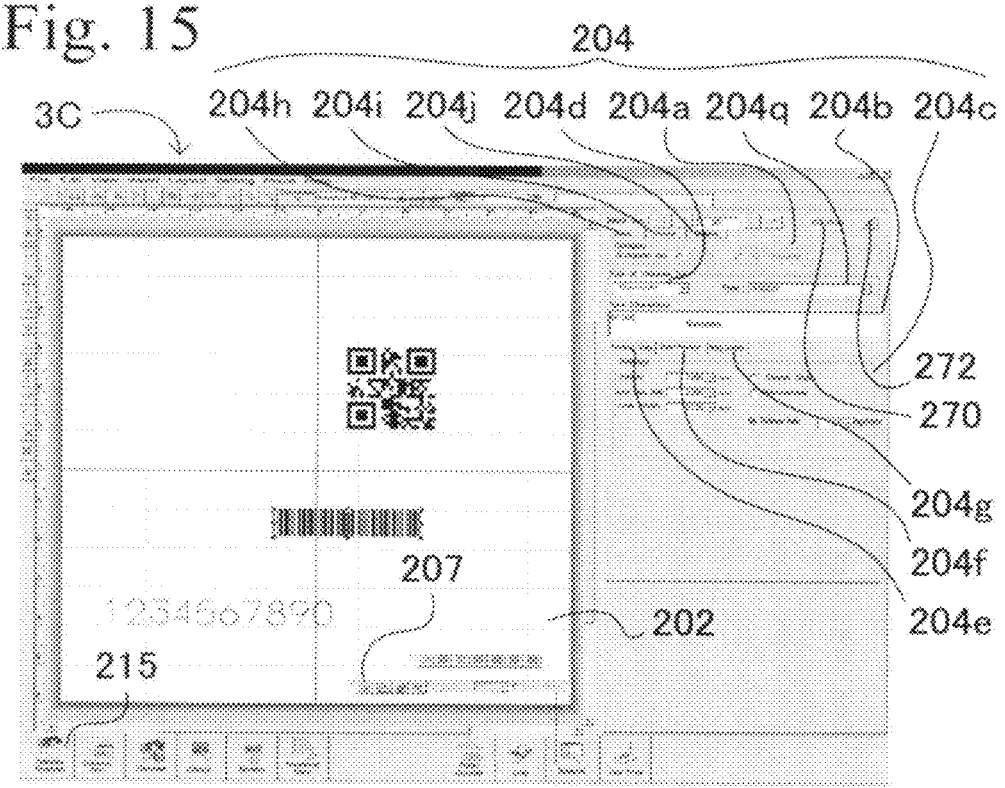
FIG. 15 is a photographic illustration showing the edit display window which displays three objects in two dimensions.

The following description is directed to a sequence of generating a print pattern from character information inputted through the processing condition setting means 3C by means of execution of a laser processing data setting program. In making explanation to the sequence, reference is made to FIGS. 14 and 15 illustrating a user interface window by way of example. In the individual user interface windows, a layout of dialog boxes, buttons, tab keys and the like of the user interface window may be appropriately changed in location, shape, size, color, pattern and/or the like. The layout of elements of the window may be changed so as to be suitable for clear view, easy assessment and easy judgment. For example, it is not prevented to use a separate window for details setting and/or to open a plurality of windows or dialog boxes incidentally. Operation of buttons and dialog boxes, selection of commands and numerals in boxes are made through the input unit 3 connected to a computer in which the laser processing data setting program is installed. In the following description, the term "press a button" includes pressing a button on physically direct contact with it, or clicking a button through the input unit. The input/output device forming the input unit 3 may be unified with the computer, as well as connected to the computer through wireless communication or cable communication. The input/output device may be any commercially available pointing device, including a mouse, a keyboard, a slide pad, a track point, a tablet, a joystick, a console, a jog dial, a digitizer, a light pen, a ten-key keyboard, a touch pad, etc. and may be used not only for management of the program, but also for operation of the hardware of the laser processing apparatus. Furthermore, it can be made to display a user interface window on a touch screen or a touch panel used as a screen of the display unit 82 so as to enable users to touch the window physically with a finger for buttons operation. It can also be made to use a voice input device or other existing devices, individually or in combination.

The laser processing data setting program is designed to edit three-dimensional laser processing data. However, in consideration of users who are unfamiliar with three-dimensional data editing, the laser processing data setting program may be adapted to run in two edit modes, namely a two-dimensional edit mode (2D edit mode) and a three-dimensional edit mode (3D edit mode). The 2D edit mode, which is an fool-proof default mode on startup of the laser processing data setting program, prevents users not good at 3D data editing from being confused. In this case, as shown for example in FIGS. 14 and 15, current mode indicators 2D and 3D appear alternately in a current mode indication box 270 by pressing an edit mode switch button 272. It is practicable to configure the laser processing data setting program so that a default edit mode is selectively switched between 2D and 3D edit modes. This configuration makes it easy for advanced users to select the 3D edit mode automatically on startup of the laser processing data setting program. On the other hand, the edit mode switch button 272 is marked with 3D meaning that a current window is changeable to the 3D edit mode when the current window is in the 2D edit mode or 2D meaning that a current window is changeable to the 2D edit mode when the current window is in the 3D edit mode. The edit mode switch button 272 thus marked allows advanced users to open the user interface window either in the 3D edit mode or in the 2D edit mode according to the user's ability and preference and, on the other hand, allows inexperienced users to stay away from using a window in the 3D edit mode which the user feels self-conscious about. Accordingly, inexperienced users are freed from difficult operation in data edit work.

The edit display windows in the 2D edit mode and the 3D edit mode window shown in FIGS. 14 and 15, respectively, have almost similar appearances. When the 2D edit mode window appears, a Profile tab 204i for setting a three-dimensional profile grays out and is disabled. The Profile tab 204i is enabled upon a switch from the 2D edit mode window (FIG. 14) to the 3D edit mode window (FIG. 15). In this way, the user interface window is switched smoothly from the 2D edit mode to the 3D edit mode, and vice versa, by putting restrictions on settable items, but without accompanying significant alterations in appearance.

As just described above, since the user interface window is almost the same in the 2D edit mode and the 3D edit mode, three-dimensional laser processing data can be set up and edited in the same way as the two-dimensional laser processing data. In three-dimensional laser processing data setting, a character size and a profile of a print pattern are specified in the 3D mode user interface window, the same as the 2D mode user interface window. Subsequently, information about the three-dimensional profile is combined with the settings of the two-dimensional profile in order to provide three-dimensional laser processing data. In this instance, the user can set actual print data while seeing a full-frontal two-dimensional representation of the laser processing data as viewed on a side of the laser processing head and a three-dimensional representation of the processing data as viewed in any specific direction which are alternately hanged. The user interface windows enables users experienced only in two-dimensional laser processing data setting and editing to set up and edit three-dimensional laser processing data in a simple way.

Explaining elements forming the processing condition setting means 3C of the user interface window with reference to FIGS. 14 and 15, the user interface window includes an edit display window 202 at the left-hand side thereof and a Print Pattern input dialog box 204 at the right-hand side thereof. The edit display window 202 displays representation of an editing print pattern data. The Print Pattern input dialog box 204 includes various buttons, tab keys and areas for specifying printing conditions. Specifically, there are provided in the window, setting items selection tabs, including a Basic Setting tab 204h, a Profile Setting tab 204i and a Details Setting tab 204j, which are selectively enabled. In the Print Pattern input dialog box 204 shown in FIG. 14, the Basic Setting tab 204h is enabled by default, and the remaining tabs 204i and 204j are disabled. There are further provided in the Print Pattern input dialog box 204 several menu boxes and boxes, namely a Print Category menu box 204a, a Text box 204b, a Details dialog box 204c, and a Type menu box 204q. In the Print Type menu 204a, a print category that the user wants to specify is selected from a pull-down menu including Character String, Symbol•Logo and Printer Operation. In FIG. 14, Character String is selected by default. In the Character Data menu box 204d, a print type that a user wants to specify is selected from a pull-down menu including Character, Barcode, 2D Code and RSS•CC (Reduced Space Symbology•Composite Code). In the Type menu box 204q, a particular type is specified from a pull-down menu according to the selected print category. The type menu shows various font types when Character is selected; CODE39, ITF, 2 of 5, NW7, JAN, Code 28 and the like when Barcode is selected; QR code, a micro QR code, Data Matrix and the like for the 2D code; and RSS-14, CC-A, RSS Stacked, RSS Stacked CCA, RSS Limited, RSS Limited CC-A and the like when RSS. CC is selected. In the Text box 204b, characters that the user wants are typed in. When Character is selected as a print type in the Character Data menu box 204d, the typed-in characters are printed in a string as they are. On the other hand, when Symbol is selected as a print type in the Character Data menu box 204d, the typed characters are encoded in print pattern according to a selected type of symbol. The print pattern is generated in the processing condition setting means 3C, or otherwise may be generated in the processing data generation means 80K of the arithmetical and logic unit 80. In Details dialog box 204c, there are provided three tabs, namely Print Data tab 204e, Size•Position tab 204f and Printing conditions tab 402g, for specifying details of printing conditions. In the 2D mode edit display window 202 shown in FIG. 14, a QR code is selected in the Character Data menu box 204d, and, correspondingly, a cell size, a line thickness of character, a percentage of error correction and a version number are quantified. There are further provided check boxes for selection of Auto Mode, Reverse and Password.

Figure 66:
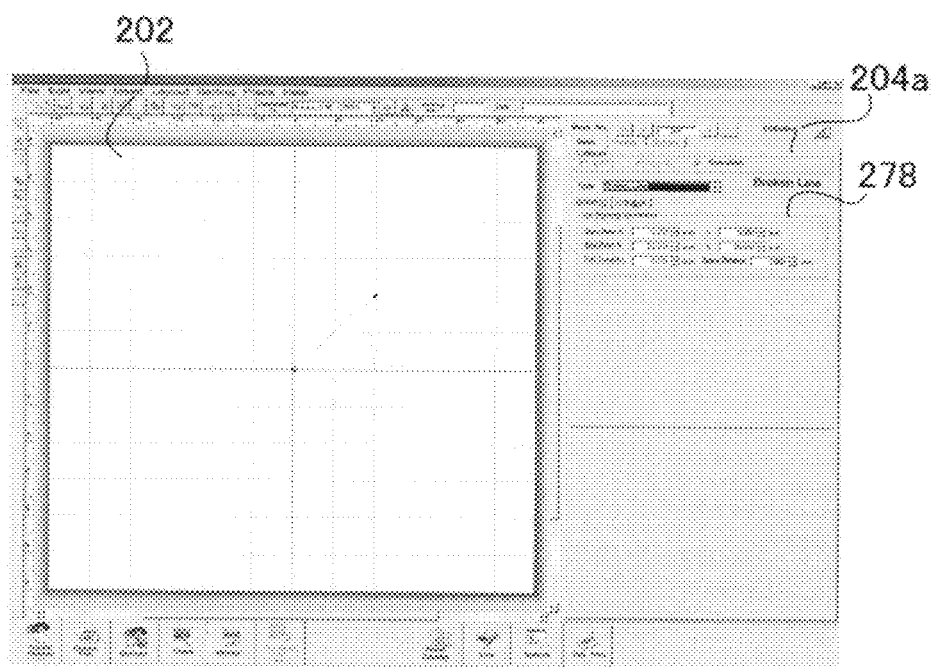
FIG. 66 is a photographic illustration showing an edit display window in which a broken line is chosen as operation of a processing apparatus.
Figure 67:
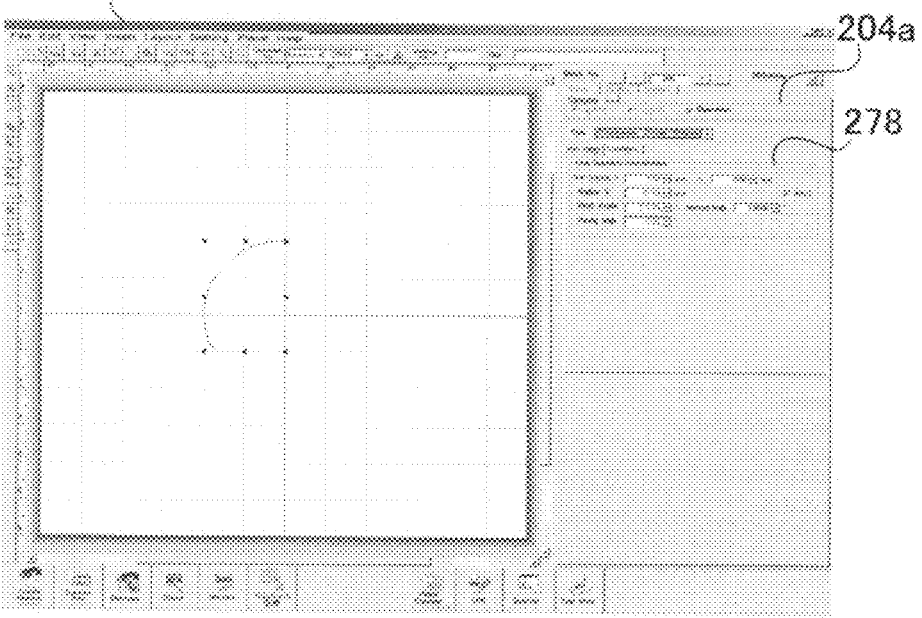
FIG. 67 is a photographic illustration showing an edit display window in which a counterclockwise circle ellipse is chosen as an operation of a processing apparatus.
Figure 68:
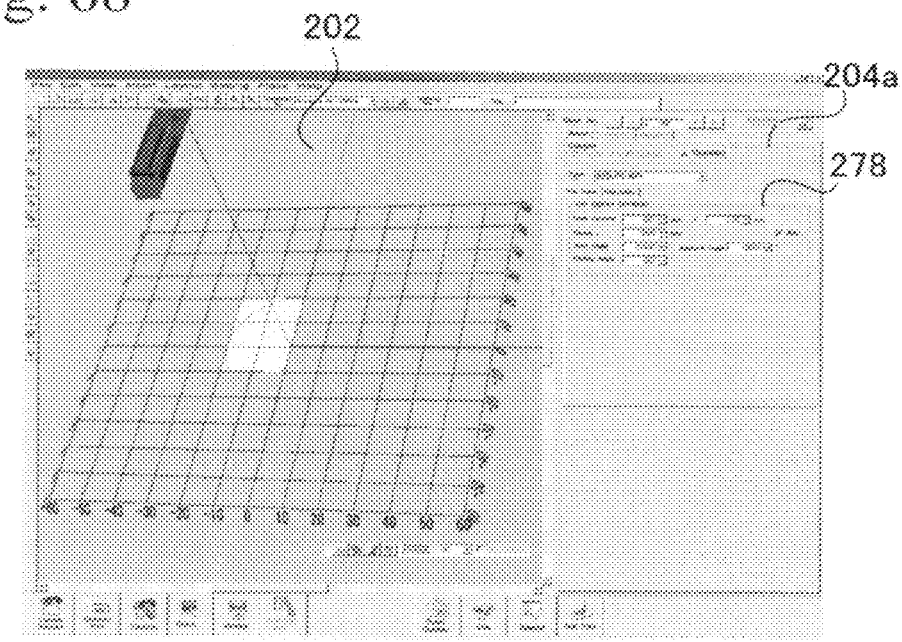
FIG. 68 is a photographic illustration showing the edit display window shown in FIG. 67 which is changed to a 3D edit mode.

When selecting Printer Operation in the Print Category menu box 204a, it is enabled to select an print style in a pull-down operation menu including Fixed Point, Straight Line, Broken Line, Clockwise Circle/Ellipse, Counterclockwise Circle/Ellipse, Centered Point and the like. In the Printer Operation category, Details setting box 278c appears in place of the Details dialog box 204c for specifying a locus of line, such as a straight line, a circular are or the like, in coordinates as shown. For example, FIG. 66 shows the edit display window 202 in which Broken Line is selected. FIG. 67 shows the edit display window 202 in which Clockwise Circle/Ellipse is selected. FIG. 68 shows the edit display window 202 in 3D edit mode in which a line is displayed in three dimensions.

Figure 16:
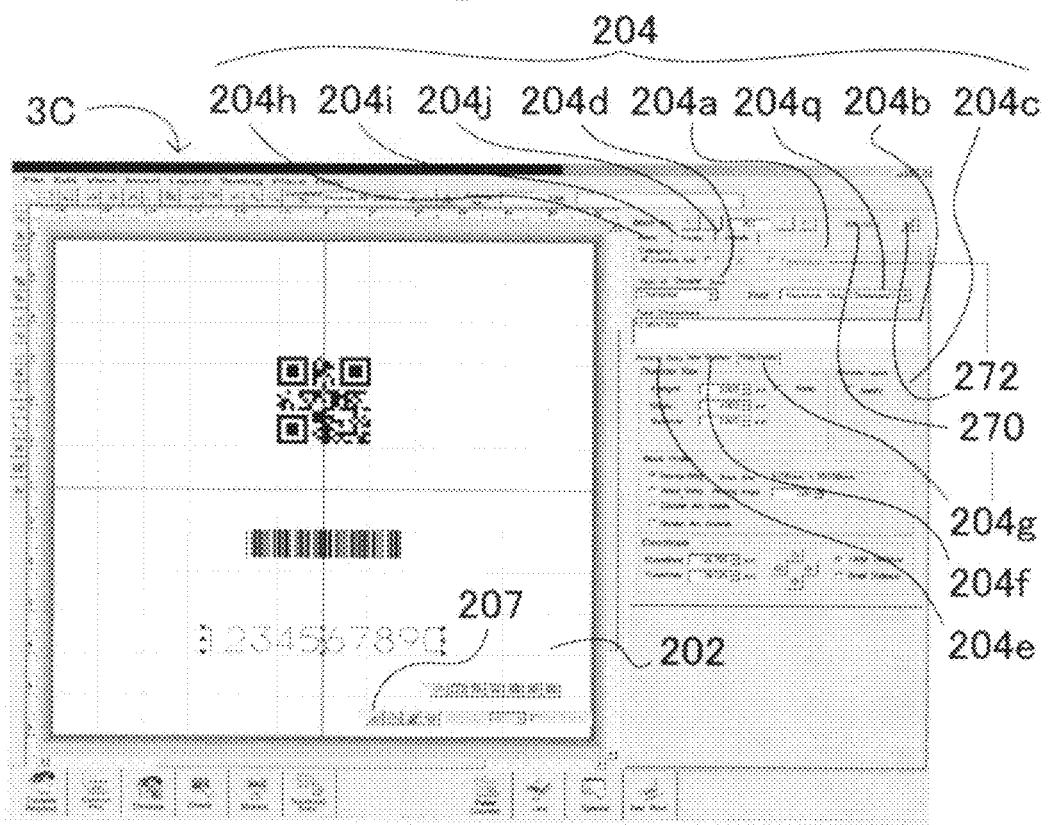
FIG. 16 is a photographic illustration showing the edit display window for laying out print blocks.

In this way, data of a print block is established. A plurality of print blocks may be provided. That is, a work surface area or print area is divided into a plurality print blocks for printings under different printing conditions, respectively. It can be made to set a plurality of print blocks on a single work and, at the same time, one print block on each of a plurality of works within the work surface area. As shown in FIGS. 14 and 15, setting of a print block is made by block setting means such as a Block Number spin box 216 with Number Change buttons which are located above the Print Pattern input dialog box 204, namely an Increment button marked with ">", a Decrement button marked with a Maximize button marked with ">>" and a Minimize button marked with "<<" for changing a block number. In order to specify a block number in the Block Number spin box 216, the Increment button or the Decrement button is pressed to change a block number by one increment or one decrement, respectively. When pressing the Maximize button or the Minimize button, the current block number in the Block Number spin box 216 jumps to a minimum block number, e.g. 0 in this embodiment or to a maximum block number, e.g. 255 in this embodiment, respectively. Otherwise, it can be made to specify a block number by entering a desired block number in the Block Number spin box 216. The edit display window 202 shown in FIG. 14 displays a QR code by specifying a block number of 000. The edit display window 202 shown in FIG. 15 is provided with three print blocks set therein in which a QR code, a barcode and a character string are displayed by specifying block numbers of 000, 001 and 002, respectively. When pressing the Print Data tab 204e, the print data dialog panel appears for specifying a height of barcode, a narrow space width, bar thickness, a thickness ratio of fine and heavy bars and the like. As appropriate, Check Digit and Reverse can be specified. A layout of print blocks can be desirably changed by adjustment of locations of the print blocks (centering of print blocks, right and left justification of print blocks, even distribution of print blocks), superposition ordering of print blocks and positioning of print blocks. For example, FIG. 16 shows three print blocks which are justified centrally in a transverse direction and distributed evenly in a vertical direction in the edit display window 202. It can be made to position a print block by coordinates. For example, FIG. 16 shows a character string specified by a block number specified by typing X and Y coordinates in numerical value in Size Position boxes of a Size Position panel which appears when the Size Position tab 204f is enabled. The Size Position panel includes buttons for specifying a character format including a character height, a character width, a character spacing and the like. It can be also made to specify writing directions and inner and outer diameters of a column when printing a three-dimensional columnar work surface.

Figure 17:
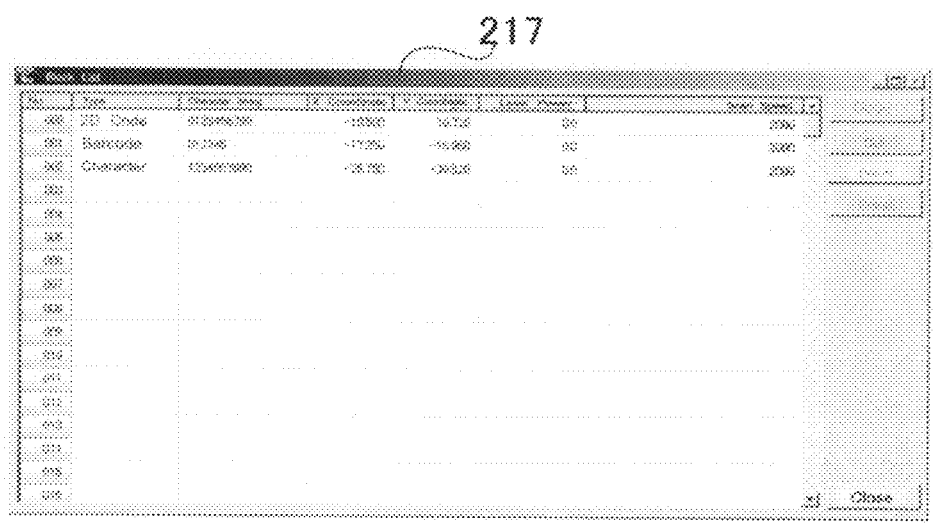
FIG. 17 is a photographic illustration showing the edit display window for displaying a print block list.
Figure 69:
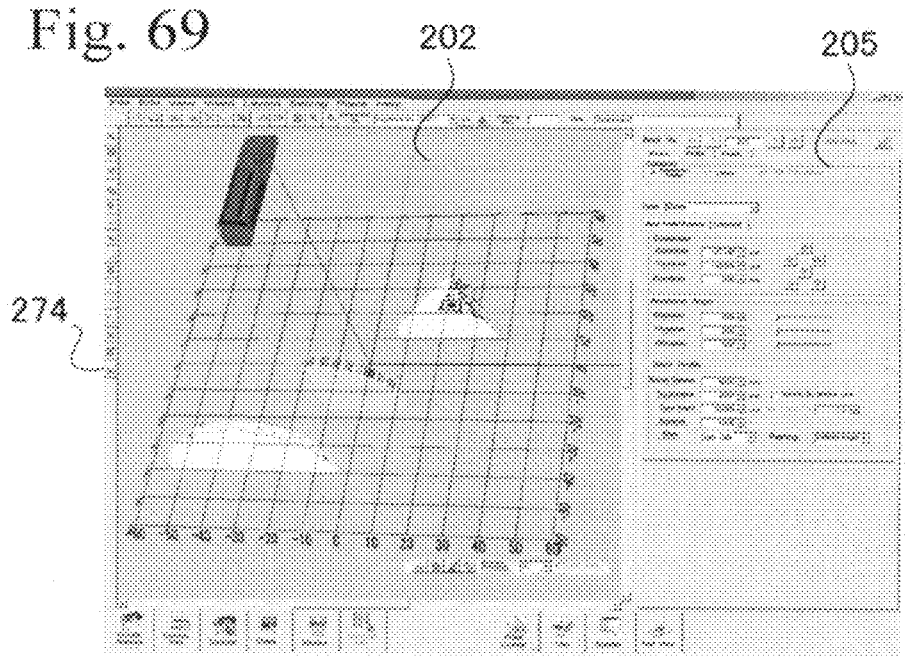
FIG. 69 is a photographic illustration showing an edit display window with a plurality of print blocks which are subject to batch transformation.
Figure 70:
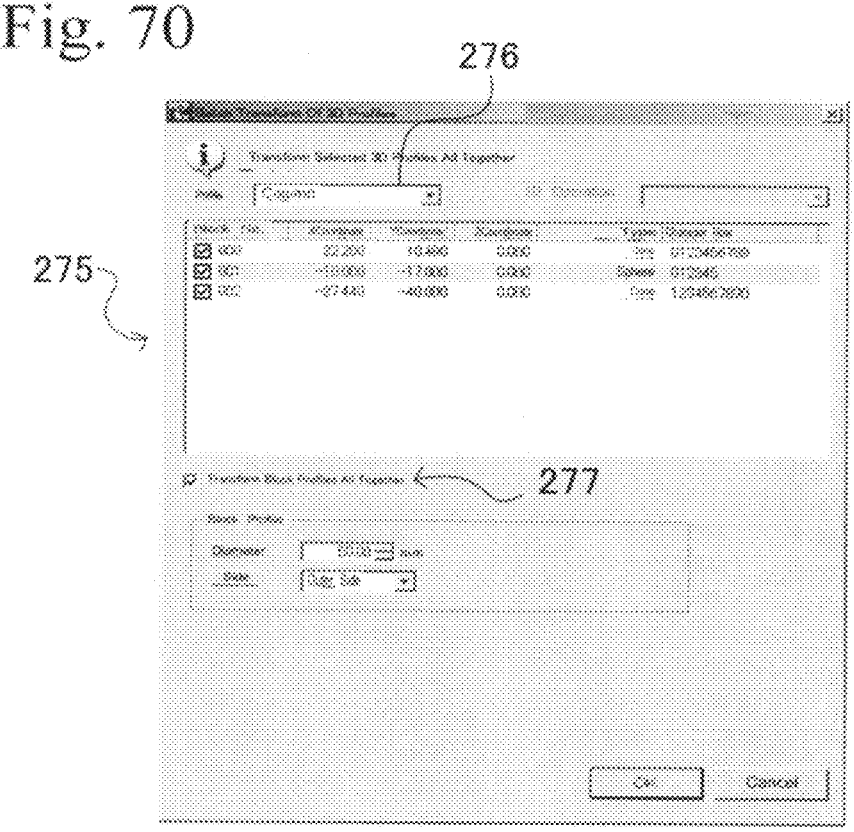
FIG. 70 is a photographic illustration showing a 3D profile batch transformation dialog box.
Figure 71:
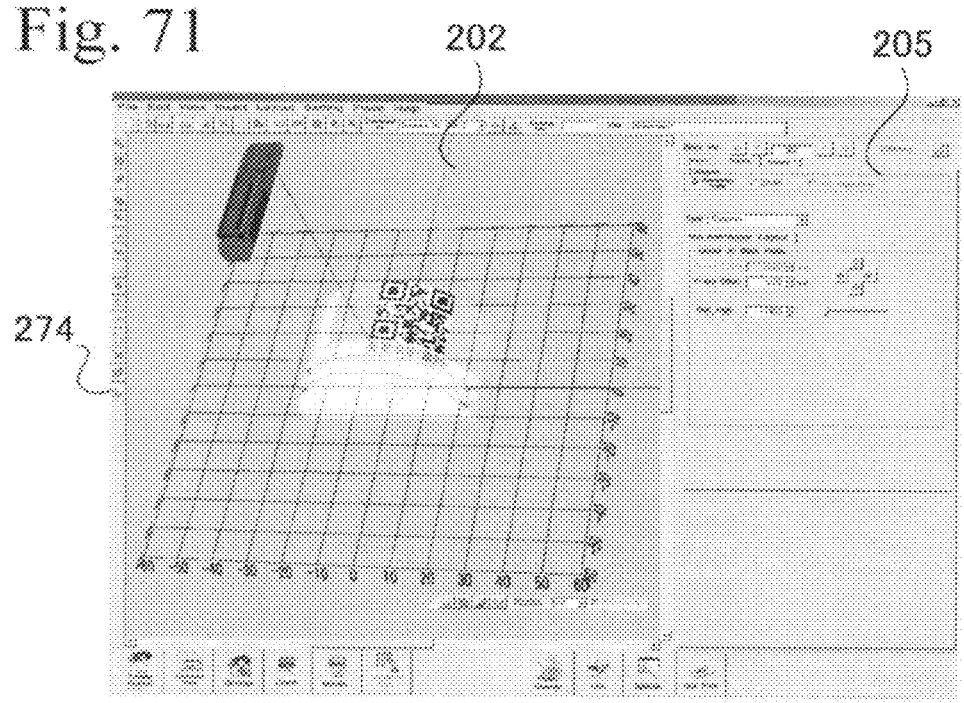
FIG. 71 is a photographic illustration showing an edit display window in which print blocks are batch transformed according to settings specified in the 3D profile batch transformation dialog box shown in FIG. 70.

FIG. 17 shows a block list window. This block list window appears when selecting an Edit command in the menu bar (see FIG. 15) to display a pull-down menu and then selecting Block List in the menu. In the block list, reset of a specified print block, deletion of specified print block, addition of a new print block can be made. It can be made to execute a batch transformation of profiles of print blocks. In the case where the user wants to make a transformation of three print blocks comprising two circular cones and one sphere such as shown in FIG. 69 by way of example into three columnar print blocks, when pressing a button 274 for 3D Profile Batch Transformation which is located at the bottom of a tool bar at a left side of the edit display window 202, a 3D Profile Batch Transformation window 275 appears as shown in FIG. 70. The 3D Profile Batch Transformation window 275 includes a current print block list which describes individual print blocks together with a block number, position coordinates, a graphic type and a character string. After choosing any of the print blocks that the user wants to transform by checking a check box of the print block, a profile into which the user wants to transform the selected print block is selected from a pull-down menu of a Profile menu box 276 including a plane, a column, a sphere, a circular cone, 3D processing machine, ZMAP, etc. When the user wants to transform all of the print blocks into a specific profile collectively, after choosing a Batch Transforming Block Profile check box 277, the user specifies details of the profile in the dialog box. Regarding the example shown in FIG. 70, the user chooses a column as a profile to which the user wants to transform the selected print block in the Profile menu box 276, and, thereafter, specifies a diameter and a print surface in a Diameter spin box and a Print Side menu box in the Block Profile Bach Transformation dialog box. When an OK button is pressed, an edit display window 202 appears to display three columnar print blocks having the same diameters all together as shown in FIG. 71. This batch transformation function facilitates easy operation and is laborsaving in print block transformation.

Figure 57:
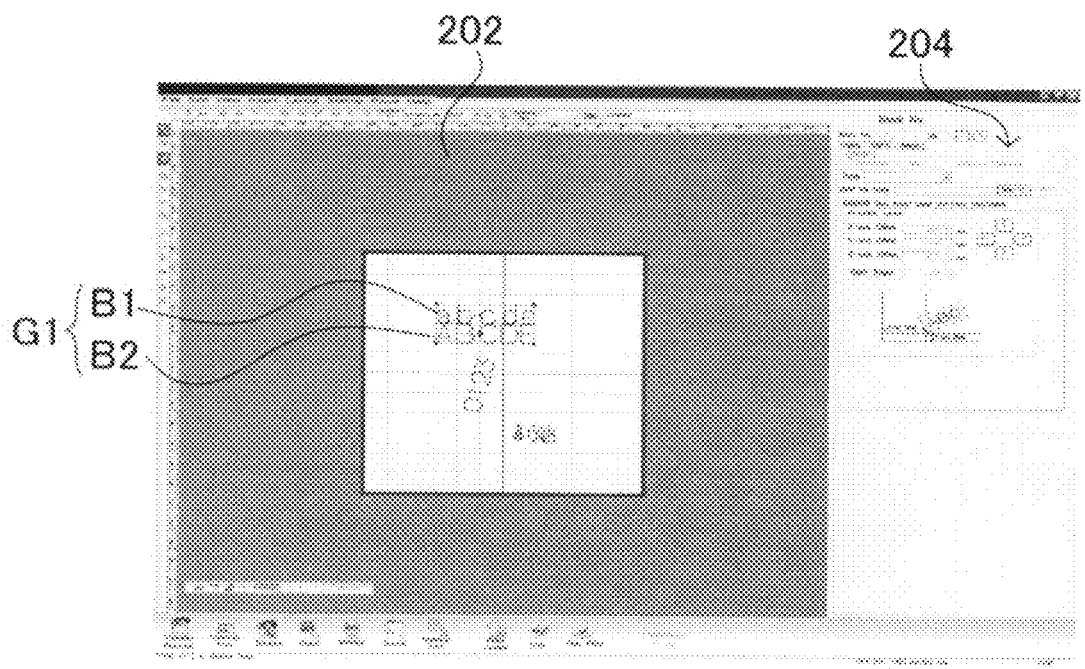
FIG. 57 is a photographic illustration showing an edit display window in which a plurality of print blocks are displayed.
Figure 58:
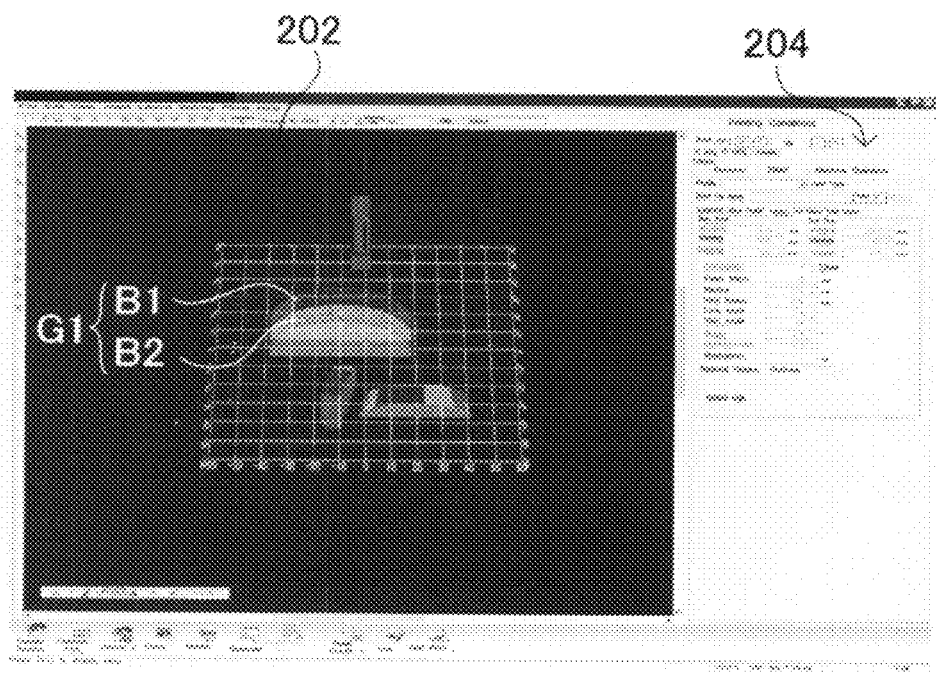
FIG. 58 is a photographic illustration showing an edit display window in which the print blocks shown in FIG. 57 are displayed in three dimensions.

FIGS. 57 to 65 illustrate a function of grouping a plurality of print blocks into one print group in order to set up printing conditions such as laser power and scan speed by group. FIGS. 57 and 58 show edit display windows 202 in which a plurality of print blocks generated through the print block generating means 3F are displayed in two and three dimensions, respectively. In this instance, one print block allows a single line of print only. Therefore, when it is requested to print two or more lines in one print block, a plurality of print blocks are established side by side as they are in one unified print block. As shown in FIGS. 57 and 58, a columnar print block of a character string "abcde" (print block B1 which is identified by a block number 000) and a columnar print block of a character string "ABCDE" (print block B2 which is identified by a block number 001) are established on a columnar work surface and set up vertically side by side. Printing conditions are specified for the individual print blocks B1 and B2. In the past, users were required to specify printing conditions by print block. In such a case, since the print blocks B1 and B2 are applied to a single work, many printing conditions are often common to both print blocks B1 and B2. If specifying the same printing conditions by print block in the conventional way, the printing condition specifying operation is somewhat troublesome. In particular, in the case where a large number of print blocks are established, the same printing conditions have to be entered over and over again. This is a time consuming operation. In order to avoid this problem, the processing block grouping means 3J is used to group a plurality of print blocks into one print group so as thereby to enable users to specify printing conditions by print group.

Figure 59:
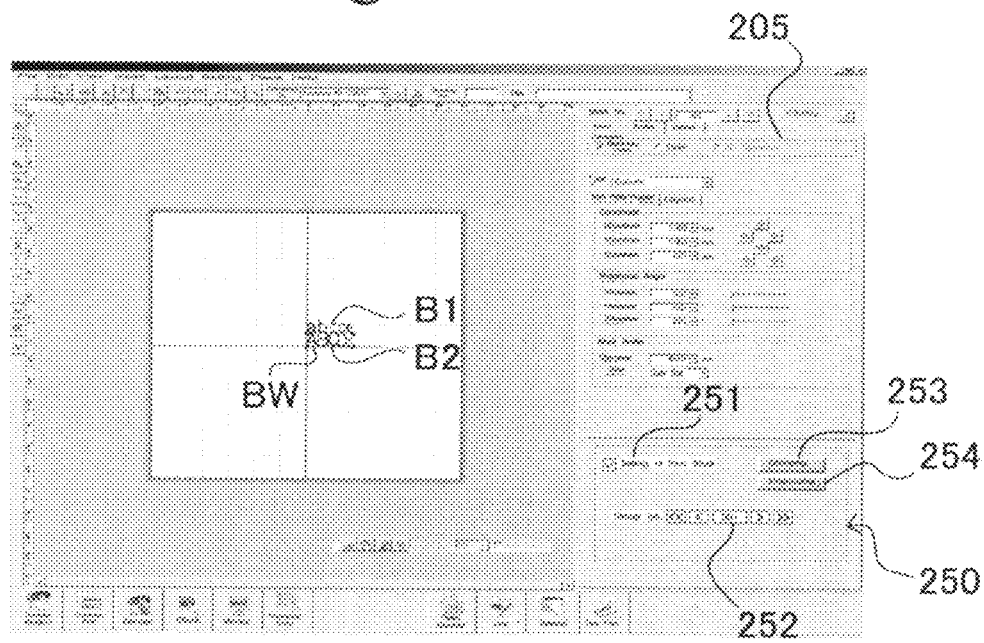
FIG. 59 is a photographic illustration showing an edit display window in which print blocks are displayed in two dimensions.
Figure 60:
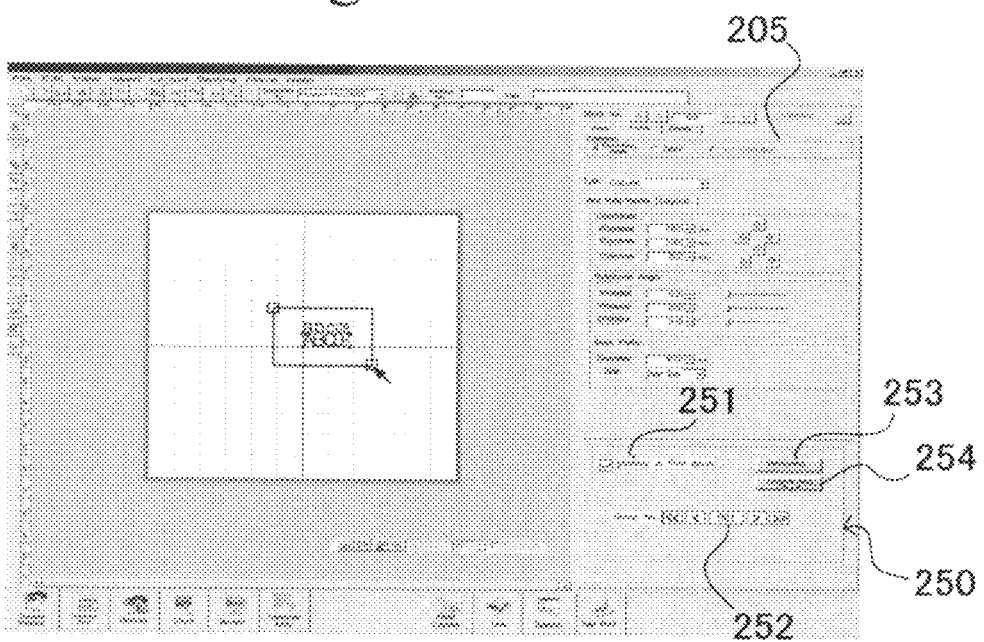
FIG. 60 is a photographic illustration showing an edit display window in which print patterns are unified into a block by the use of a mouse.
Figure 61:
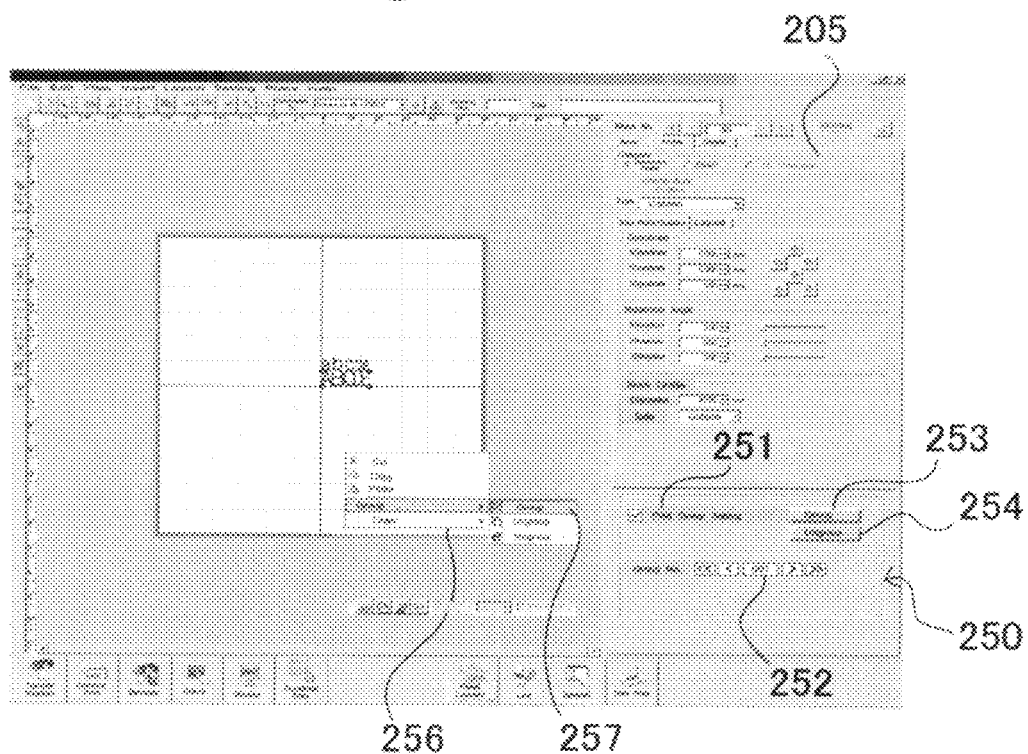
FIG. 61 is a photographic illustration showing an edit display window in which print blocks are grouped by the use of a pop-up menu.
Figure 62:
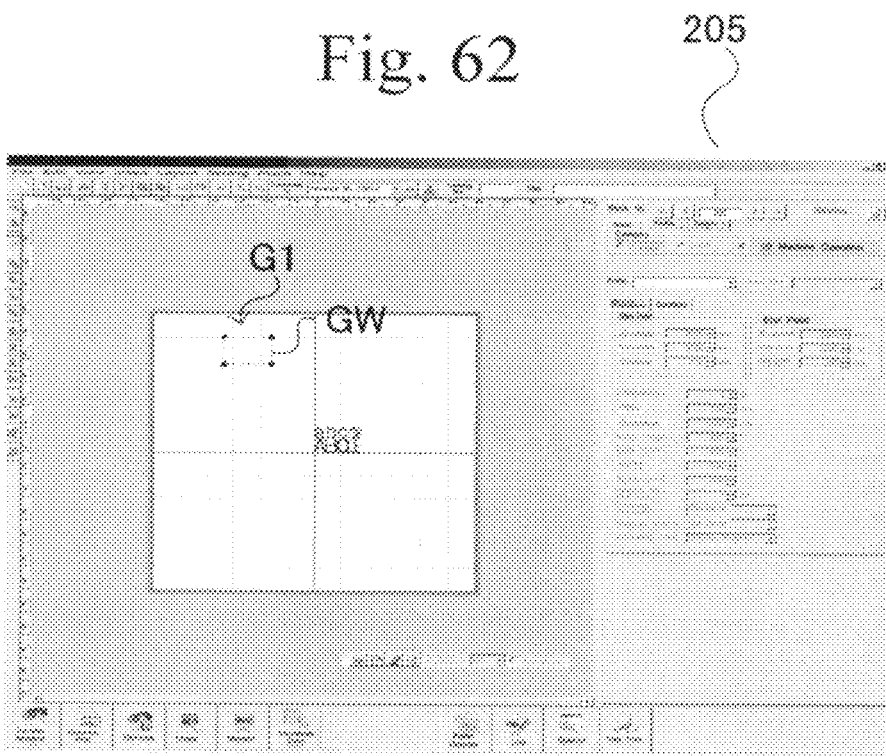
FIG. 62 is a photographic illustration showing an edit display window in which a print block group is specified.
Figure 63:
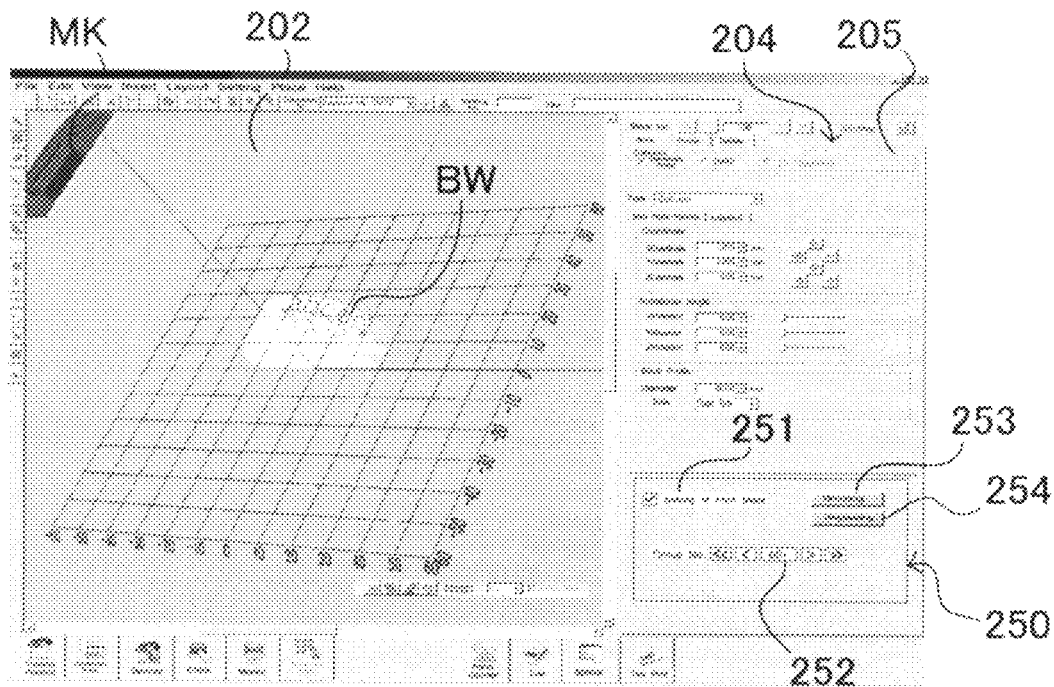
FIG. 63 is a photographic illustration showing an edit display window in which the print block shown in FIG. 59 is displayed in three dimensions.

As shown in FIG. 59, after choosing a Print Block Grouping check box in the Grouping dialog box 250 and selecting a print block that the user wants to group by its print block number, a group number is specified in Group Number spin box 252. Selection of a print block that is wanted to be grouped is achieved by defining a work surface area including the print block in the edit display window 202 using a pointing device such as a mouse pointer as shown in FIG. 60 and then pressing Group button 253. After defining the work surface area, or otherwise pointing a plurality of print blocks that the user wants to group with a mouse pointer, the user presses a right mouse button to call a pop-up menu 256. As shown in FIG. 61, when selecting Grouping in the pop-up menu 256, a pull-down menu 257 listing Grouping, Ungrouping and Regrouping appears. Then, the Grouping is selected in the pull-down menu 257. Every time several print blocks are grouped, a group number is automatically assigned to groups from 000 in order of grouping. In this embodiment, grouping is permitted up to 245 groups. This grouping function enables users to specify printing conditions collectively by group. In an example shown in FIG. 59, print blocks B1 and B2 are pointed to be grouped as a group G1 in the edit display window 202 in the 2D edit mode and a group number (000 in this example) is assigned to the group by specifying a number in a Grouping dialog box 250 of the Print Pattern input dialog box 204. As a result, a print group frame or box GW appears to indicate an area of the print block group G1 which encloses double character strings that are grouped. As shown in FIGS. 61 and 62, the frame or box may be changed from a print block frame or box BW enclosing a singe print block to a print group frame or box GW enclosing grouped print blocks. In this way, two character strings "abcde" and "ABCDE" are dealt with as though they are one. The image of frame or box may be identical or may be different in appearance between the print block frame or box and the print group frame or box. When displaying the print block frame or box BW by a fine line and the print group frame or box GW by a bold line, these print block frame or box BW and print group frame or box GW are sharply distinctive. Furthermore, these frames or boxes may be differed by line styles such as solid line and broken line, line colors, or the like. It is desirable to achieve the grouping operation in the edit display window 202 in the 2D edit mode as shown in FIG. 59 since the 2D representation of a print block is simple and easy in selection. However, it is practicable to achieve the grouping operation in the edit display window 202 in the 3D edit mode as shown in FIG. 63.

Figure 64:
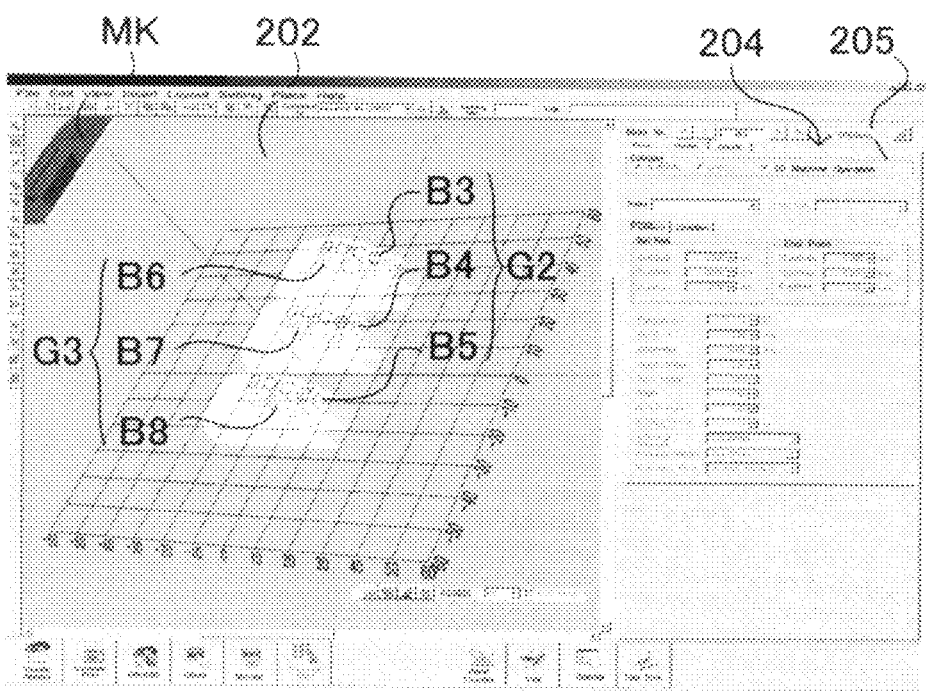
FIG. 64 is a photographic illustration showing an edit display window in which a plurality of print blocks separated away from one another are grouped.
Figure 65:
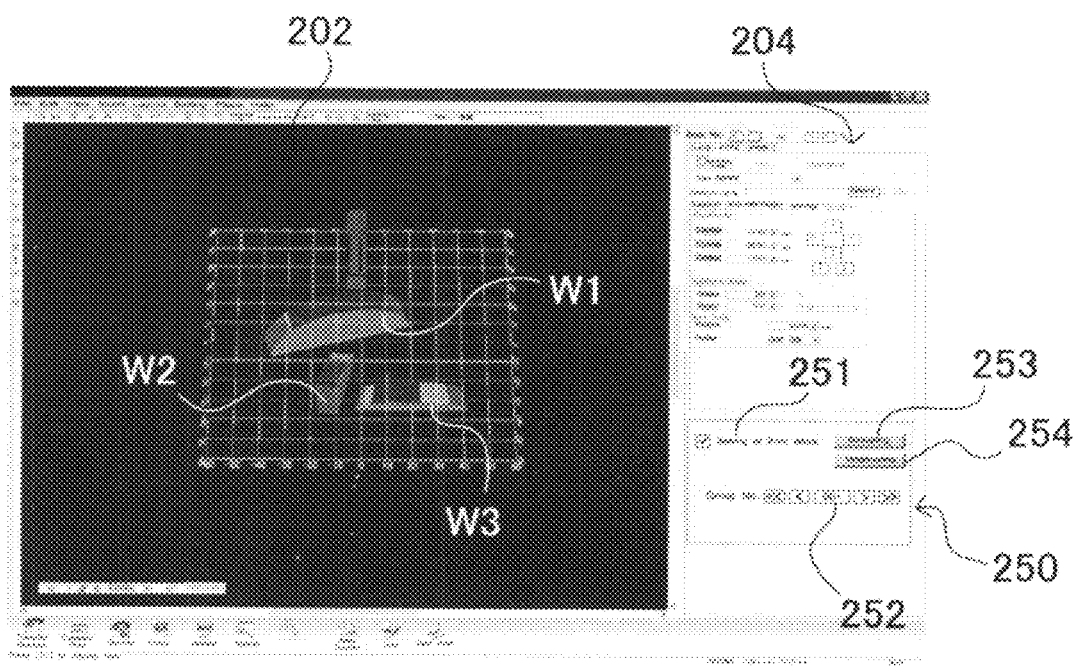
FIG. 65 is a photographic illustration showing an edit display window in which a plurality of print blocks are grouped.

The grouping function is effective not only to group print blocks or print groups adjacent one another but to group print blocks or print groups spaced from one another. As shown in FIG. 64 showing the case where three groups, each of which comprises double character strings "abcde" and "ABCDE", are printed on a surface of a can, three print blocks of character string "abcde" B3, B4 and B5 are grouped into one group G2, and three print blocks of character string "ABCDE" B6, B7 and B8 are grouped into one group G3. This grouping enables to specify print density differently between the character strings "abcde" and "ABCDE". In this way, print blocks can be grouped by printing condition, as well as by print pattern such as characters, logos or the like. FIG. 65 illustrates the case where a plurality of print blocks are grouped into different groups for two or more works. Specifically, as shown, different print patterns are printed on works W1, W2 and W3, and a group of double character strings "abcde" and "ABCDE" is printed on the work W1. The works W2 and W3 may be printed in identical print patterns and under the same conditions. Accordingly, a plurality of works and a plurality of print blocks can be grouped together in any combination. The grouped print blocks or print groups can be ungrouped by pressing Ungroup button 254 in the Grouping dialog box 250 shown in FIG. 59 or selecting the ungroup function in the pull-down menu 257 as shown in FIG. 61. The ungroup function is convenient in a case in which the user wants to ungroup one or more print blocks grouped in one, in order to be specified differently in printing condition from the remaining print blocks.

Referring back to FIG. 14, plane work surface profiling is possibly performed through the work surface profile input means 3A in the following ways.

(1) A method of drawing a three-dimensional work by the use of a 3D graphic design program.

This method uses drawing tools such as a line tool, a curve tool, box tool, etc. functionally similar to existing three-dimensional CAD software, three-dimensional modeling software and drawing software in order to create a three-dimensional graphic image. This method is casually used by users skilled in the task of three-dimensional graphics drawing but is difficult to understand and/or use for users who are unfamiliar with three-dimensional data editing.

(2) A method of defining a three-dimensional work surface profile by specifying geometric parameters in the form of a dialog.

This method uses wizard software to define a three-dimensional graphic image through an interactive dialog. This method is casually used because no knowledge and experience of three-dimensional graphics drawing is required. For example, the method is in need of specifying a work profile and parameters for defining the profile only. Specifically, a user is required only to select a desired work profile from an option menu and to specify parameters for the selected work profile. Necessary parameters to be specified by the user are position coordinates of a control point and a direction of normal vector when an oblique plane is selected, position coordinates of a control point, an outer diameter and a direction of center axis when a column is selected, and position coordinates of a center and a diameter when a sphere is selected.

(3) A method of importing a 3D data file prepared for a work surface profile and converting it.

This method uses a 3D data file of a work surface provided separately by a 3D CAD program and converts it into a 2D data file. Because 3D data files previously provided are available, this method saves a user a lot of labor. In this instance, readable data file formats include various generalized file formats such as a DXF format, an IGES format, an STEP format, an STL format, a GKS format and the like. Furthermore, a format exclusive to an application such as a DGW format may be used for 3D data file conversion.

(4) A method of importing an actual image of a work surface through an image recognition device such as an image sensor.

This method automatically acquires data by importing an image of a work surface through an image sensor or the like.

Figure 18:
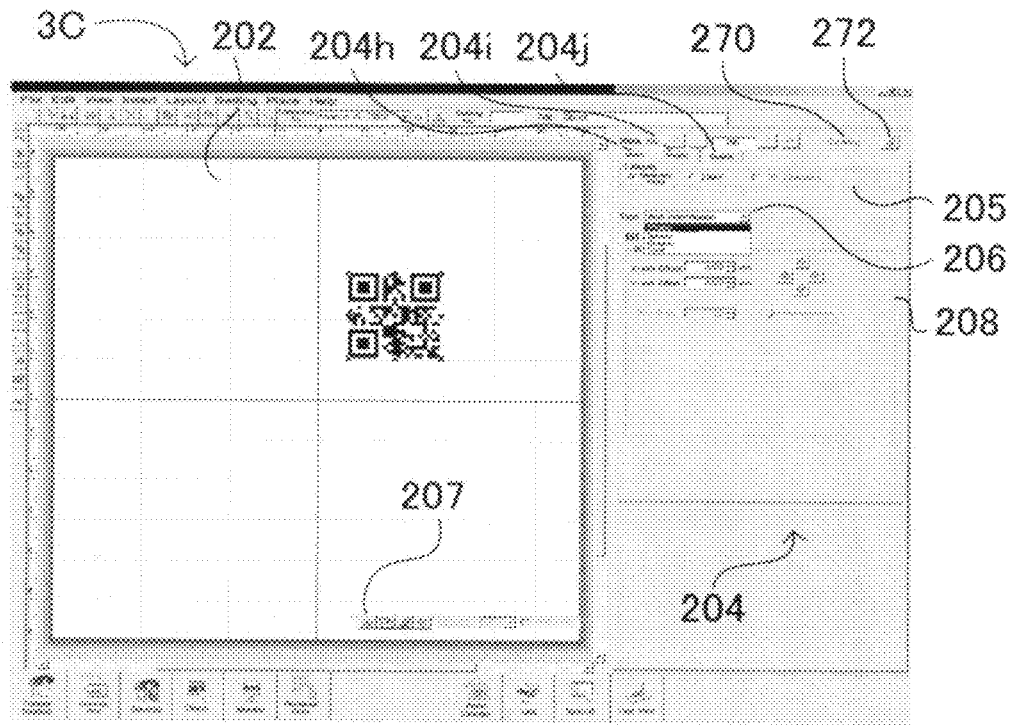
FIG. 18 is a photographic illustration showing the edit display window switched to a 3D edit mode from a 2D edit mode shown in FIG. 14.
Figure 19:
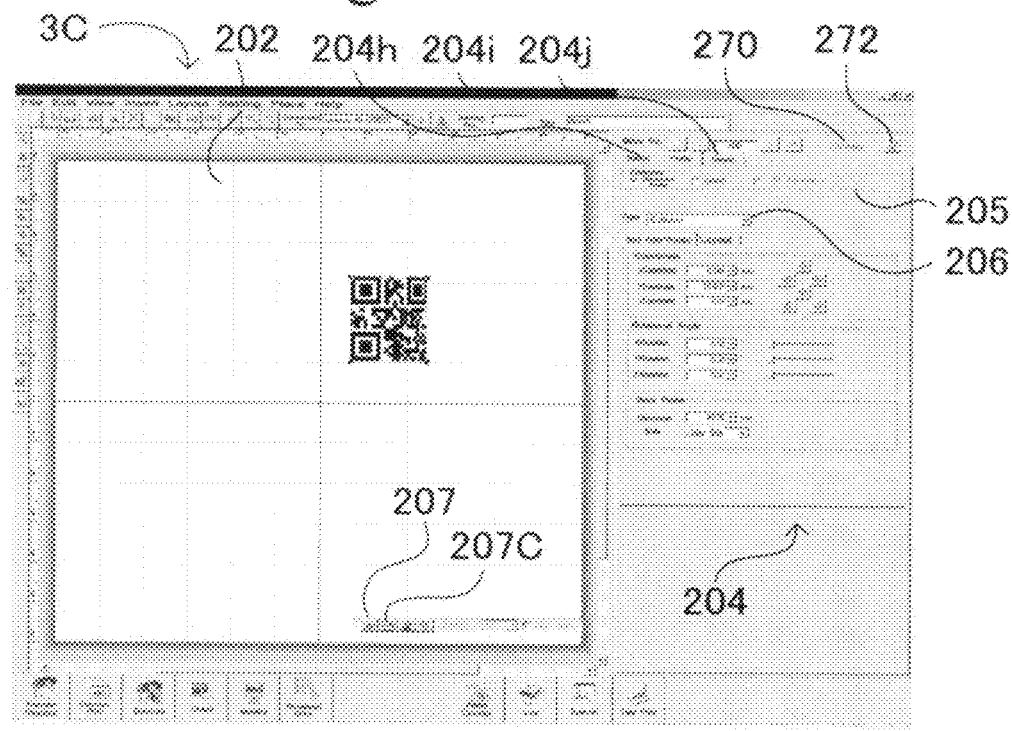
FIG. 19 is a photographic illustration showing the edit display window in a 3D edit mode in which a columnar work is displayed in two dimensions.
Figure 20:
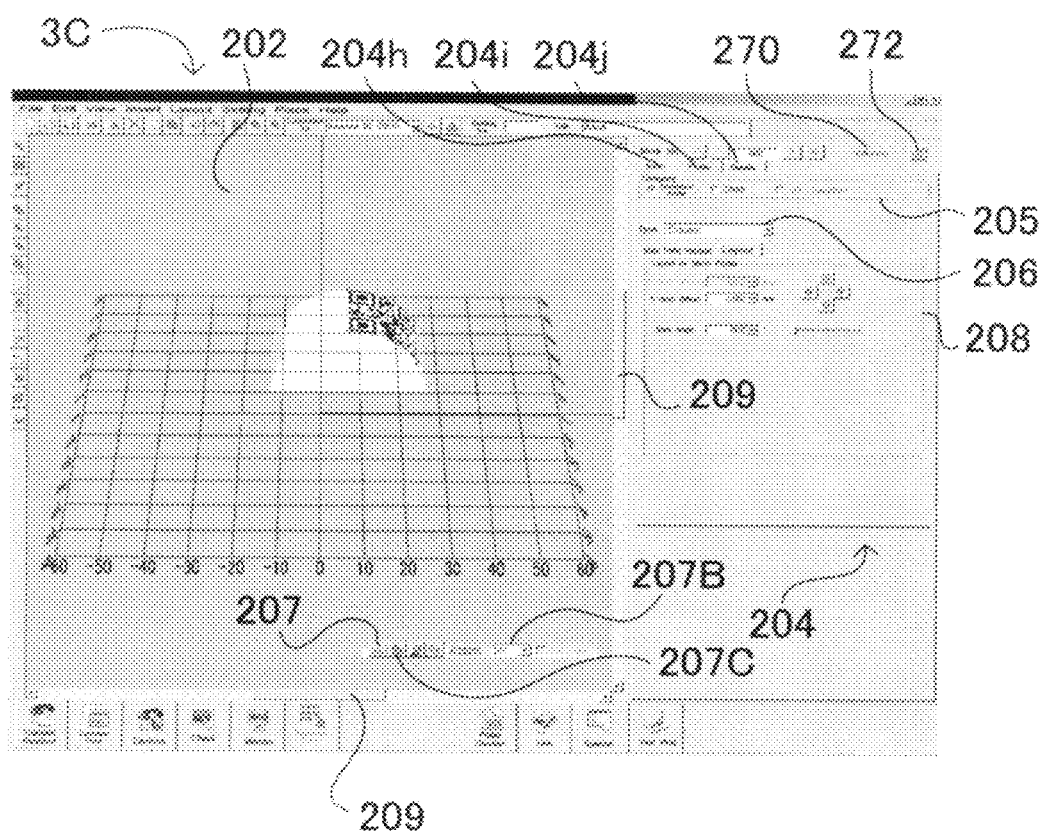
FIG. 20 is a photographic illustration showing the edit display window in a 3D edit mode for laying out print blocks in a 3D view mode.

Referring to FIGS. 18 to 20, the methods (2) and (3) are employed in this embodiment. Specifically, there are provided means for selecting a profile from prepared elemental graphics and means for reading in a data file of 3D profile. When enabling a 3D tab 204*i* in the Print Pattern input dialog box 204 (see FIG. 14), the edit display window shows a profile option box including Elemental, ZMAP and Machine Operation as shown in FIG. 18. The graphics is selected by default. When the Elemental graphics is selected, a pop-up menu 206 appears to list types of Elemental graphics such as a plane, a column, a sphere, a cone, etc. which are highlighted by selection. The plane is highlighted and selected by default. When highlighting and selecting the column as shown in FIG. 19, the edit display windows 202 changes an object from plane-shaped to column-shaped. That is a QR code to be printed on a columnar work surface is displayed in a plane with X-Y coordinate system. In consequence, the displayed QR code diminishes in width as closing to the right end. When the user wants to display an object or work surface in three-dimension, the edit display window 202 is altered from the 2D edit mode to the 3D view mode shown in FIG. 20 by pressing a View button 207A of a tool bar 207, thereby displaying a work surface in three dimensions. The edit display window 202 in the 3D view mode shown in FIG. 20 is altered back to the edit display window 202 in the 2D view mode shown in FIG. 19 by pressing the View button 207A. In this way, the edit display window 202 is alternately changed between the 2D view mode and the 3D view mode. An icon on the View button 207A is altered between a 2D indication and a 3D indication correspondingly to a switch of the edit display window 202 between the 2D view mode and the 3D view mode. The print pattern, i.e. the QR code, is enclosed in a frame or box K in the edit display window 202 in the 3D view mode shown in FIG. 20 similarly in the 2D view mode shown in FIG. 19. The tool bar 207 including the View button 207A is in the form of a floating bar which can be freely shifted within the window. Otherwise, the tool bar may be incorporated in an ordinary fixed tool bar or may be hidden as appropriate.

Figure 2:
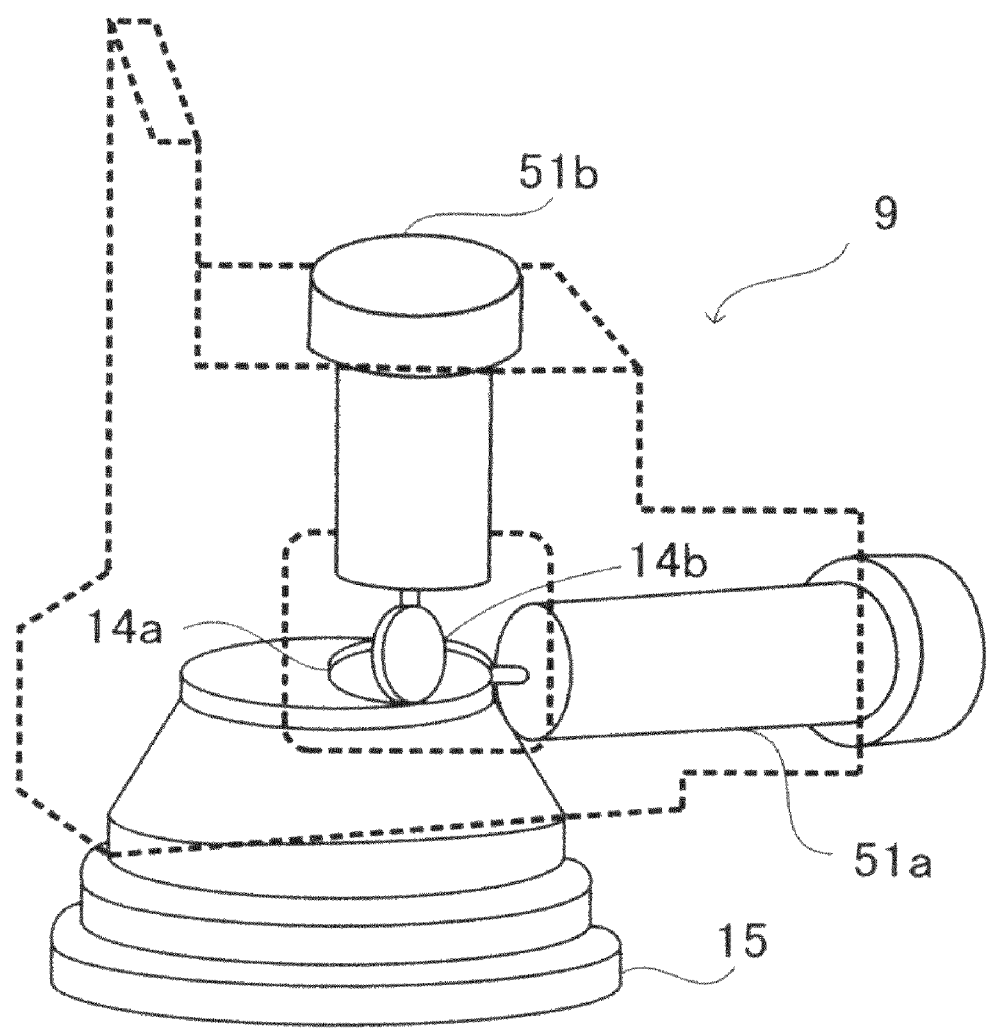
FIG. 2 is a perspective view showing a layout of an X-Y scanner.
Figure 3:
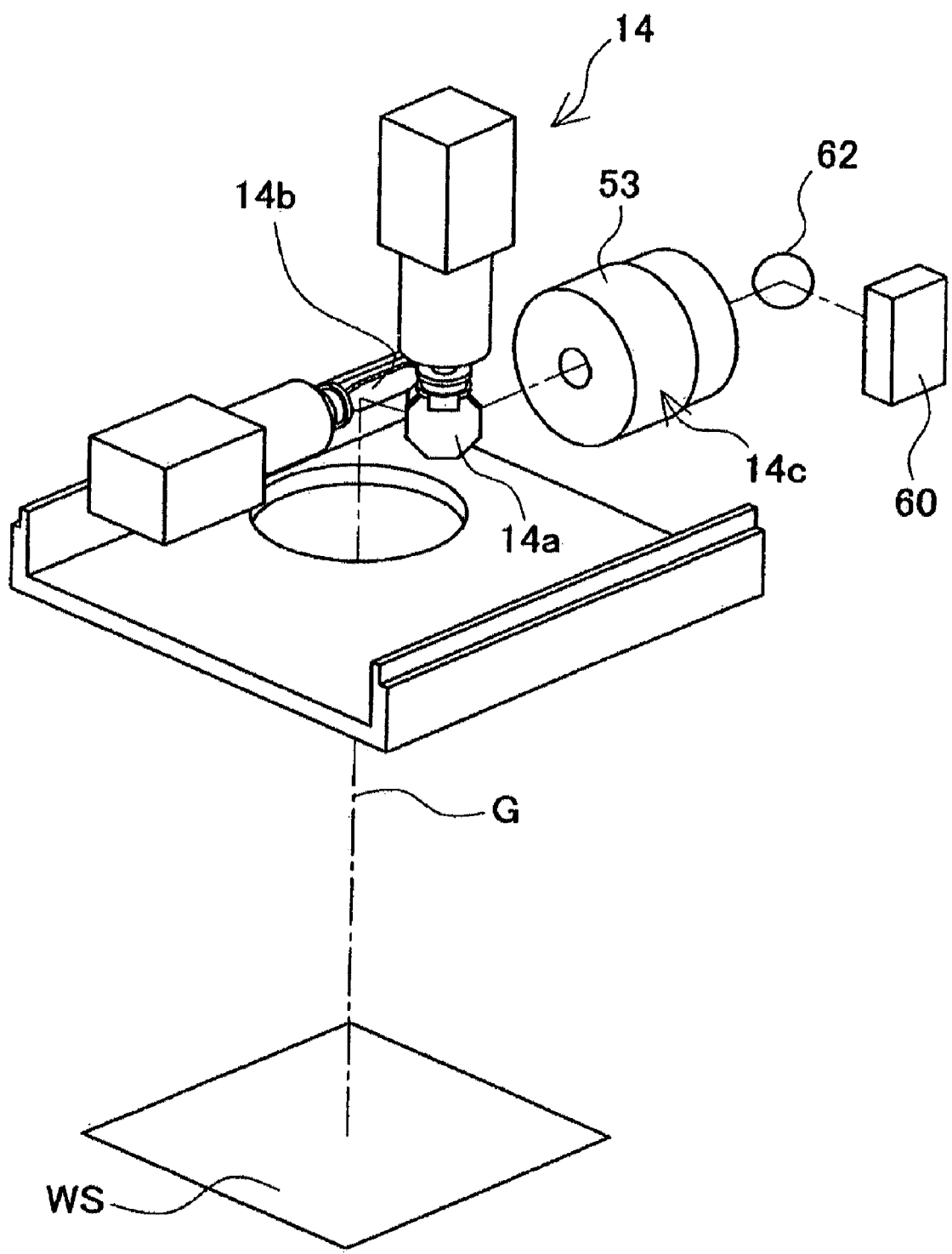
FIG. 3 is a perspective view showing a layout of an X-Y-Z scanner.
Figure 21:
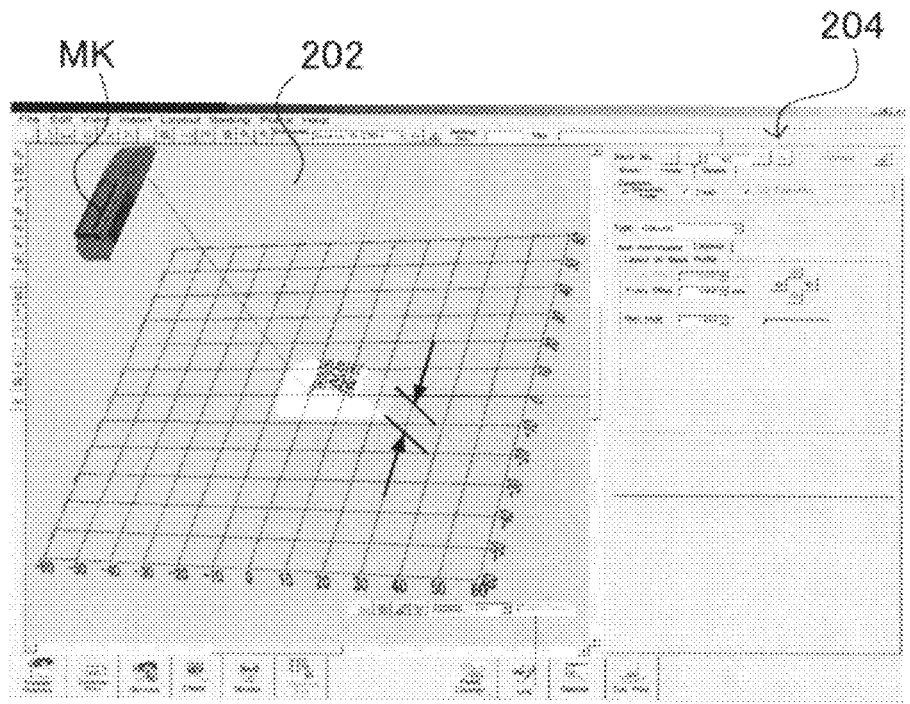
FIG. 21 is a photographic illustration showing the edit display window in which an elemental shape has a height representing laser processing data.
Figure 22:
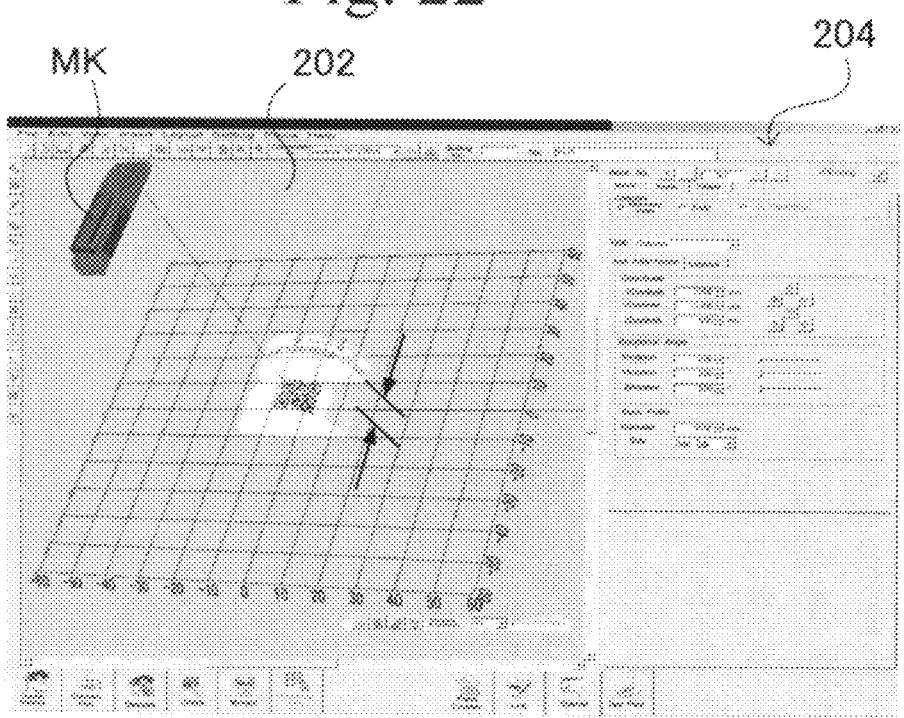
FIG. 22 is a photographic illustration showing the edit display window in a 3D edit mode in which three print blocks are displayed.

When selecting an elemental profile and converting two-dimensional processing data of the selected elemental profile into three-dimensional processing data, the processing data is converted so that the profile has the same height as before the conversion. A graphic representation of the converted three-dimensional processing data is displayed in the object display section 83 of the display unit 82. The feature that the profile after data conversion is the same in height as the elemental profile makes it easy for the user to have the height necessary for the elemental profile of print block visually as shown in FIG. 21. When editing two or more print blocks, it is made easy for the user to seek a layout of them. In particular, while it is practicable to vary height of the elemental profile in the edit display window 202 at the user's discretion because the elemental profile is a virtual graphic, it is difficult to represent a print block over the height if the shape is too short or if a print block actually applied to a work surface narrowly misses a profile of the work if the shape is too high. In light of these difficulties, the elemental profile is adapted to always have the same height as an intended print block so that the user can get hold of the representation of the print image. As shown in FIG. 22, when printing two or more print blocks on a columnar work surface, it is easy to get hold of distances between the print blocks. It is practicable to make the program have a function of automatically calculating distances between print blocks and indicating the distance. The term "height" as used herein shall mean and refer to a length or distance in the Y-direction as viewed in an X-Y plane in FIG. 2, and the term "breadth" as used herein shall mean and refer to a length or distance in the X-direction as viewed in the X-Y plane in FIG. 21.

Figure 23A:
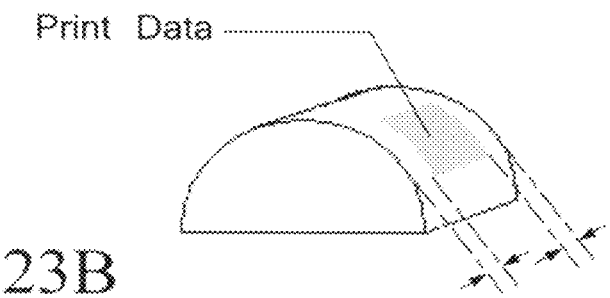
FIGS. 23A and 23B are schematic perspective illustrations showing an elemental profile with margins in a longitudinal direction.
Figure 23B:
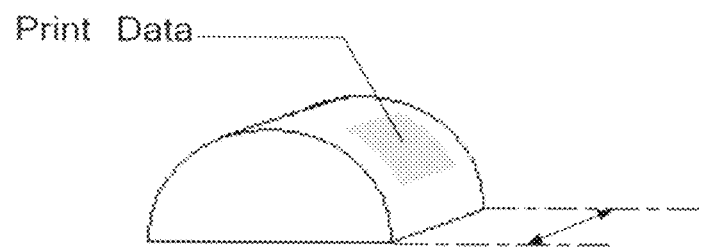

It is also practicable to make an elemental profile have the same height as a print block, and besides setting margins in a work surface. As shown in FIGS. 23A and 23B showing three-dimensional representations of printed work surfaces, margins are set in the work surface at upper and lower sides thereof by specifying a height higher for an elemental profile than for a print block. The margin can be used for providing a tolerance to a print block position, besides adjusting a space between adjacent print blocks.

Figure 24:
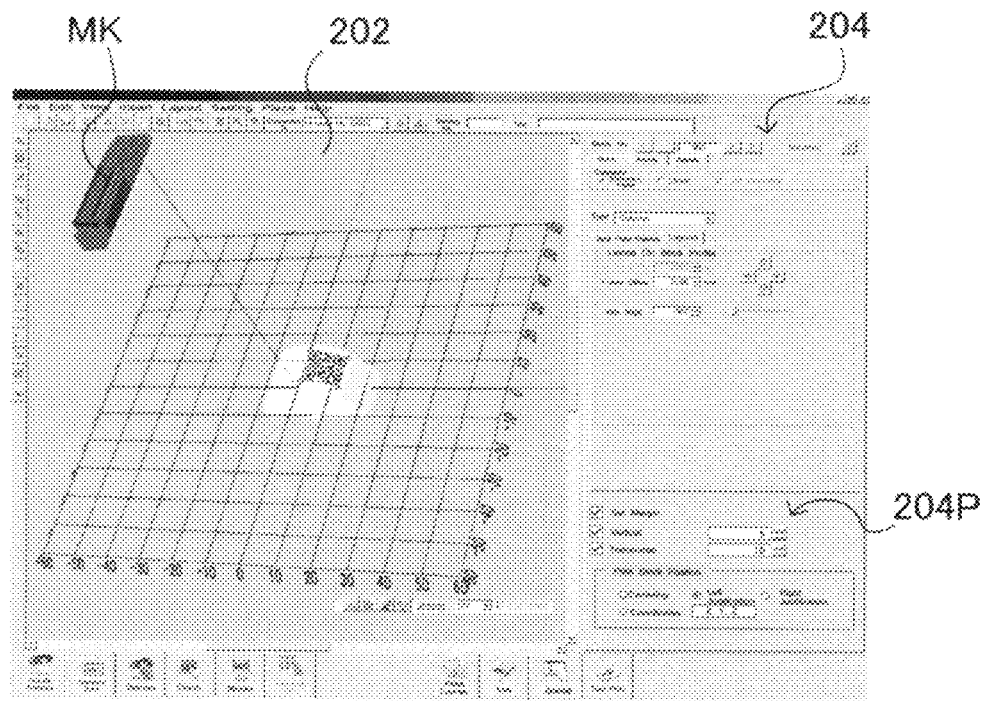
FIG. 24 is a photographic illustration showing the edit display window in a 3D edit mode for margin setting.

Furthermore, it is practicable to set margins in a work surface at opposite ends thereof as shown in FIG. 24. For setting margins, the Print Pattern input dialog box 204 includes Margin Set dialog box 204P. After choosing the Margin Set dialog box 204P, an elemental profile are defined by height and diameter by entering numerical values in Details dialog boxes 204Q. Otherwise, it is practicable to specify a margin by entering an absolute value of an intended margin width or a margin ratio (e.g. 10%) which is a relative value such as a percentage of a width of the margin with respect to the height of a print block. When completing the entry of details, the representation of the editing object in the edit display window 202 changes according to the details for quick visual checking by the user.

Figure 25:
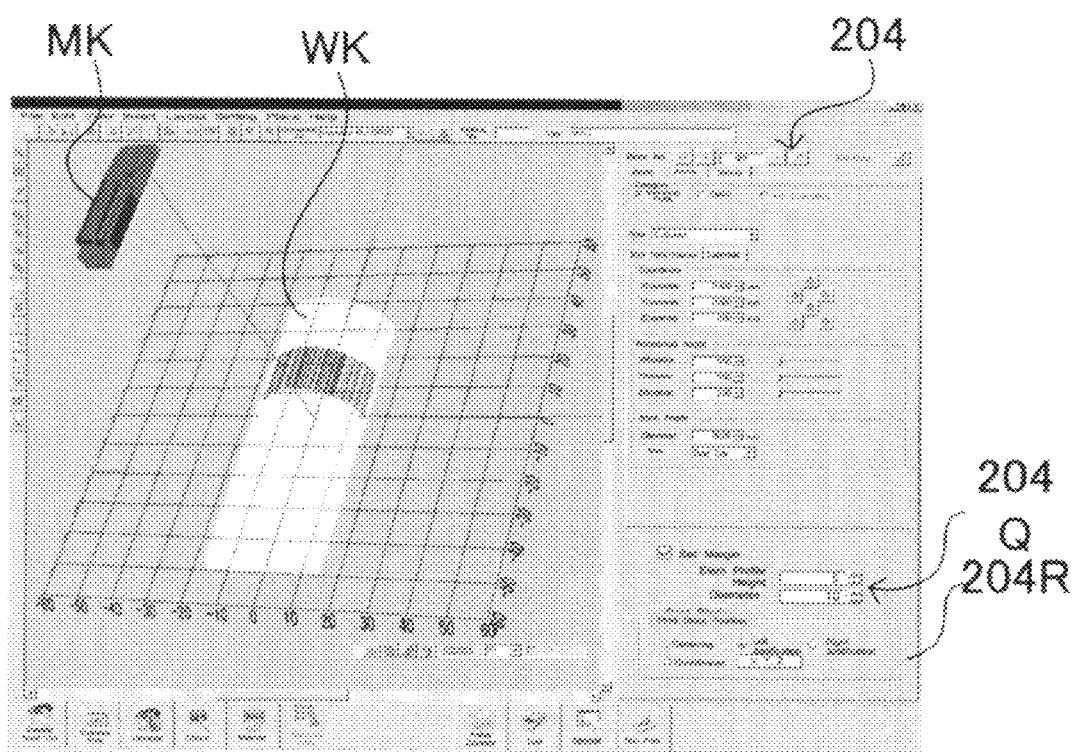
FIG. 25 is a photographic illustration showing a processing condition setting section for specifying a height of margin.

Margins may be set based on margin sizes as shown in FIG. 23A or based on a height of an elemental profile as shown in FIG. 23B. Furthermore, it is practicable to specify an elemental profile greater in height and breadth than a print block so as thereby to permit a layout of the print block on the elemental profile. For example, a print block can be centered in a direction of height, shifted right or left and/or justified right or left in a direction of breadth, and besides disposed in a specified position by specifying an absolute position (for example a position 50 mm from the top of an elemental profile) or positional coordinates, and an angle (for example an angle of −90° of a left end of the print block with respect to an horizontal plane). It is also practicable to represent a print block itself in the same profile as an elemental profile. As shown in FIG. 25 by way of example, when representing a print block on a can-shaped work WK, an elemental profile is defined by height and diameter by entering numerical values in Details boxes 204Q so as to match a print block in profile with a can-shaped work WK. Further, a printing position in which the print block is located on the can-shaped work surface WK is specified by entering positional coordinates in a Coordinate box 204R Representation of the print block on the can-shaped work surface makes visual checking by the user quite convenient.

A default position for transforming two-dimensional print data into a columnar profile such as a column or pasting of two-dimensional print data to a three-dimensional work surface is previously specified in advance by the initial position setting means 80L. When displaying three-dimensional laser processing data on the object display means 83, the initial position setting means 80L determines an initial position for the laser processing data to be laid on an object work surface. In an example shown in FIG. 19, a start angle θ is set to −90°. The term "start angle" as used herein should refer to a clockwise angle from a reference plane which is, for example, a Y-Z plane shown in FIG. 44. This provides a layout exceptionally excellent in visibility and printing precision.

A default initial position or print start position can be specified for an elemental profile used to generate three-dimensional laser processing data. FIGS. 26A, 26B and 26C show initial positions when selecting a columnar object, a circular conic object and a spherical object as elemental profiles, respectively, in the pop-up menu 206 (see FIG. 18). An X-Y-Z coordinate system having an X-Y plane which is a window plane and a Z-axis in a direction of object height is used as a standard therein. The columnar object shown in FIG. 26A has a radius R and reference positions X=0, Y=0 and θ=90° for laser processing data. The conical object shown in FIG. 26B has a base circle having a radius R and reference positions X=0, Y=0 and θ=90° for laser processing data. The spherical object shown in FIG. 26C has a radius R and reference positions X=0, Y=0 and θ=90° for laser processing data. Like this, the default start angle θ set to 90° locates laser processing data in a position better suited for printing and provides enhanced visibility of the laser processing data. As shown in FIG. 27, when creating a new print block, a print start position for the print block is coincident with a home position of a laser beam emanating from the marking head 150. As a consequence, a default initial position for a new print block is located in an optimum position with respect to the marking head 150.

As just described above, it is facilitated and made easy and highly precise to print a columnar work surface from above by the marking head by specifying an initial position or print start position at a crest of the columnar work surface by default. Since the crest of the columnar work surface clears the way for visual recognition, the user is enabled to get hold of a relative position between the marking head and the work surface quite easily. In particular, although it is feared that the user looses sight of a print start position after conversion when converting two-dimensional laser processing data into a three-dimensional profile, such a fear is avoided by specifying a distinctly recognizable position by default, so as thereby to enable the user to take user-friendly setup steps for printing. As will be described later, in the case where an unprintable work surface area is hidden, when laser processing data is sized with the unprintable work surface area, the laser processing data is not displayed in an initial state. However, the function of specifying a print start position which brings about precise print in an initial state avoids this problem, and besides raising the possibility that laser processing data are displayed even when laser processing data are sized with an unprintable work surface area and specifying a layout excellent in visibility and printing precision by default.

Figure 28:
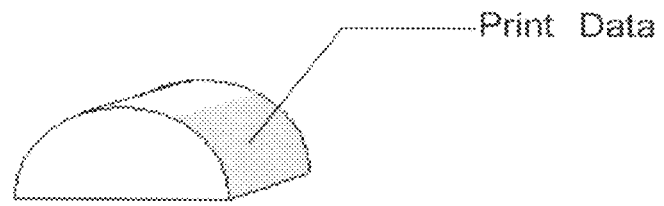
FIG. 28 is an illustration showing an initial position of a representation of laser processing data which is right justified.
Figure 29:
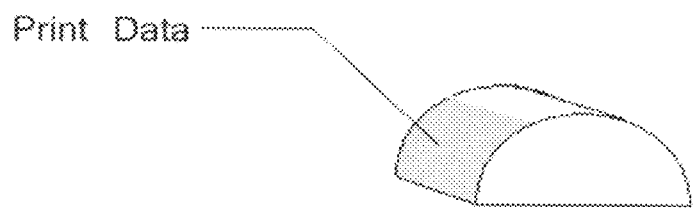
FIG. 29 is an illustration showing an initial position of a representation of laser processing data which is left justified.
Figure 30:
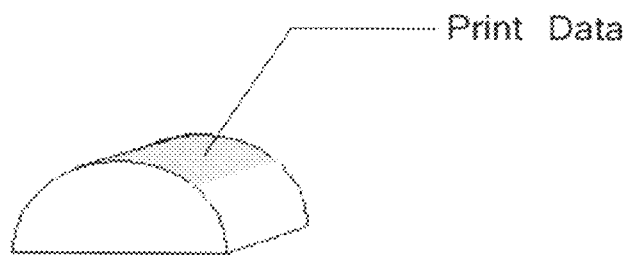
FIG. 30 is an illustration showing an initial position of a representation of laser processing data which is centered.

It is practicable to specify a default initial position or print start position common to all elemental profiles as shown in FIGS. 28 to 30, as well as according to elemental profiles. In layouts shown in FIGS. 28 to 30, laser printing data is right-justified, left-justified and centered with respect to an elemental profile, respectively. Printed patterns are easy to read when printing character strings having different lengths in the left-justified layout and when printing numeric character strings having different lengths in the right-justified layout. Like this various layouts can be employed according to printing purposes and applications. It is practicable to specify a default initial position or print start position in consideration of an unprintable work surface area. For example, it is not prevented to practice right-justification, left-justification or centering of a print block after fixedly defining a printable work surface area so as thereby to exclude unprintable and defective work surface areas from the whole work surface area. Otherwise, when a representation of laser processing data is greater and cuts across a printable work surface area even partly, it is practicable to prohibit a display of the laser processing data to display an unprintable work surface areas in red, or to display a message indicating the impossibility of automatic layout, on the object display section 83 of the display unit 82 after interrupting automatic layout, and thereafter, to prompt the user to try another layout.

Figure 31:
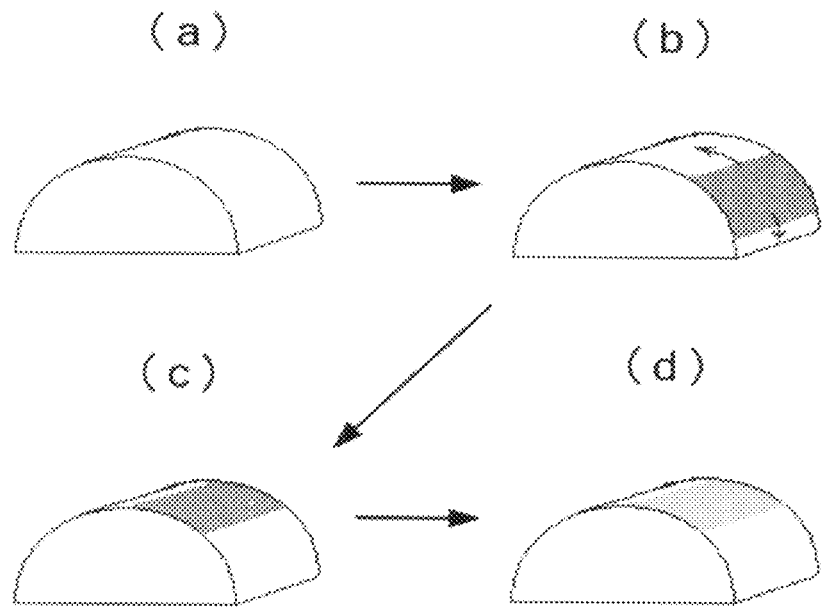
FIG. 31 is illustrations showing a sequence of specifying an initial position.

As shown in FIG. 31, it is also practicable for users to specify an initial position by (a) converting laser processing data into a selected elemental profile, (b) adjusting an initial position of the laser processing data, (c) fixing the initial position and then storing the data in the initial position setting means 80L, and (d) adopting the initial position of the laser processing data for the elemental profile in succeeding operation. The adjustment of initial position can be performed by dragging the laser processing data, as well as by entering numerical values. The initial position may be specified by an elemental profile, or otherwise commonly to all elemental profiles, by the user. Furthermore, a polarity of initial positions may be prepared and selected as usage. This way enables the user to specify an appropriate initial position by use, so as to realize flexible and adequate layout.

Figure 32:
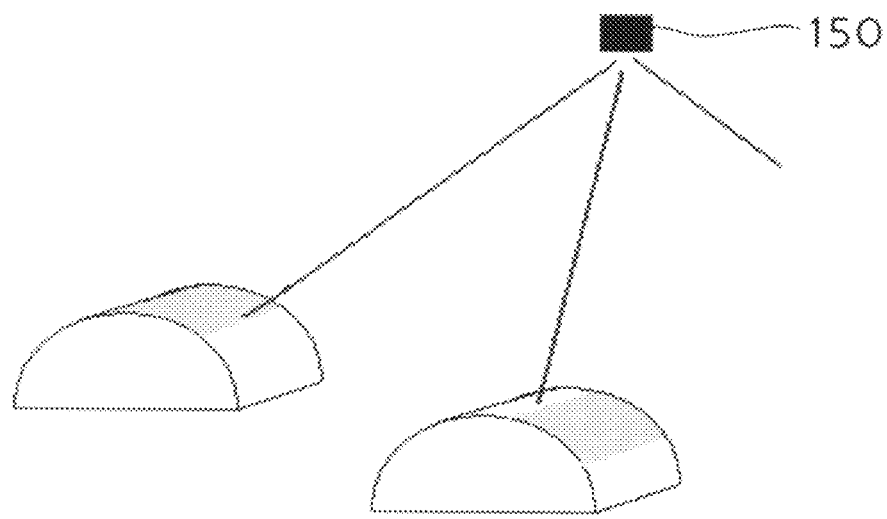
FIG. 32 is an illustration showing how to specify an initial position according to an incident angle of a laser beam incident upon a work.

As shown in FIG. 32, it is further practicable to specify an initial position or print start position according to incident angles of a laser beam upon work surfaces. When a single laser beam from the marking head 150 scans a plurality of work surfaces, the printable work surface areas of the work surfaces are different from one another according to relative positions between the marking head 50 and the work surfaces, and hence incident angles of a laser beam incident upon the work surfaces. In such a case, it is possible to realize layouts offering enhanced print precision and visibility, not by specifying an initial position commonly to all the elemental profiles, but by specifying appropriate initial points according to printable work surface areas of the elemental profiles.

Figure 33A:
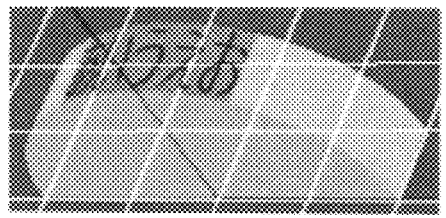
FIGS. 33A and 33B are photographic illustrations showing manual adjustment of a print start position.
Figure 33B:
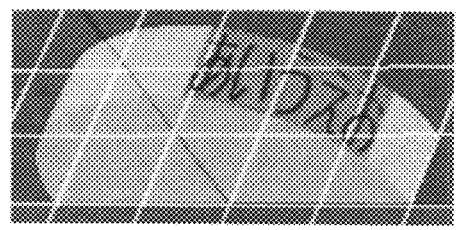

As shown in FIGS. 33A and 33B, the user can adjust such a default initial position or print start position so as to lay laser processing data on an elemental profile in a desired position. FIG. 33A shows a default initial position in which a print block is centered on a columnar work surface, and FIG. 33B shows a default initial position in which a print block is right-justified on a columnar work surface. The layout adjustment is performed by specifying layout parameters such as a start angle and offsets in X, Y and X coordinates in parameter boxes in a Layout dialog box 208 which appears when pressing a Layout tab as shown in FIG. 20. If a change in printing data layout is followed by a change in laser beam incident angle, it is not improbable that the print data is laid on an area inappropriate for precise printing. For this reason, the user-oriented layout adjustment brings about an optimum position for quality printing. In this instance, the start angle θ specified in the Layout dialog box 208 remains unchanged irrespective of alterations in position and orientation of a work surface. In particular, visibility and quality of print is maintained by specifying a start angle θ of −90° as a default start position.

Figure 34:
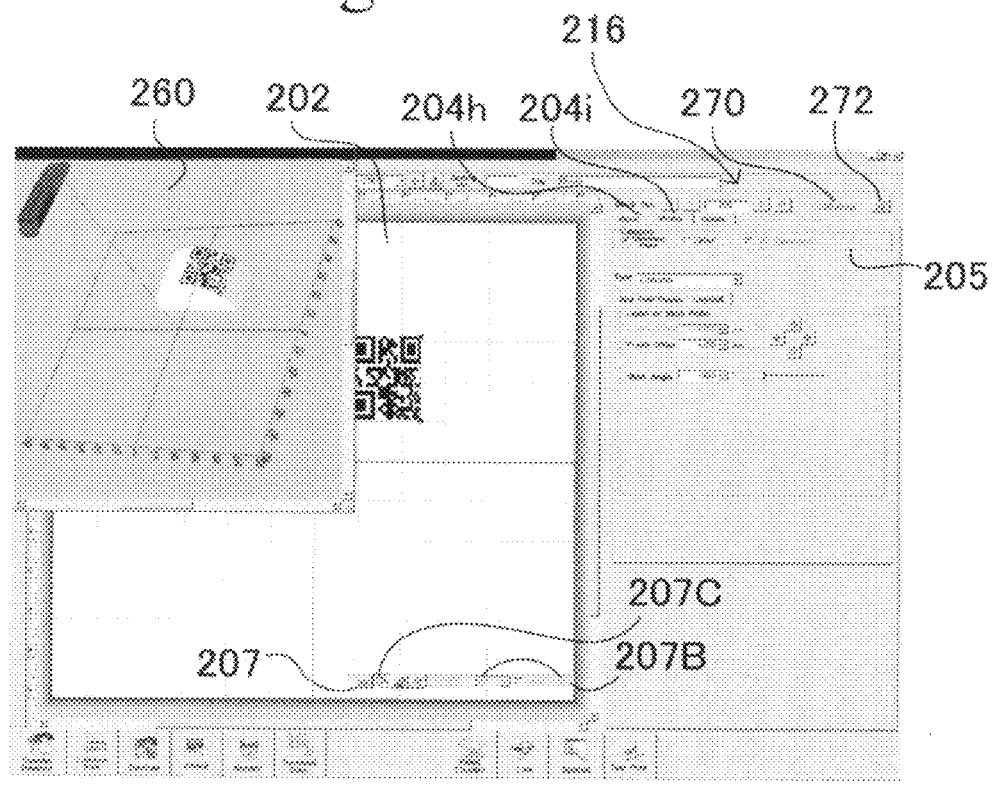
FIG. 34 is a photographic illustration showing a three-dimensional viewer on which a work is displayed in three dimensions.

In the above embodiment, the edit display window 202 is switched over from the 2D edit mode to the 3D edit mode, and vice versa. In the case where it is desired to display same objects (same work surfaces) in both two dimensions and three dimensions, respectively, the laser processing data setting program provides a 3D viewer window 260. When selecting a 3D Viewer Open button 207C in the floating tool bar 207 in the edit display window 202 in the 2D edit mode, a 3D viewer window 260 appears over the edit display window 202 as shown in FIG. 34. The 3D viewer window 260 can be moved to any desired location on the screen by dragging its title bar or any portion thereof and changed in size. As will be described later, an object (work) can be changed in position, rotated and scaled as desired. Since it is not required to open the 3D viewer window 260 while the edit display window 202 is in the 3D edit mode as shown in FIG. 20, the 3D Viewer Open button 207C in the floating tool bar 207 grays out and is disabled to prevent erroneous operation. It is also possible to display a 2D viewer window separately from the edit display window 202. The 3D viewer window 260 may be changed in layout, size and position as desired. In this way, the edit display window 202 and the 3D viewer window 260 are used for the object display section 83 of the display unit 82.

When displaying a printing area specified on a three-dimensional work surface in three dimensions together with the work surface profile, it is visually checked up whether the printing area falls in an appropriate printable location relative to the work surface. A work surfaces is differently colored between a work surface area upon which a laser beam impinges at angles in a predetermined range for appropriate print quality (a printable work surface area) and a work surface area upon which a laser beam impinges at angles and is expected to be printable but defective in print quality (a defective printable work surface area). Specifically, the printable work surface area remains uncolored, and the defective printable work surface area is colored red. In this way, it is visually checked up on whether a specified print area falls thoroughly within a printable work surface area and which part of a specified print area cuts across a defective printable work surface area even partly. In the case where a work surface including a print area is at a far side from laser irradiation, the print area is hidden in the edit display window 202 in the 3D edit mode so as thereby to indicate that the specified print area is unprintable (an unprintable work surface area). This function signals the user a relative position of the work print area with respect to a work surface and prompts the user to correct the print area. This function is not linked to the above means. Any visual checking means known to those skilled in the art can be available for indicating a printable work surface area, a defective printable work surface area and an unprintable work surface area. For example, these work surface areas may be indicated by text messages on the edit display window 202, by voice messages or by an alarm. It is practicable to indicate one of the three situations, for example, an unprintable work surface area that the user wants to know.

In this instance, an incident angle of laser beam that distinguishes a printable work surface area and a defective printable work surface area from each other is specified by a default initial angle, or otherwise may be specified by entering another angle in an entry box additionally provided in the edit display window 202. Specifically, laser processing of a work surface is limited and made difficult depending upon irradiation angles and lowers its precision as an irradiation angle θ with a normal line of the work surface comes close to 90°. A critical irradiation angle or higher limit angle (processing limitation angle) is ordinarily fixed to 60° and may be, however, adjusted by the user.

In this way, it arises in three-dimensional printing according to work profiles and relative position between a work surface and a laser beam that some work surface areas are unexposed or exposable or only insufficiently exposable to the laser beam, in other words, unprintable or only defectively printable. Therefore, it is practicable to calculate a printable work surface area based on these factors and to caution the user to try another setting when representation of laser printing data falls within an unprintable work surface area. This calculation is performed in the arithmetical and logic unit 80. The arithmetical and logic unit 80 enables the defective surface area detection device 80B to detect a defective work surface area by performing calculations, the processing condition adjusting means 80C to adjust printing conditions so as to make the defective printable work surface area well printed, the highlighting device 80I to highlight the defective printable work surface area detected by the defective surface area detection device or unit 80B so as thereby to display it differently from a printable work surface area, and the warning device means 80J to provide a warning that a print pattern set by the processing condition setting means 3C cuts across even partly a defective printable work surface area.

The highlighting device 80I highlights a defective printable work surface area of a work surface in the edit display window 202. As shown in FIG. 20, a work surface area close to a root of a columnar work surface which is only defectively printable due to a narrow angle of a laser beam incident thereupon is displayed in red. Further, an unprintable work surface area is a work surface area that is at a far or hidden side of the work from laser irradiation and, thus, hidden from laser irradiation. The defective printable work surface area and the unprintable work surface area are calculated by a defective surface area detection device or unit 80B. When a specified print pattern cuts across even partly an unprintable work surface area and is consequently unprintable, the warning device means 80J makes the print pattern disappear from the edit display window 202 so as thereby to prompt the user to try another layout. For example, the warning device means 80J hides a print pattern when the print pattern cuts across even partly a work surface area specified at a far side of the work from laser irradiation and displays a print pattern in red when it falls on a defective printable work surface area. In this way, work surface areas are categorized not simply by printable and unprintable, but a plurality of grades of print quality such as good quality, flawed quality and unprintable. This categorization of work surface area provides the user with detailed information about the layout.

Figure 35:
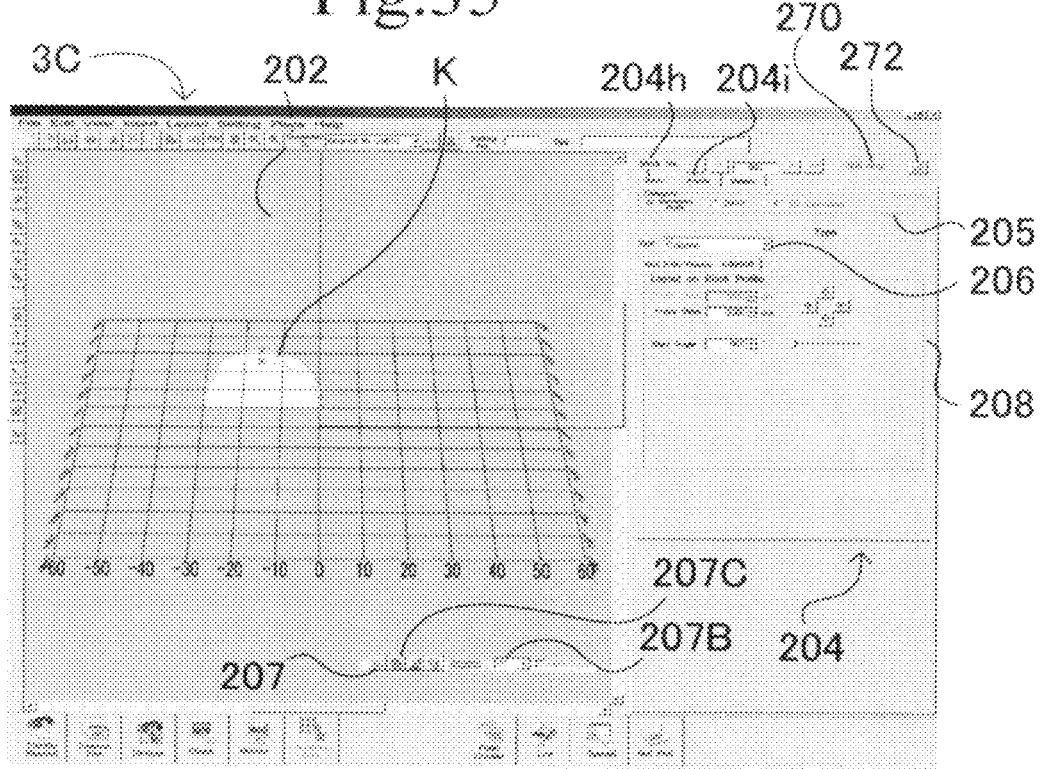
FIG. 35 is a photographic illustration showing an edit display window in a 3D edit mode in which an unprintable area of a work is displayed.
Figure 36:
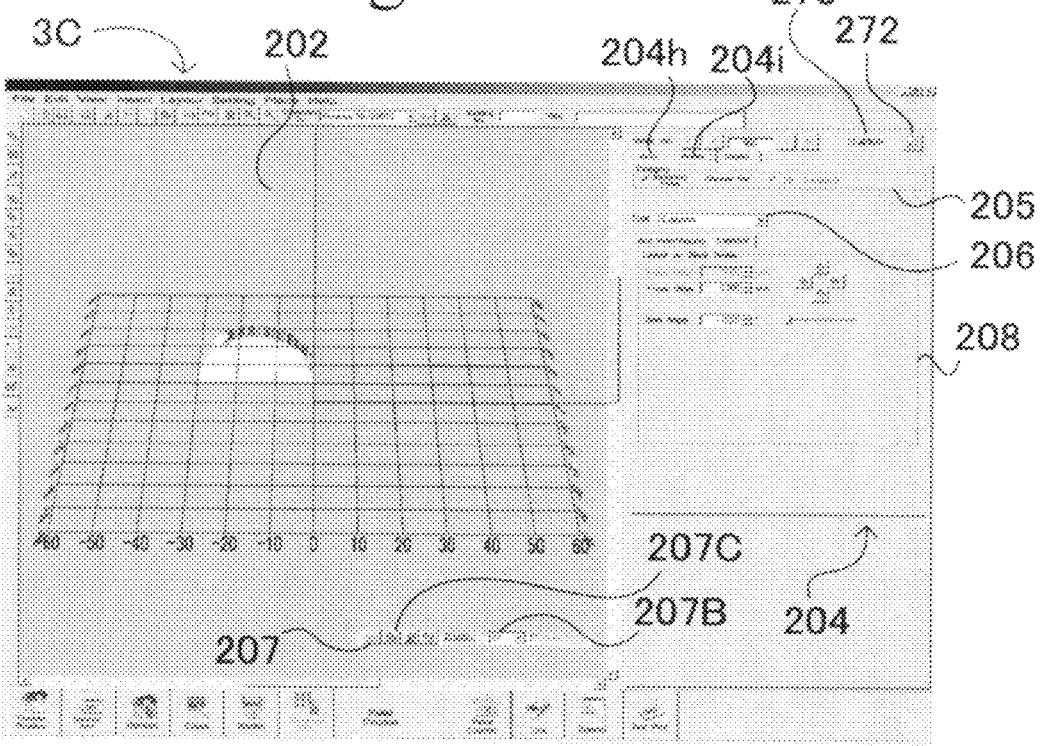
FIG. 36 is a photographic illustration showing an edit display window in a 3D edit mode shown in FIG. 35 in which a print pattern adjusted in a print start angle is displayed.

FIGS. 35 and 36 show print patterns, i.e. barcodes K, that cut across even partly unprintable work surface areas. Therefore, the warning device means 80J hides the print pattern in the edit display window 202. In this event, the printing position is adjusted so as to lay the print pattern in a printable work surface area. On that account, as shown in FIG. 35, the Profile Setting tab 204i is enabled to open the Layout dialog box 208 in which a print start angle is changed from 90° (a default angle) to 120°. As a result, the barcode is displayed as shifted as shown in FIG. 36. In this way, a print pattern is set up by adjusting a print start position, a work surface area, a narrow space width, a line thickness and the like so as thereby to be accurately printed. This adjustment may be performed not manually but automatically by the processing condition adjusting means 80C.

Figure 37:
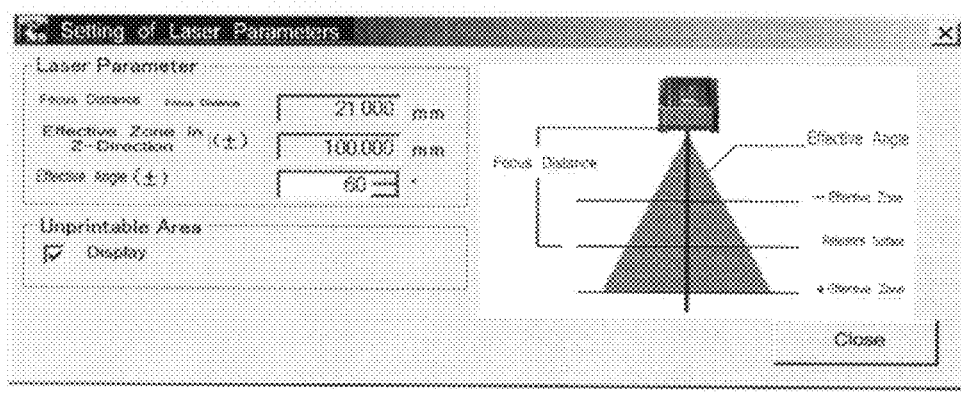
FIG. 37 is a photographic illustration showing printing a laser parameter setting dialog box.

FIG. 37 shows a Settings dialog box for setting laser parameters in which the function of highlighting an unprintable work surface area by the highlighting device 80I can be enabled and disabled. The function of displaying an unprintable work surface area is disabled by clearing a Enable Unprintable Work surface area Display check box in the Settings dialog box. In the Settings dialog box, laser parameters such as a focal distance, an effective range in a Z direction and an effective angle (a critical irradiation angle) are checked and adjusted as appropriate. In addition, a printable work surface area can be specified in size and position when a defective printable work surface area and an unprintable work surface area are detected by the defective surface area detection device 80B. On that account, the warning device means 80J is enabled to display data on coordinate limits of a work surface area and a maximum printable size in the display unit 82. A numerical display of settings can be utilized as an indicator of resetting by the user and provide easy-to-operate circumstances.

The warning device 80J hides a print pattern in the object display section 83 when the print pattern detected by the defective surface area detection device 80B cuts across at least partly a defective printable work surface area. In the past, in order to ascertain that printing work will not be performed correctly by a laser processing machine capable of processing in three dimensions due to improper printing conditions, the only way was to actually print for visual checking, or otherwise, a way to ascertain printability by the controller of a laser marking machine after transferring data on printing conditions into the memory of the controller and extracting the data Printing conditions are determined by specifying a profile of work (e.g. column, cone, sphere, etc.) and a print pattern (e.g. a character string) to be printed on the work. Since a printable pattern size (printable work surface area) depends on parameters such as a work size and a diameter, it is necessary to specify a print pattern smaller than these parameters. However, in the past, users could not know whether a print pattern falls within a printable work surface area during printing conditions setting operation, and, in consequence, the best the user could do was to check for errors only after transfer and extraction of data on the printing conditions that are determined by specifying a work profile and a print pattern. Since transfer and extraction of data is a time consuming operation, the conventional approach was inconvenient.

On the contrary, according to the present invention, the warning device means 80J realizes the function of informing the user whether printing is possible or not and whether the printed result will be good or bad during printing conditions setting operation. Practical informing means is to indicate a printable pattern size at the instant of specifying a work profile, a print pattern size at the instant of setting it, or a work profile and a print pattern combined together.

Figure 86:
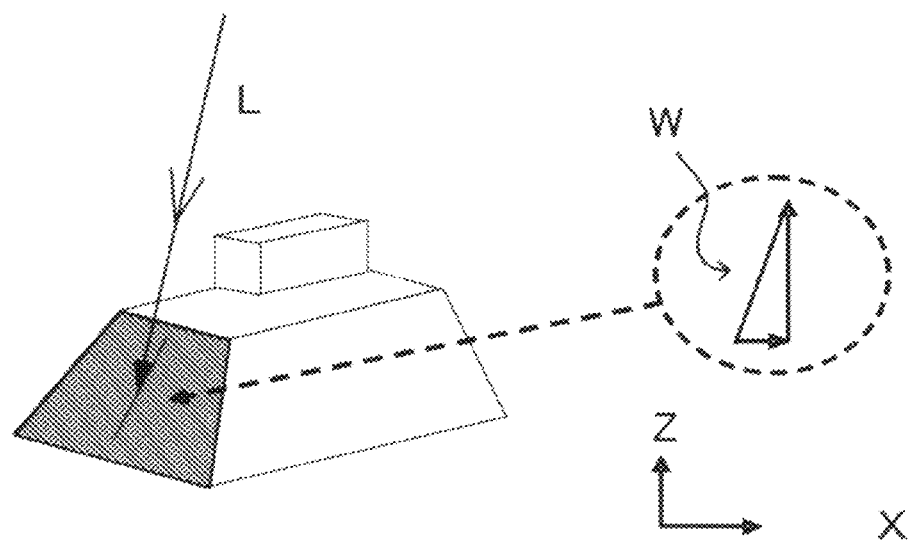
FIG. 86 is a photographic illustration explaining an occurrence of a defective area of a work due to a difference in scanning speed between three scanners.
Figure 87:
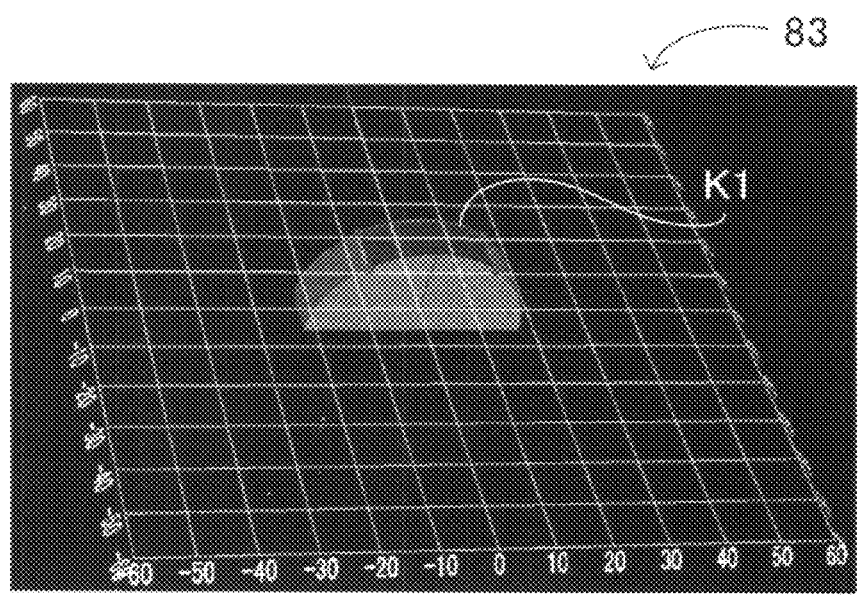
FIG. 87 is a photographic illustration showing a printable print block on a work.

FIG. 86 shows an example of a representation of a printable pattern size in the object display unit 83 at the instance of specifying a column as a work surface area. Therein print will be degraded due to a narrow incident angle at which a laser beam impinges and is detected as a defective printable work surface area by the defective surface area detection device 80B and displayed in red by the highlighting device 80I. Coincidentally, a printable work surface area is displayed by a frame K1 showing a pattern size printable on a columnar work surface by the warning device 80J. The frame K1 can be represented by a line different in color, thickness and/or style from an object for enhanced visibility and distinction of the printable work surface area.

Figure 88:
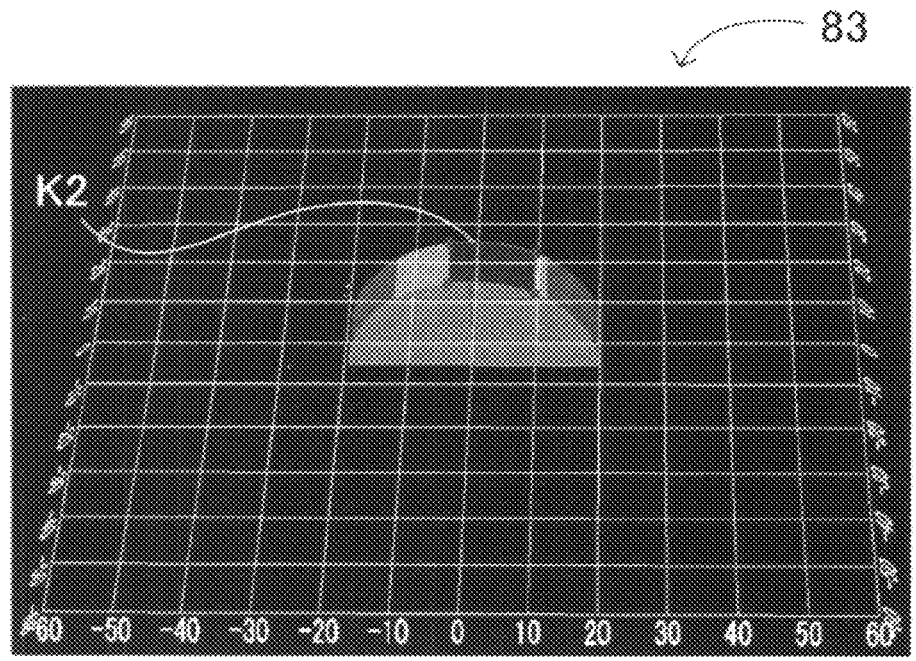
FIG. 88 is a photographic illustration showing a user specified print pattern.

FIG. 88 shows an example of a print pattern size in the object display section 83 at the instance of specifying it. When a size of a print pattern is specified by the user, a frame K2 having the same size as the print pattern is displayed on a work surface. Accordingly, a print pattern size currently specified is reflected in the representation in the object display section 83 for immediate visual checking. It is checked up by the user that there is no mixture between the defective printable work surface area colored red and the frame K2 and that print is expected to be made appropriately.

Figure 89:
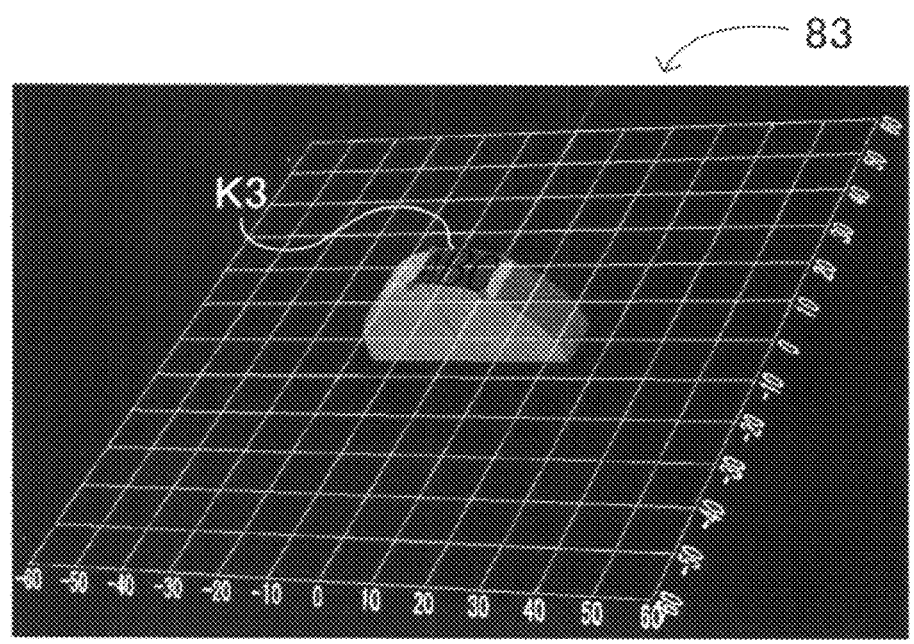
FIG. 89 is a photographic illustration showing a print pattern and a pattern size.
Figure 90:
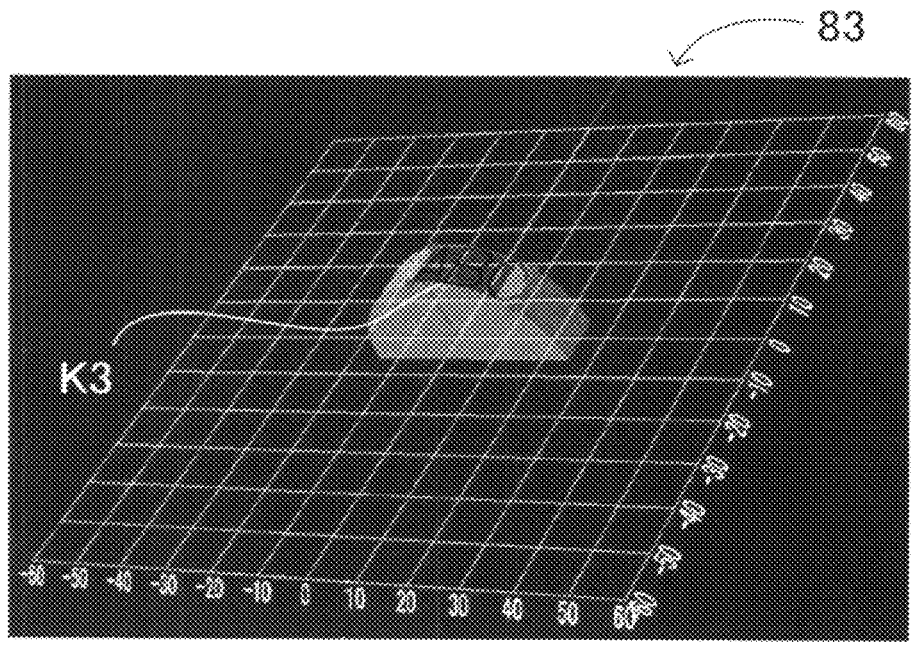
FIG. 90 is a photographic illustration showing a print pattern cutting across a defective work surface area.

FIGS. 89 and 90 show examples of representations of a print pattern and a work surface in combination in the object display section 83. Because the representation includes a print pattern, such as a character string "ABC", as well as a frame K3 indicating a print pattern size, the user can ascertain a virtually printed print pattern with enhanced visibility. In FIG. 89, it is checked up that the character string "ABC" in the frame K3 does not cut across even partly the defective printable work surface area colored red. On the other hand, in FIG. 90, it is checked up that the character string "ABC" in the frame K3 cuts across even partly the defective printable work surface area colored red. When such an interference between a print pattern and a defective printable work surface area occurs, it is practicable to display a text message as shown in FIG. 91.

Figure 91:
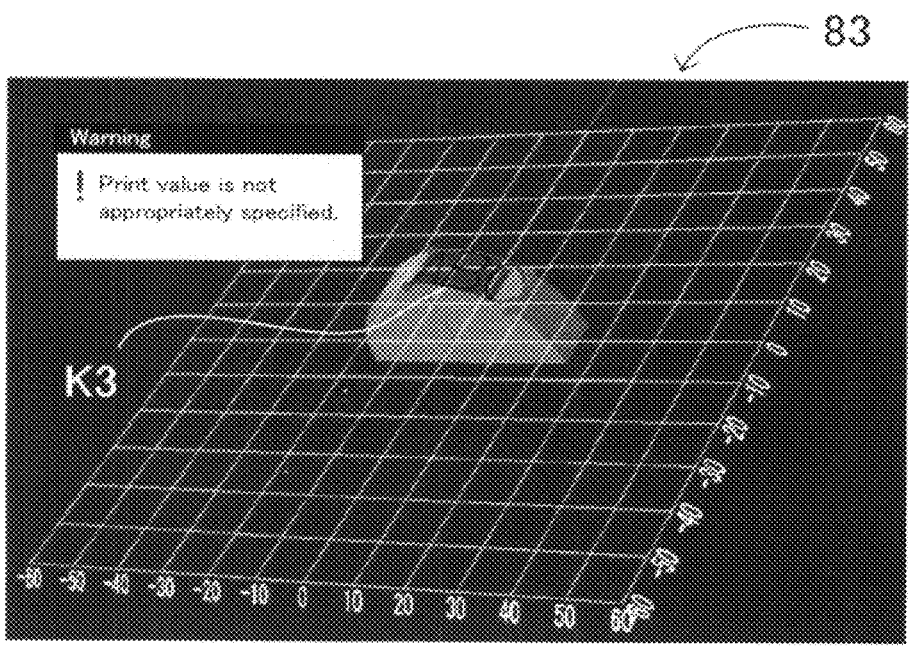
FIG. 91 is a photographic illustration showing a warning message on a screen.

Referring to FIG. 91, the warning device 80J displays a precomposed written message such as "Caution: Printing conditions you set are improper" in the object display section 83. It is practicable to indicate recommendable values for another setting.

Figure 92:
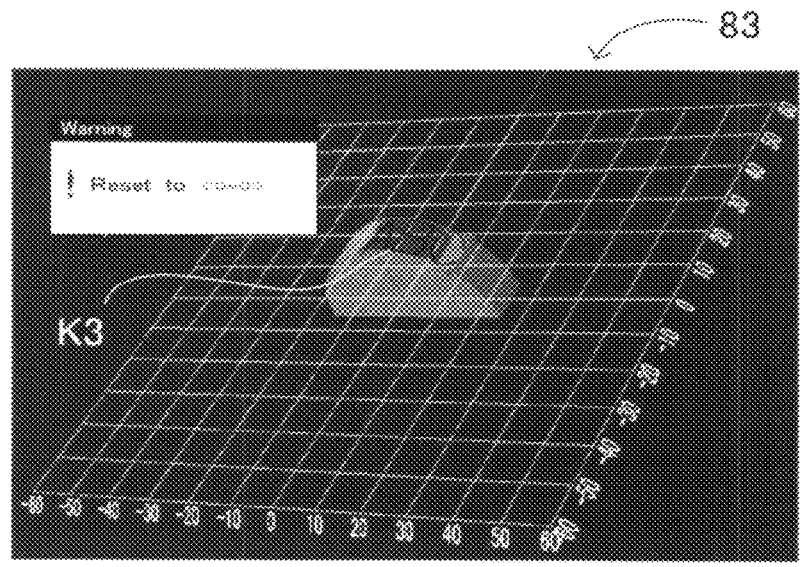
FIG. 92 is a photographic illustration showing a guidance message on a screen.

FIG. 92 shows an example of a directive written message such as "Caution: Set between ○○~○○" for a guide to appropriate settings. Examples of the directive written message include "Caution: Set printing position between ⊖⊖~○○", "Caution: Set character size less than ○○" and the like. It is also allowed to use any combination of these directive written messages. These written messages offer a useful guide to another setting and provide easy-to-operate circumstances. These written messages may be, of course, replaced with voice messages or warning sounds.

The function of the defective surface area detection device 80B shown in FIG. 13 will be described in detail below. It is not improbable that a work surface includes an area where defective processing is made depending upon work profiles, work transfer speeds, and scanning speeds of a laser beam. In the case where a processing pattern is accidentally specified in the defective printable area, since there are provided no means for informing of existence of a defective printable work surface area, defective prints and printing errors occur. Therefore, it is essential to carry out visual print quality inspection and withdrawal and disposition of defective works which is quite troublesome and wasteful. For these reasons, in this embodiment, the user is given a warning at the instant of specifying a print pattern that the print pattern is expected to be made, partially or completely, in a defective printable work surface area, or is given a warning that printing errors occur when actually printing. This warning function is realized by the defective surface area detection device 80B. In this instance, the term "defective printable work surface area" which is detected by the defective surface area detection device 80B as used herein includes an "unprintable work surface area." as well as a defective printable work surface area.

Figure 93:
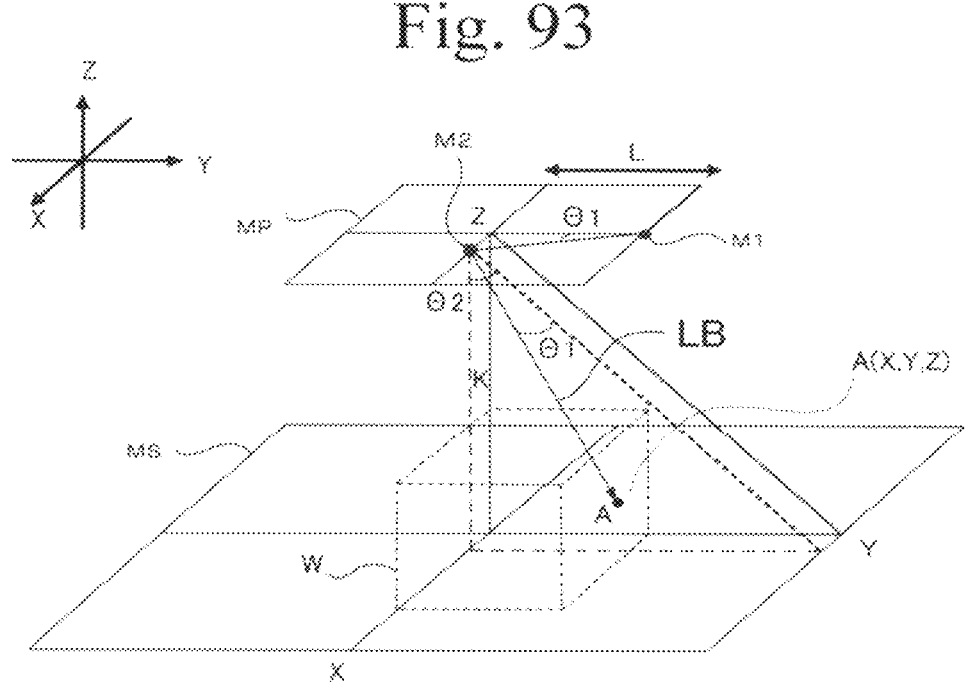
FIG. 93 is a perspective illustration showing a method of detecting a defective processable area by a defective area detection device or unit.

FIG. 93 shows how the defective surface area detection device 80B detects a defective printable work surface area of a cubic work W. In this embodiment, a laser beam LB scans a print plane SP at a fixed distance K from a reflection plane MP. First and second scan mirrors M1 and M2 have axes of rotation coinciding with X- and Y axes of the reflection plane, respectively, are located at a distance L from each other in the Y-direction, and incline at an angle of θ1 in the X-direction. When focusing the laser beam LB at a point A having coordinates of X, Y and Z, the following equation holds:

$$\tan\theta_1 = X/\{[(Y^2+(K-Z)^2]^{1/2}+L\}$$

where a vector of the laser beam LB is expressed by the following equation:

$$(X-L\tan\theta_1, Y, Z-K)$$

Hence, $$x = Xt - Lxt/\{[(Y^2+(K-Z)^2]^{1/2}+L\}+X$$

$$y = Yt + Y$$

$$z = (Z-K)t + Z$$

With the substitution $\tan\theta_1$, x, y and z are expressed as follows:

$$x = (X-L\tan\theta_1)t + X$$

$$y = Yt + Y$$

$$z = (Z-K)t + Z$$

Whether any point A (X, Y, Z) is impinged by the laser beam LB, in other words, whether any point is shadowed from the laser beam LB and involved in a defective printable work surface area, depends on whether lines x, y and z have an intersecting point with the work surface. Therefore, the defective surface area detection device 80B detects a defective printable work surface area by calculating x, y and z from the above equations. Although the above description is directed to the case where the work remains stationary for simplified explanation, the defective surface area detection device 80B is enabled to detect a defective printable work surface area of a work which is moving by performing calculations coupled with a moving distance from time to time.

Defective printing may occur due to differences in scanning speed in X, Y and Z directions, since a Z-axis scan mirror operates at a scan speed relatively lower than X-axis and Y-axis scan mirrors. This fact has a detrimental impact on the processing of inclined work surfaces. In this case, when inclinations of the X- and the Y-axis with the Z-axis are greater than a predetermined inclination, it is determined that print is expected to be made defective. Defective print due to a difference in scan speed can be eliminated by adjusting printing parameters so as to lower scan speeds of the X- and the Y-scan mirrors. This is because the defective print is caused in some cases by the fact that the Z-axis scan mirror can not follow the Z-axis scan mirror. This scan speed adjustment function can be performed by the processing condition adjusting device 80C.

The processing condition adjusting means 80C calculates available processing conditions based on an angle of inclination of a work surface, a ratio of X·Y component relative to Z component, a scan speed of the Z scan mirror, a moving speed of the work, etc. The calculated processing conditions can be displayed on the display unit 82. The user can try another setting in reference to the calculated conditions. Otherwise, the processing condition adjusting means 80C may be adapted to specify processing conditions automatically. In this case, since processing conditions are collectively specified, the user is less pressed to specify processing conditions and precise processing is realized irrespective of a defective printable work surface area. Similarly, in the case where defective print occurs due to variations in scan speed of X- and Y-scan mirrors, the defective print can be eliminated by harmonizing the scan speeds of the scan mirrors with one another.

Figure 78:
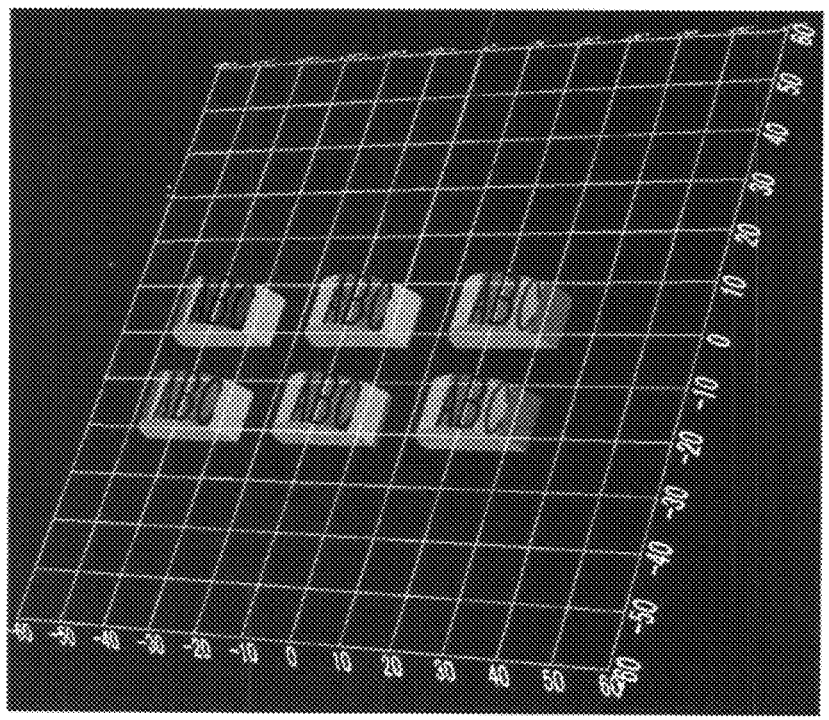
FIG. 78 is a photographic illustration showing copied profiles by profile copy.

When the processing condition adjusting means 80C detects a defective printable work surface area, the highlighting device 80I displays a defective printable work surface area and a printable work surface area differently so as to enable the user to get hold of the defective printable work surface area visually. In order to display these defective printable work surface area and printable work surface area differently, it is practicable to display the individual work surface areas in a linear gradient pattern, a gray scale pattern, a shading pattern or the like, as well as differing in color, for distinction between them. When printing by using a palette, defective printable work surface areas differ from one another according to works as shown in FIG. 78. In such a case, the defective surface area detection device 80B detects a defective printable work surface area by work by performing calculations, so that the defective printable work surface area is distinctly displayed on the display unit 82 by the highlighting device 80I.

Figure 38:
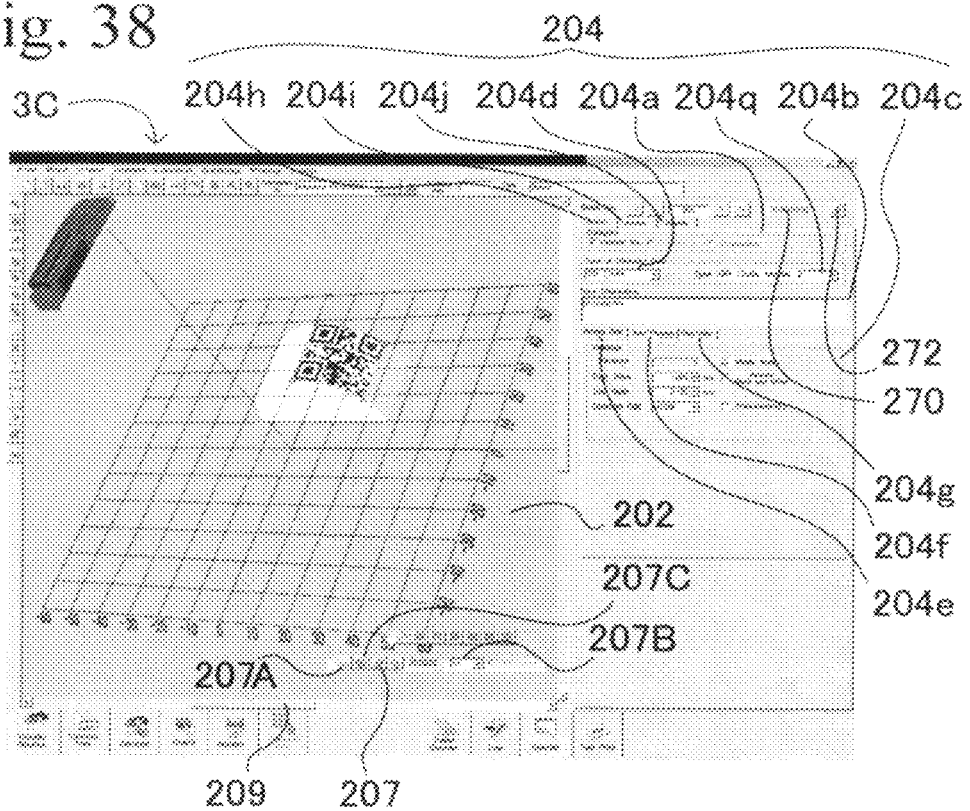
FIG. 38 is a photographic illustration showing an edit display window in a 3D edit mode in which a work is displayed as viewed obliquely from above.
Figure 39:
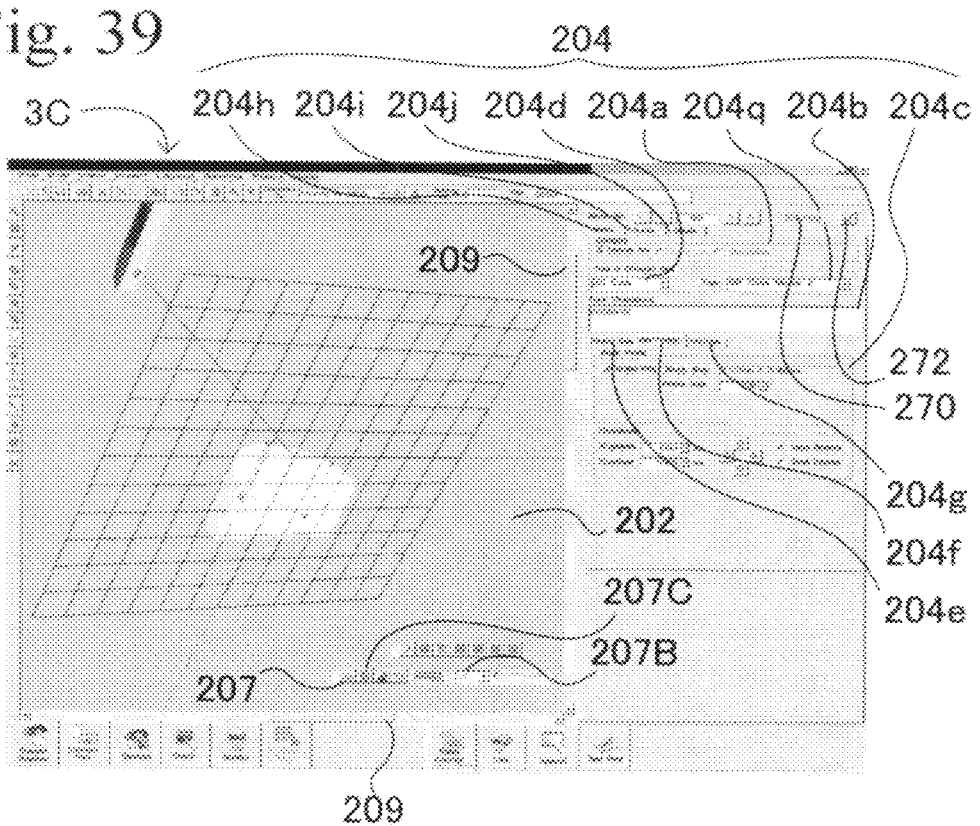
FIG. 39 is a photographic illustration showing an edit display window in a 3D edit mode in which a work is displayed as viewed from rear.
Figure 40:
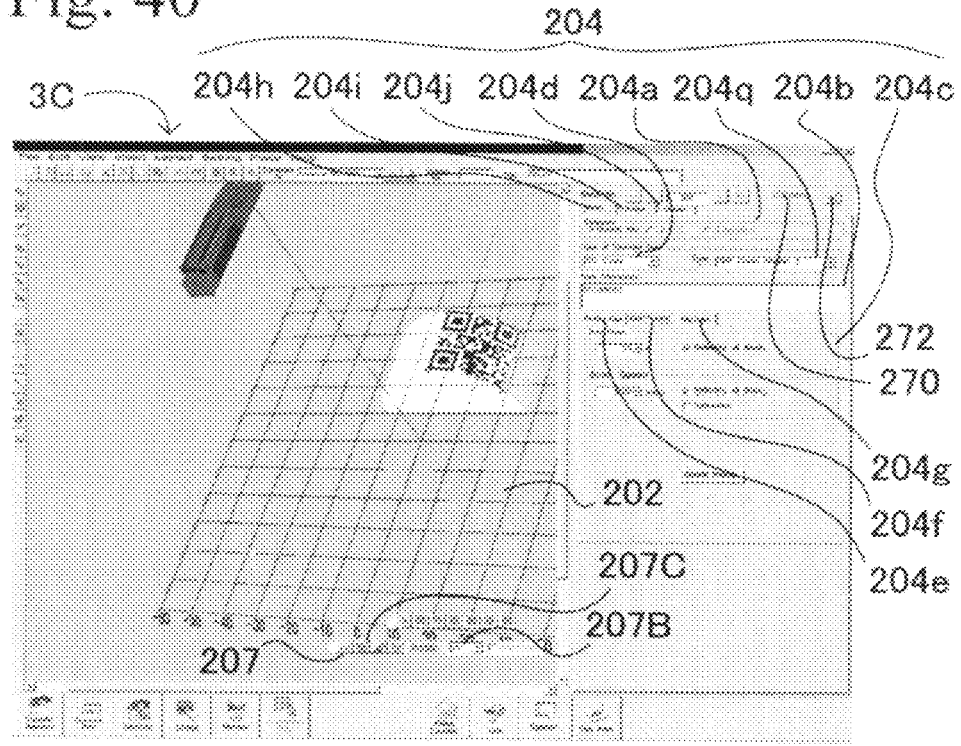
FIG. 40 is a photographic illustration showing an edit display window in a 3D edit mode which is scrolled left.
Figure 41:
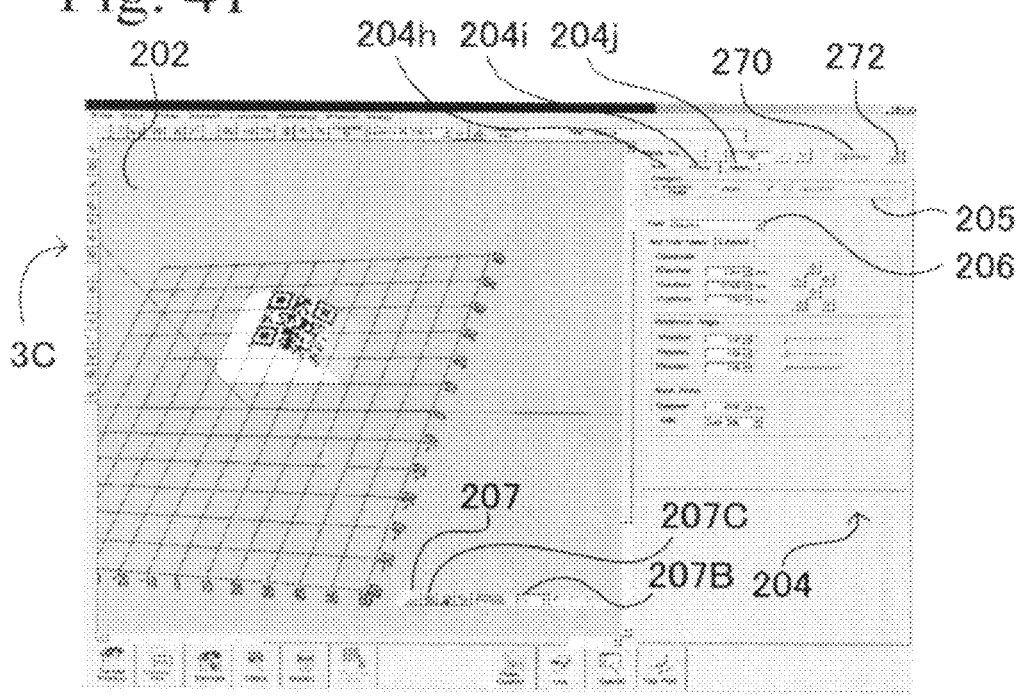
FIG. 41 is a photographic illustration showing an edit display window in a 3D edit mode which is scrolled right.
Figure 42:
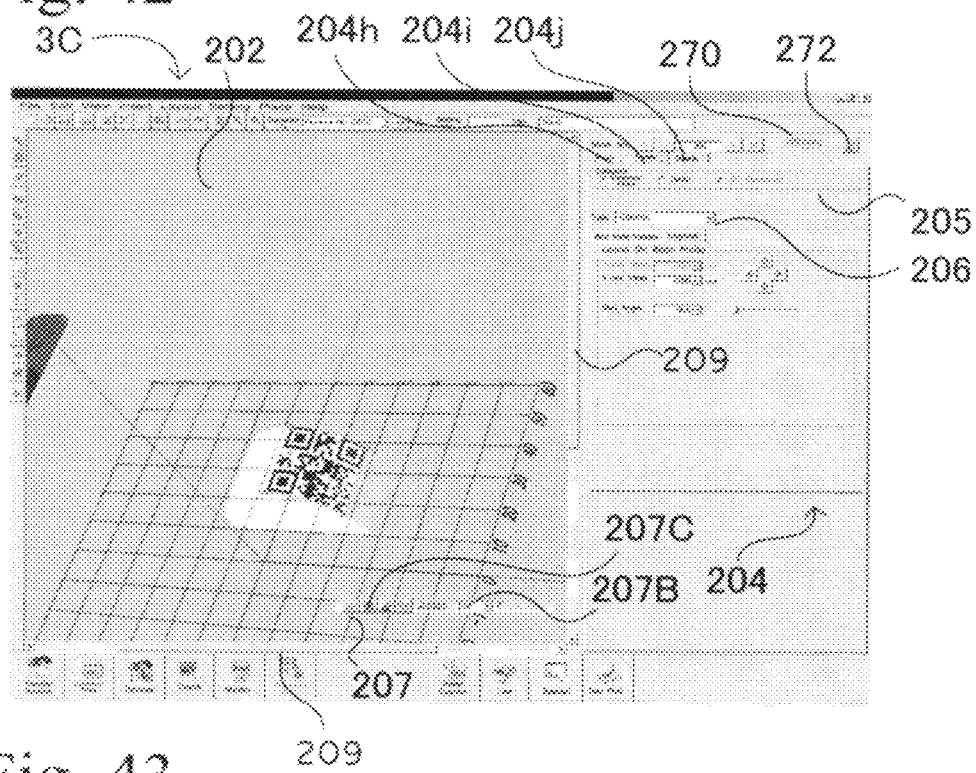
FIG. 42 is a photographic illustration showing an edit display window in a 3D edit mode which is scrolled up.

FIGS. 38 to 45 show the edit display windows 202 which display an object or work as though the user views it at different view points in the edit display window 202 in the 3D edit mode. Explaining the view point shift function taking a QR code shown in FIG. 19 for example, when pressing the View button 207A of the floating tool bar 207 in the edit display window 202 in the 2D edit mode shown in FIG. 19, the edit display window 202 in the 3D edit mode shown in FIG. 20 appears. The view point is shifted at will as shown in FIGS. 38 through 45 by moving a scroll bar 209 up and down or right and left in the edit display window 202 in the 2D edit mode shown in FIG. 19. FIG. 38 shows the edit display window 202 in which the work with a QR code is viewed obliquely from above. FIG. 39 shows the edit display window 202 in which the object or content is rotated by 180° and viewed from behind. The view point may be otherwise shifted by dragging any point of the edit display window 202. When pressing the Move/Rotation button of the tool bar 207, the scroll bars 209 are altered from a rotation function to a move function. In this state, when moving the scroll bar 209 up and down or right and left, the object moves up and down or right and left correspondingly in the edit display window 202 as shown in FIGS. 40 and 41. In this way, the view point is shifted easily even for users who are unfamiliar with three-dimensional graphic editing.

Figure 43:
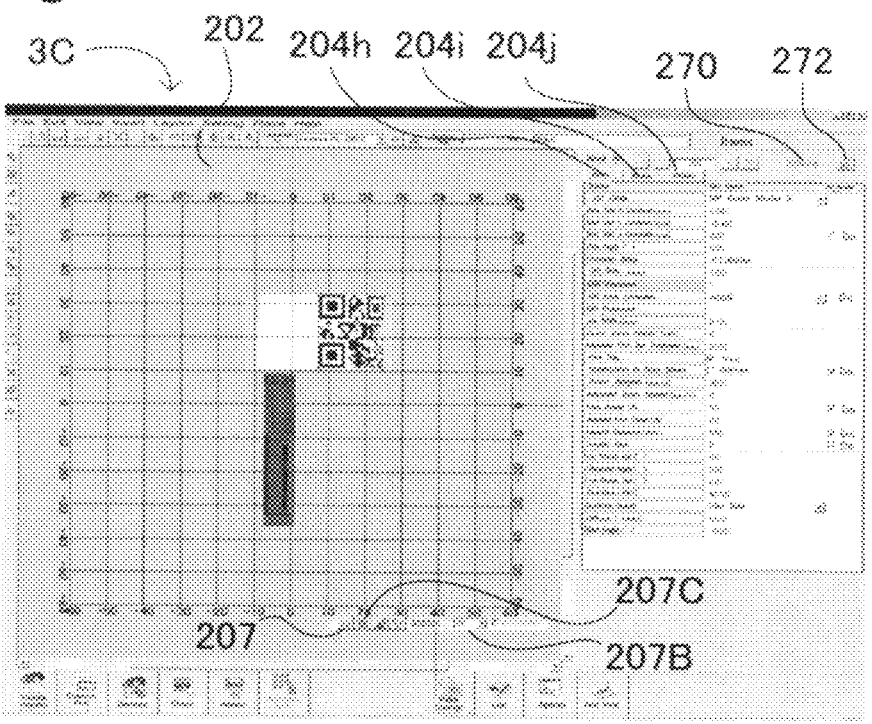
FIG. 43 is a photographic illustration showing an edit display window in a 3D edit mode in which an X-Y coordinate plane is displayed.
Figure 44:
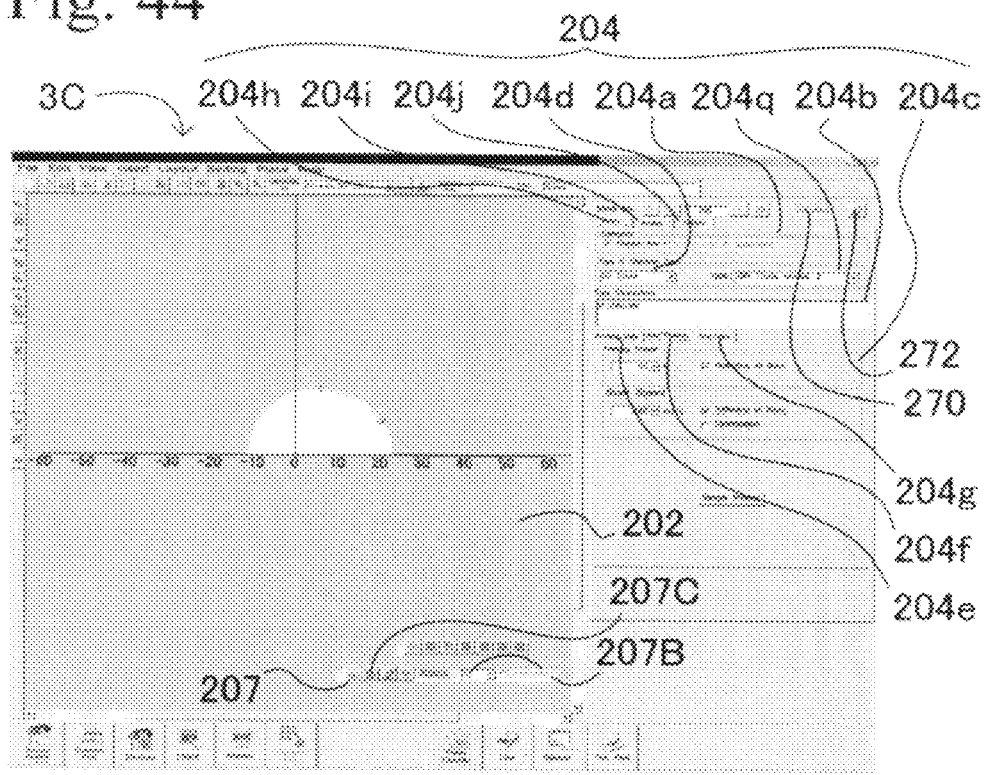
FIG. 44 is a photographic illustration showing an edit display window in a 3D edit mode in which a Y-Z coordinate plane is displayed.
Figure 45:
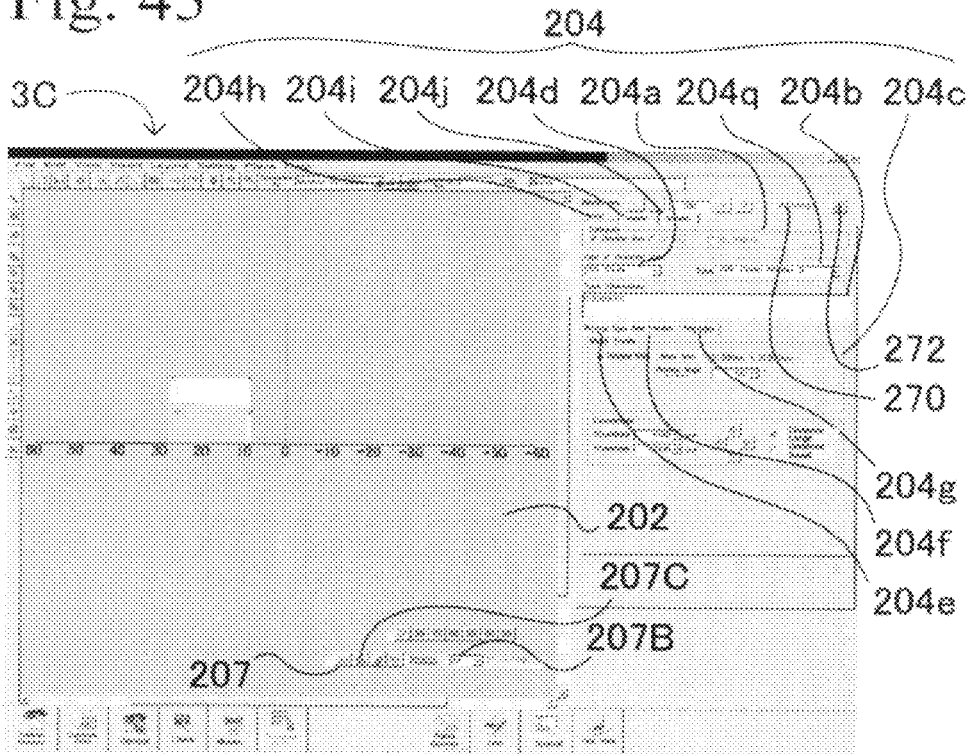
FIG. 45 is a photographic illustration showing an edit display window in a 3D edit mode in which a Z-X coordinate plane is displayed.

FIGS. 43 to 45 shows the edit display window 202 which displays an object or work as though the user views it at fixed view points in the edit display window 202 in the 3D edit mode. As shown in FIG. 43, when choosing a Display Position button 207B of the tool bar 207, the edit display window 202, which corresponds to the edit display window 202 in the 2D edit mode shown in FIG. 19, displaying a top of an object or work in an X-Y coordinate plane, which the user views at one of the fixed view points, appears on the screen. FIG. 44 shows the edit display window 202 and displays a side of an object or work in a Y-Z coordinate plane that the user views at another of the fixed view points. FIG. 45 shows the edit display window 202 displaying another side of an object or work in a Z-X coordinate plane which the user views at another of the fixed view points. In these edit display windows 202, it is enabled to shift the view points by moving the scroll bars 209. In this way, an object or work can be quickly changed as though the user views it at the fixed point in the 3D edit mode window. This view point shift function is of great use for replacing a window with another, retrieval of a window and checking of a window on the screen.

Figure 46:
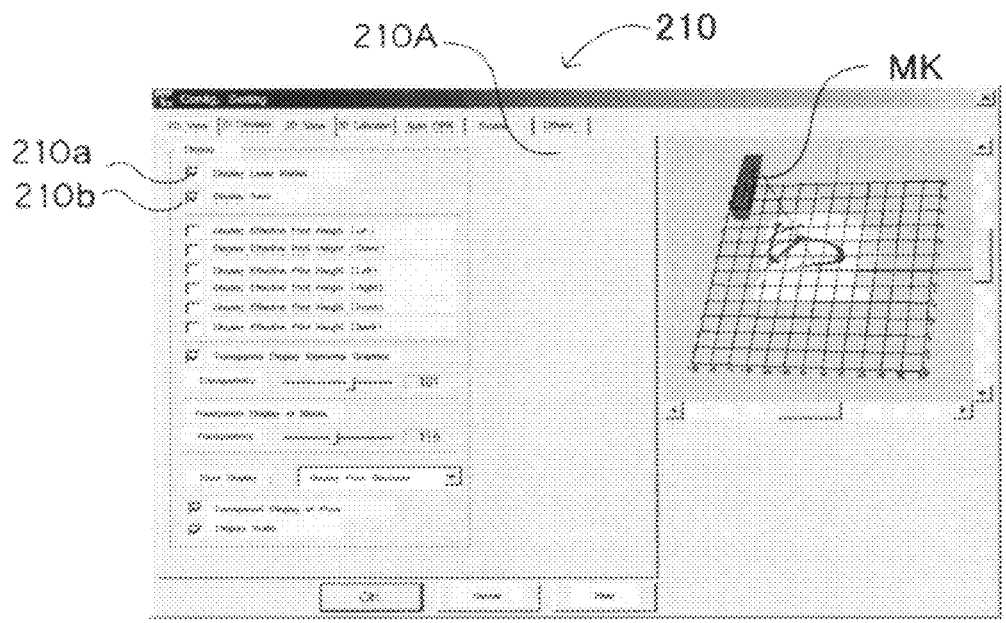
FIG. 46 is a photographic illustration showing an environment configuration window in which a 3D display dialog box is chosen.
Figure 47:
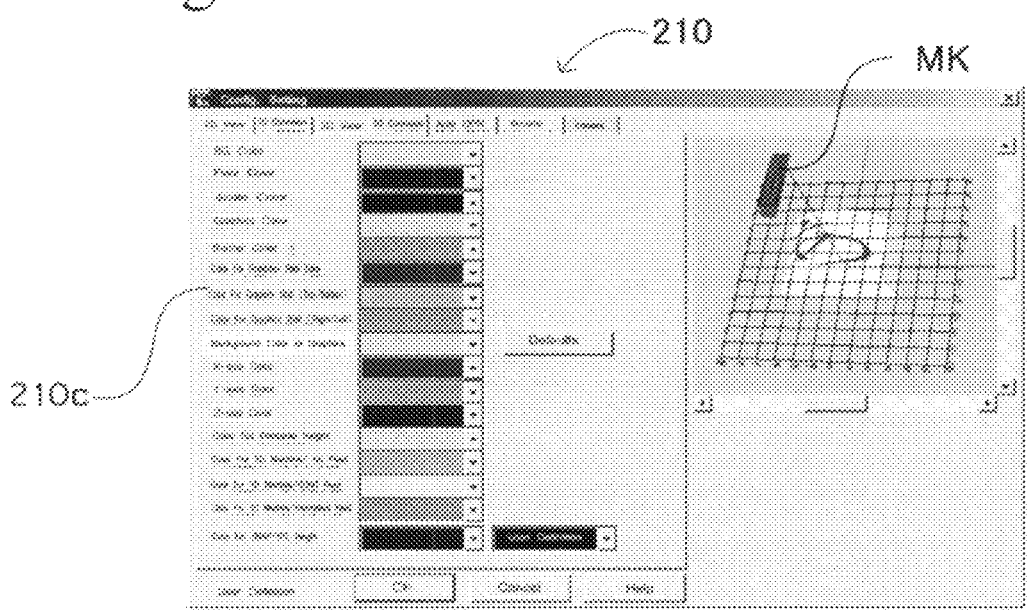
FIG. 47 is a photographic illustration showing an environment configuration window in which a 3D coloring dialog box is chosen.
Figure 48:
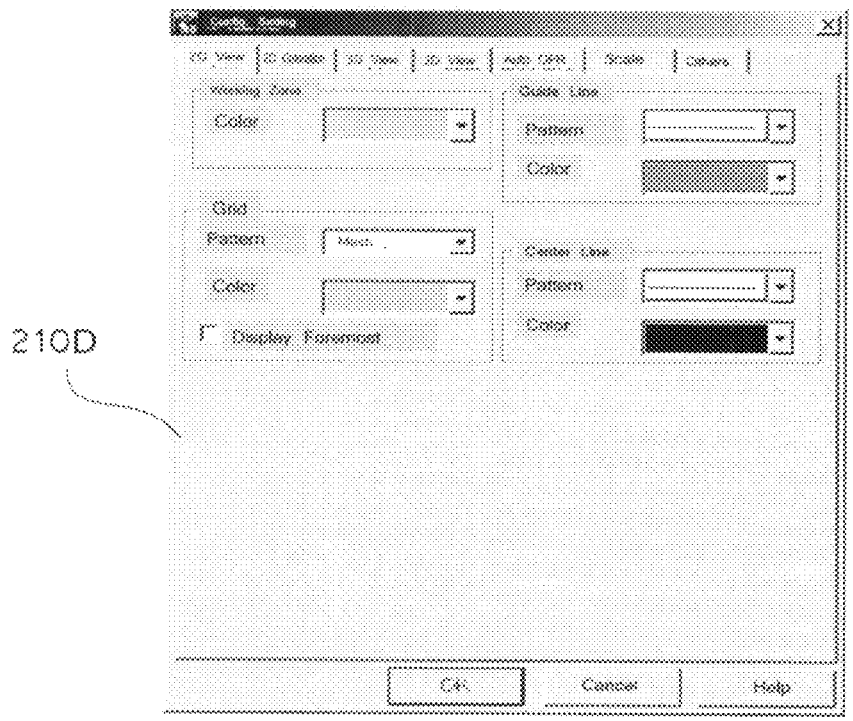
FIG. 48 is a photographic illustration showing an environment configuration window in which a 2D display dialog box is chosen.
Figure 49:
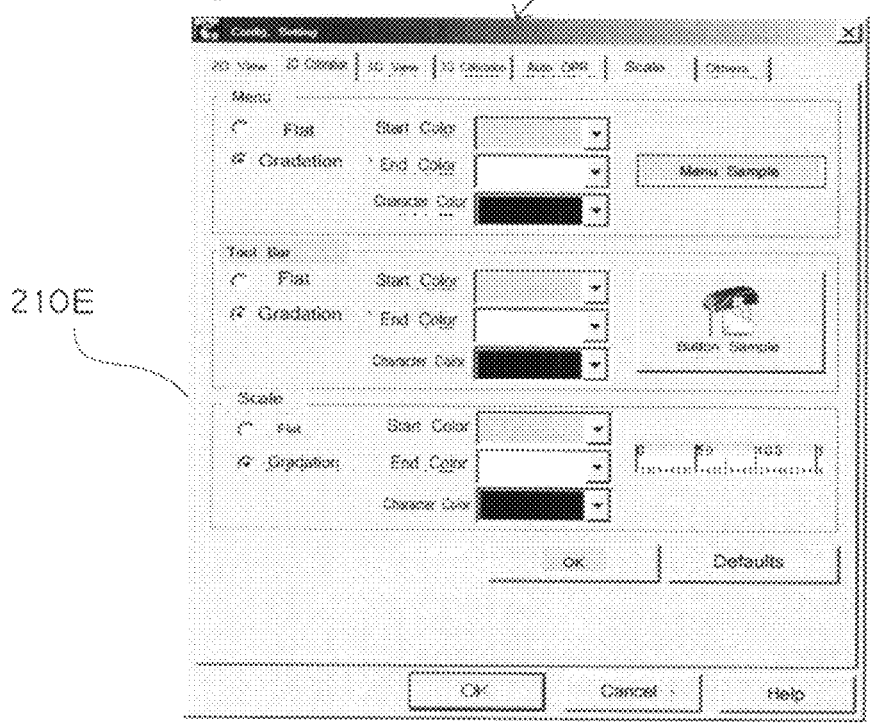
FIG. 49 is a photographic illustration showing an environment configuration window in which a 2D coloring dialog box is chosen.

FIG. 46 shows an Environment Configuration window 210 including a 3D Environment Configuration dialog box 210A including various options and a Preview Window 210B which is used to specify a laser beam traveling path to a work. In the Preview window that is similar to the edit display window 202, a laser beam LB is displayed together with a marking head icon MK and a work as close as possible to the way it will appear in the edit display window 202 when specified. This function makes it easy for the user to get hold of a printing direction relative to a defective printable work surface area. The iconic representation of the marking head MK appears in the preview window 210B by default and disappears therefrom by clearing a Display Marker check box 210a in the 3D Environment Configuration dialog box 210A. The object in the preview window 210B is also displayed in three dimensions in the head display section 84 of the display section 83. It is enabled to display X, Y and Z coordinate axes in the edit display window 202 as shown in, for example, FIG. 38 for the purpose of easy coordinate orientation. The X, Y and Z coordinate axes may be different in color for clear visible distinction. In FIG. 38, the Z axis is brought into line with a laser beam path. Display of X, Y and Z coordinate axes makes a spatial localization of the marking head relative to a work. The X, Y and Z coordinate axes can be disappeared from the edit display window 202 by choosing the Display Axes check box 210b in the 3D Environment Configuration dialog box 210A. In this embodiment, the X, Y and Z coordinate axes appear or are removed when choosing or clearing the Display Axes check box 210b. It is of course a design choice to display or hide the X, Y and Z coordinate axes individually. It is also practicable to display one or more reference lines, besides the X, Y and Z coordinate axes. For example, when printing on an area close to a root of a columnar work surface, it is practicable to draw a reference line along a side at the root for clarity of a base position. Such a reference line can be specified by coordinates and a direction of vector. The marking head in the edit display window 202 is displayed in the form of an icon having the same appearance and color as a real marking head. However, it is preferred that the marking head icon has a back side different in color from a front side. For example, the marking head icon MK colored in ash gray at the front side has a white back side in FIG. 38 and is colored at a back side in different color from the front side in FIG. 39. Such a color pattern may be optional and is advantageous for the user to get hold of a position of the marking head when varying the view point. FIG. 47 shows a 3D Color Pattern dialog box 210C which appears when enabling a Color Pattern tab in the Environment Configuration window 210. The user can selectively specify colors and pattern elements in details in the preview window 210B. The pattern includes any style such as solid lines patterns, broken lines patterns, fill color patterns, hatching patterns and the like. FIGS. 48 and 49 show a 2D Environment Configuration dialog box 210D and a 2D Color Pattern dialog box 210C, respectively. The Environment Configuration window 210 can be disappeared and/or closed by pressing a close button.

In this way, the user can get hold of a physical relationship between the marking head and a work surface by displaying them together in three dimensions. In consequence, the user can visually check up on the representation of settings with ease and find and correct setting mistakes. In the above embodiment, the marking head moves and changes in position correspondingly to movement of a work surface and a shift in view point. In the edit display window 202, an object can be zoomed, magnified or demagnified, in the 2D edit mode, and is, however, fixed at a default magnification. It is possible to display the marking head always at a fixed magnification irrespectively of magnification or demagnification of a work because the marking head is displayed for the primary purpose of orientation thereof. This lets the user keep track of the marking head even when a work is demagnified. Further, as the description is directed to printing of a work remaining stationary in the above embodiment, a 3D working area is centrally located in the edit display window 202 especially in the 3D edit mode. However, as described later, it is possible to enlarge the 3D working area for printing of a moving work so as to provide a large substantial area for a printable work surface area. This enables the user to check up on settings with ease. In particular, in the case where an elongated work moves in its longitudinal direction, the work is displayed in full view within the window screen, so that it is quite easy for the user to get hold of the complete work without scrolling the window screen up and down.

Figure 50:
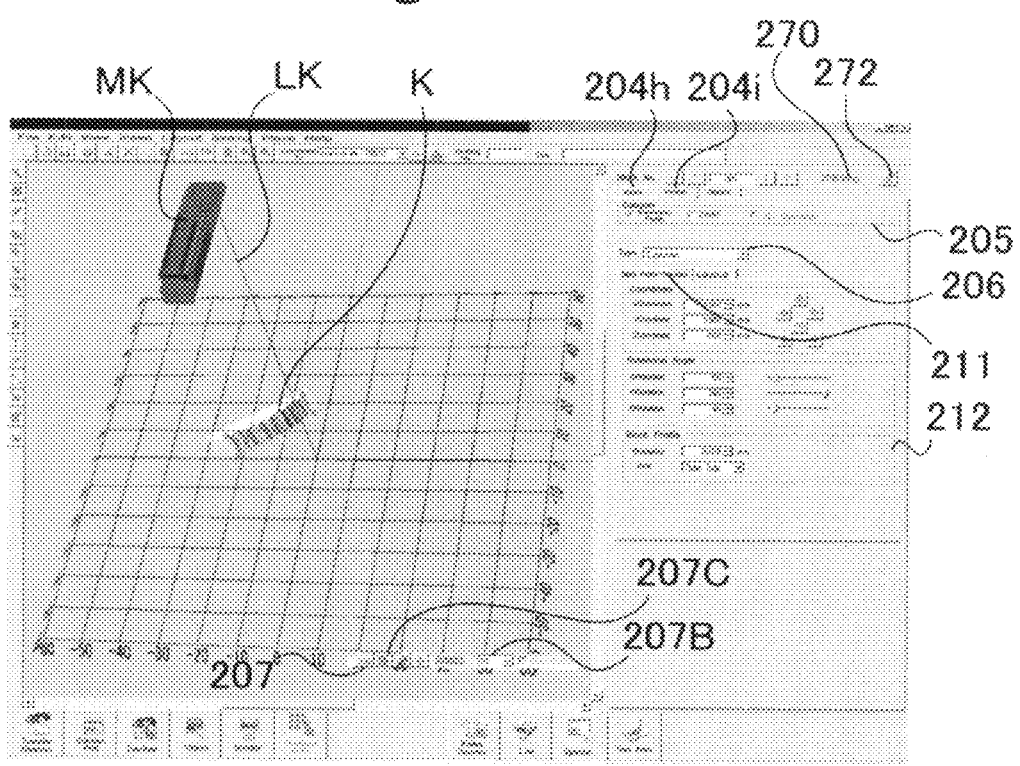
FIG. 50 is a photographic illustration showing an edit display window in a 3D edit mode shown in FIG. 36 in which a work is changed in position

FIG. 50 shows the edit display window 202 with a Profile Setting dialog box enabled by a Profile Setting tab 204*i*. When pressing a Block Pattern. Layout tab 211, a Details Setting dialog box 212 appears for letting the user specify details of a block pattern including coordinates of a base position, angles of rotation and details of a profile of a block pattern. When a columnar work surface was chosen, a radius of a column and a print side, inner or outer are specified in the Block Pattern. Layout dialog box 212.

Figure 51:
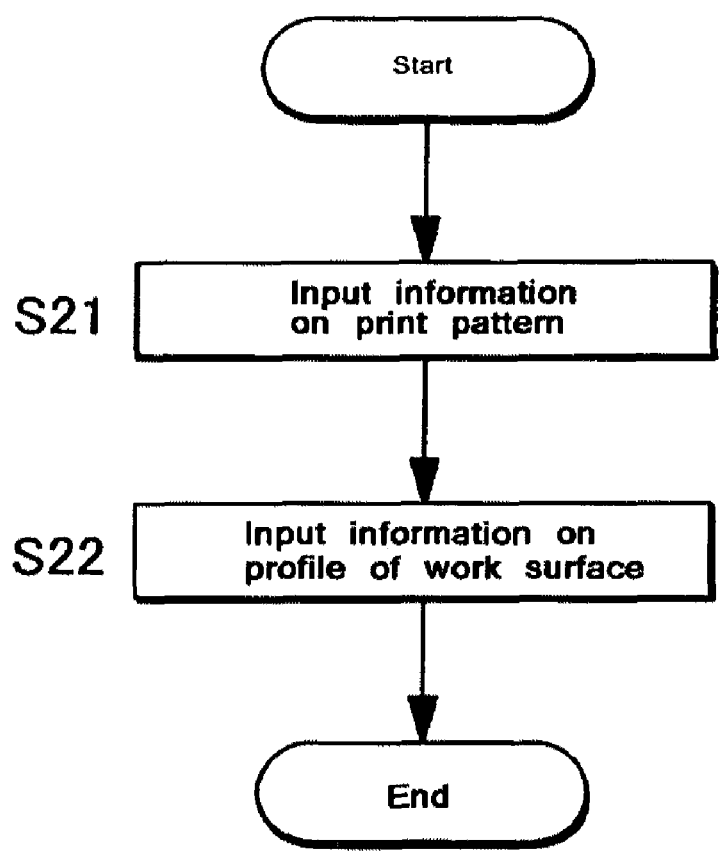
FIG. 51 is a flowchart illustrating a sequence of creating a processing pattern by specifying processing conditions.

FIG. 51 is a flowchart illustrating a sequence of processing pattern creation executed by the laser processing data setting program. In first step S21, a processing pattern is set up by entering a character string through the processing condition setting means 3C and by specifying an encoding pattern type. Specifically, as shown in FIG. 14 by way of example, after choosing Character String in the Print Category menu box 204*a* to show the Print Pattern input dialog box 204, the user types numerical characters "01234 . . . 789" in the Text box 204*b* and then chooses a print pattern type, i.e. "2D Code" in the Character Data Type spin box 204*d* and a print pattern, i.e. QR Code, in the Type spin box 204*q*. The arithmetical and logic unit 80 makes calculations based on the information thus specified to create a print pattern. The created print pattern appears in the form of a 2D representation on the edit display window 202. In this example, although the QC code is automatically created as a print pattern according to information about a character string entered through the processing condition setting means 3C, an intended print pattern may be chosen from a set of print pattern templates or importing an intended print pattern from other files and pasting it in the edit display window 202. In subsequent step S22, profile information is gained through the processing condition setting means 3C. Specifically, when enabling the Profile tab 204*i* of the Print Pattern input dialog box 204 shown in FIG. 14, Profile dialog box 205 shown in FIG. 18 appears over the Print Pattern input dialog box 204. In the Profile dialog box 205, a column is chosen as an elemental profile. As a result, the QR code is changed from a 2D representation to 3D representation in the edit display window 202 as shown in FIG. 19. When changing the edit display window 202 to the 3D view mode, the columnar work with the QR code laid thereon changes to a 3D representation in the edit display window 202 as shown in FIG. 20. In this way, 3D representation of a print pattern appears in the edit display window 202 in the 2D view mode by inputting print pattern information in step S21, and is subsequently converted into a 3D representation in the same window 202 but in the 3D view mode by inputting profile information in step S22. The user can visually take a view of changing situations of an object. In the processing pattern creation sequence flowchart, the steps S21 and S22 may be replaced with each other. Once processing data has been acquired in the form of 3D spatial coordinate data, a fine adjustment is made in layout and position in the Z-direction as appropriate. The fine adjustment can be achieved by the use of scroll bars or a mouse wheel.

The resultant laser processing once provided in the above sequence is transferred to the control unit 1A of the laser processing system shown in FIG. 12 when pressing Transfer Readout command button 251 below a lower window border. In the memory of the control unit 1A, the laser processing data is expanded and overwritten.

Figure 52A:
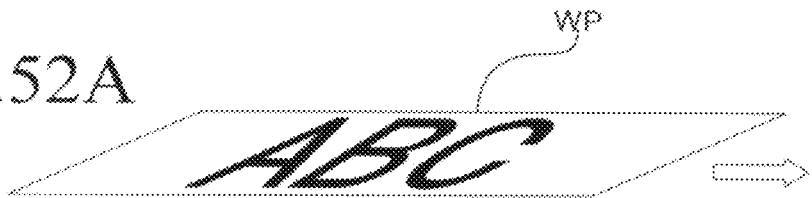
FIG. 52A is a perspective illustration explaining two dimensional printing of a moving work.

The laser processing system is capable of printing moving works besides stationary works. Moving work 2D printing which should refer to printing of a moving work in two dimensions will be described with reference to FIGS. 52 and 53.

Figure 52B:
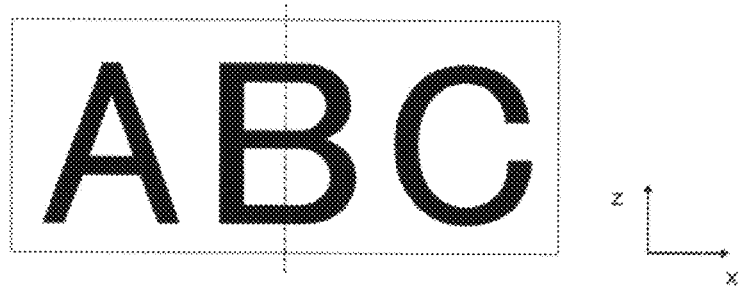
FIG. 52B is a plane illustration explaining two dimensional printing of a moving work.
Figure 53:
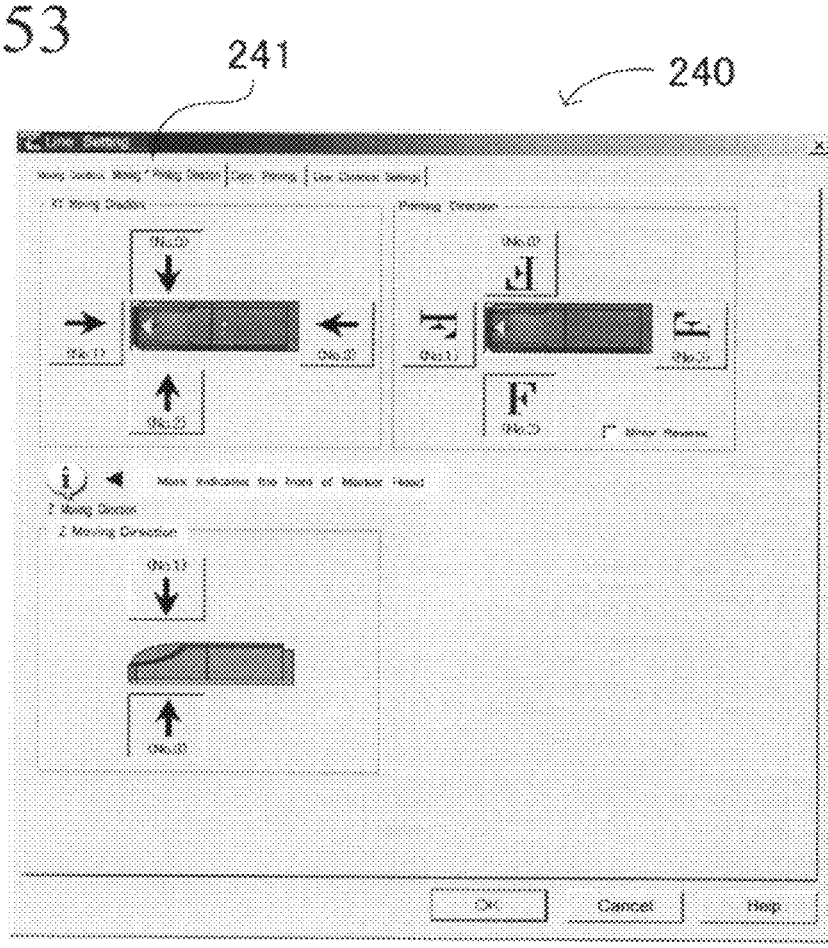
FIG. 53 is a photographic illustration showing a line setting window in which a movement/direction dialog box is chosen.

The moving work printing follows procedural steps of (1) determining a print pattern; (2) setting printing conditions for a moving plane work; (3) starting print; and (4) adding a moved distance of a work to X and Y coordinates of the print pattern. The printing conditions for a moving plane work that include at least a moving direction, and/or a moving condition, a printing area will be described in order below. In FIG. 52 schematically showing the concept of moving work printing in two dimensions, the plane work WP moves towards the right in the drawing. In a Line Setting window 240 shown in FIG. 53 where a marking head is shown in plane and cross section, a Move Direction dialog box 241 is opened to let the user specify an X/Y direction and/or a Z direction of movement of the work WP. In this instance, a bearing of a line and a moving direction of the line are chosen in the Move Direction dialog box 241. The visual optionality of conditions makes the user to easily gain an understanding of relative position between the marking head and a work, so as thereby to achieve setting without errors. In the case where a direction of a print pattern is orthogonal with a moving direction of the marking head, an up or a down arrow is chosen in the Move Direction dialog box 241. The moving condition means a control mode of work speed, namely an open loop control for maintaining the work speed constant or a feedback control and is a choice between the two.

The printable work surface area is defined by moving ranges of a scanner correspondingly taken along X- and Y-axes of a plane coordinate system. The moving ranges of the scanners is designed so that the coordinate plane displayed in the edit display window 202 such as shown in FIGS. 14 and 20 corresponds to a maximum printable work surface area. The user can automatically define a printable work surface area by specifying a print pattern within the coordinate plane.

When specifying processing conditions for a moving plane, positional X- and Y-coordinates of a laser beam after start of printing a given print pattern can be calculated and it can be decided whether the laser beam should be turned on or off at the individual positions. The positional coordinate of a laser beam is calculated by adding a moving distance of a work in a moving direction to a coordinate of a substantial point forming part of the print pattern in the moving direction. In the example shown in FIG. 52A, since the work moves in an X-direction, the positional coordinate of a laser beam is calculated in terms of X-direction and is left intact in terms of Y-direction. The moving work printing is well suited for works that are rotating or moving in three dimensions. In such a case, the moving work printing follows the same procedural steps as the moving plane work printing.

Figure 54:
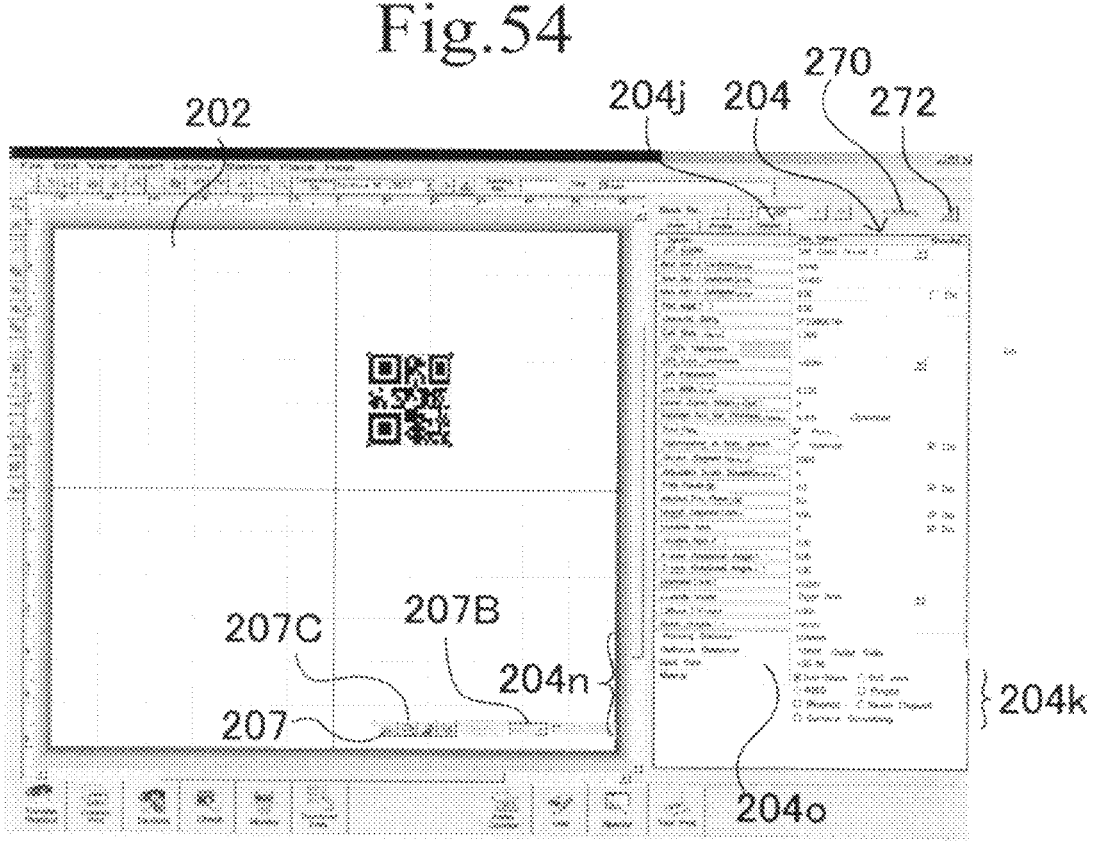
FIG. 54 is a photographic illustration showing an edit display window in which a processing parameter setting dialog box is chosen.

FIG. 54 is an edit display window 202 with the Print Pattern input dialog box 204 in which a Details Setting dialog box is enabled by a Details tab 204*j* by the user. The processing data generation means 80K described above is adapted to generate processing data based on processing conditions specified through the processing condition setting means 3C so as to turn out a basic condition for conformation of a focal point of a laser beam to a work surface. However, it is possible to set a defocus distance so that the laser beam is intentionally put out of focus on the work surface. The term "defocus distance" as used herein shall mean and refer to an offset from a focal position of a laser beam or a distance between a focal point of a laser beam and a work surface. In the Details Setting dialog box, the user can specify a defocus distance that the user wants in a Defocus box 204o which is one of the parameters boxes schematically denoted by 204n. The laser beam is focused at the defocus distance specified by the user above from a work surface if the defocus distance is a negative value or below from a work surface if it is a positive value. It is also practicable to set other parameters such as a spot size of a laser beam on a work surface and a work material. At this time of specifying one parameter, the processing conditions set by the user are automatically changed according to the parameter. In consequence, the user can easily perform conditioning through an alteration of a parameter which the user wants. As shown in FIG. 54, the parameters boxes 204n include a Working Distance box, a Spot Side box and a Material box. The working distance is inherent in an in-use laser processing machine and is automatically set depending upon it by ordinary. The spot size is specified in percentage with respect to a spot size at a focal point. The work material is chosen from a pull-down Material menu 204k appearing when the Material box is chosen. The Material menu lists various processing purposes such as Steel Print in Black and Stainless Print in Black, Resin Deposition and Rough Surface, besides various materials such as ABS Resin, Polycarbonate Resin and Phenol resin. Selection of a material induces coordination of power density of the laser beam.

These parameters are dependent on one another. That is, when adjusting a defocus distance of a laser beam, power density and a spot size of the laser beam varies correspondingly. Further, when choosing a work material and a purpose of processing, appropriate power density is adjusted correspondingly and hence, a spot size or a defocus distance of the laser beam varies correspondingly. Therefore, if it was necessary to adjust power density of a laser power keeping the spot size of the laser beam, the user was required to specify a desired spot size of the laser beam, and besides adjusting parameters such as output power of the laser beam and a scanning speed so as thereby to seek for an appropriate combination of parameters which cause no change in the spot size of the laser beam. The adjustment of parameters was performed by trial and error and selected based on the result of actual laser processing of a work surface, which is quite troublesome and consumes a lot of time.

In light of the above problem, the laser processing data setting system 180 of the present embodiment has a relational data base in the form of a look-up table 5a, listing a number of records of parameters according to changes in individual parameters, in the memory device 5A (see FIG. 13). When changing one of the parameters, an appropriate record is selected from the look-up table 5a so as to set parameters of the selected record automatically. Accordingly, the processing condition setting is completed by changing only a parameter that the user wants to change. For example, in the Details Setting dialog box opened in the Print Pattern input dialog box 204 shown in FIG. 54, when specifying either a spot size or a work material, the remaining parameters in the Details Setting dialog box are automatically corrected according to the parameter or the attribute that the user specified. Even if changing a defocus distance after a spot size or a work material was specified, the remaining parameters (for example, laser output power and a scanning speed, etc.) are also corrected automatically so as to keep the specified parameter, i.e. the spot size or the work material, unchanged. In this way, as the user is requested to change only a parameter that the user intends, a desired result is reached quite easily.

Figure 55A:
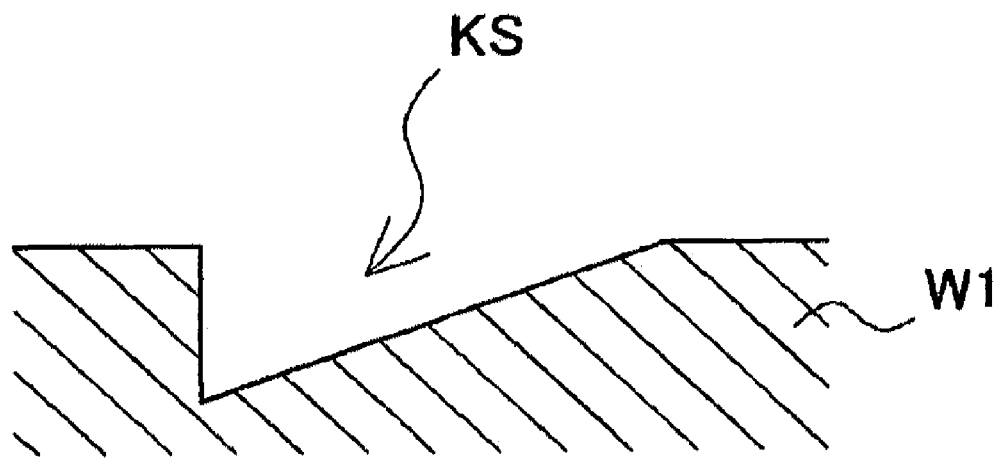
FIG. 55A is an illustration showing a processed work section of a work on which a sloping groove is engraved.
Figure 55B:
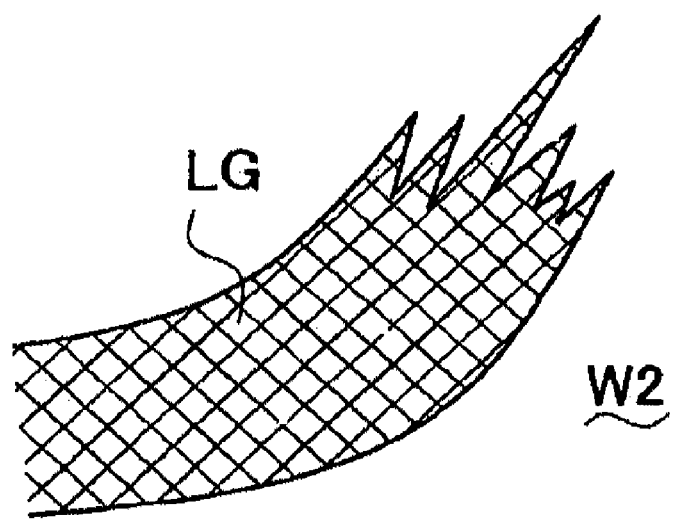
FIG. 55B shows a processed work surface on which a logo is printed in brushstroke.

FIGS. 55A and 55B show processed patterns that are formed by varying a processing parameter continuously during laser processing. More specifically, FIG. 55A shows a processed work section of a work W1 on which a sloping groove KS is engraved, and FIG. 55B shows a processed work surface W2 on which a logo LQ is printed in brushstroke. These processed patterns KS and LG are formed by varying a defocus distance or a beam spot of a laser beam continuously. The processing data generation means 80K adjusts the remaining parameters automatically following the continuous variation of the defocus distance so as to keep the remaining processing conditions unchanged. As a consequence, processing conditions that are not necessary to be changed remains unchanged.

Figure 56:
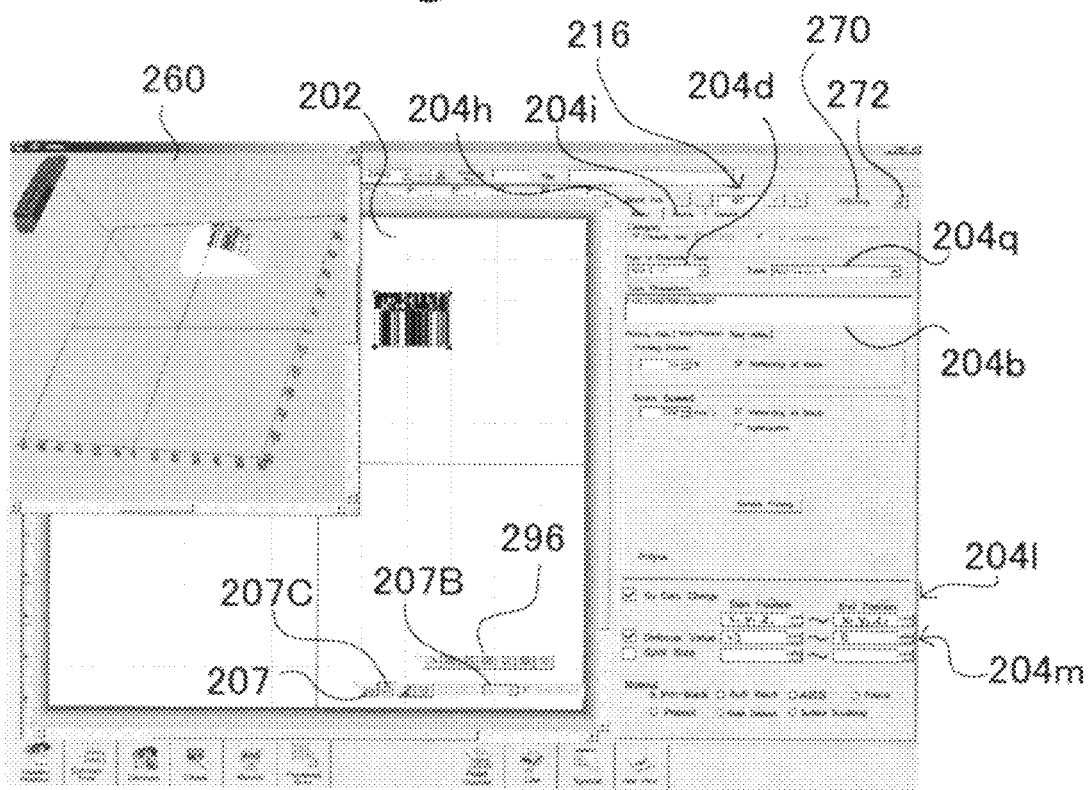
FIG. 56 is a photographic illustration showing an edit display window in which a defocus distance setting dialog box is chosen.

FIG. 56 shows an edit display window 202 accompanied by a Continuous Processing dialog box for setting continuous laser processing. When choosing a Continuous Processing check box, options appear to let the user specify defocus distances or spot sizes in spin boxes. For example, when after choosing a Defocus Distance check box, defocus distances at start and end positions are specified in the spin boxes for start and end positions, respectively. The defocus distance varies linearly in a specified range. It is practicable to specify a defocus distance for either a start position or an end position, and an increasing or a decreasing rate or a change by increment or decrement in place of the defocus distance for a start position or an end position. When specifying defocus distances, spot sizes are correspondingly and automatically specified in spin boxes in reference to the look-up table 5a in the memory device 5A. In this way, when having a choice between the corresponding two, the other is automatically specified, so that the user can change the processing conditions specified once by specifying only an intended parameter without focusing attention on dependency relations of the parameters. In the example shown in FIG. 56, the edit display window 202 and the 3D viewer window 260 display RSS•CC code corresponding to a choice of RSS & CC that the user specified in the Character Data Type spin box 204d. In this instance, either an RSS code or a composite code comprising an RSS code and a micro PDF code arranged adjacently can be chosen in the Character Data Type spin box 204d. As the composite code, RSS-24 CC-A has been chosen in the Type men box 204q. In order to enable the user to enter a description in the Text box 204b with ease, it is practicable to display a floating tool bar including various tools, including special character code tools, external character tools and the like. As just described above, the processing data generation means 80K enables the user to alter settings such as a work material, a processing pattern, a type of finish, a machining time and the like by changing a beam size of a laser beam without restraint. The file of the processing data created according to parameters for processing conditions which the user once specified is saved under an individual file name at any time. The processing data file is saved by choosing a File menu to display a pull-down menu and then choosing Save As menu to open a File Save dialog box and entering a new file name in a file name box. The processing data file can be used when the same laser processing is applied to similar works. It is practicable to use various data files of all-to-common processing conditions which have been provided previously.

The processing conditions include information about processing patterns and information about three dimensional profiles necessary to convert a processing pattern into a three-dimensional profile according to the work profiles. Examples of the processing pattern include character strings, graphics such as barcodes, two dimensional codes and logos. In mass processing such as printing of pallets, it is preferred to involve variable numbers such as a date of manufacture and a serial number in a processing pattern. Such a processing pattern applied to a work assures traceability of the work.

Figure 72:
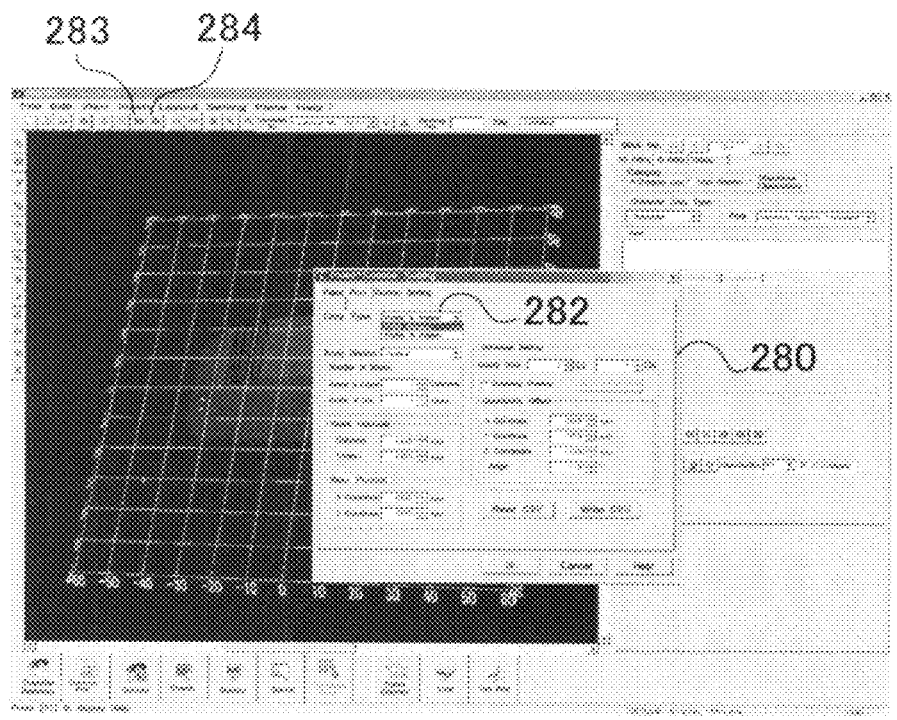
FIG. 72 is a photographic illustration showing a pallet/counter setting dialog box.
Figure 73:
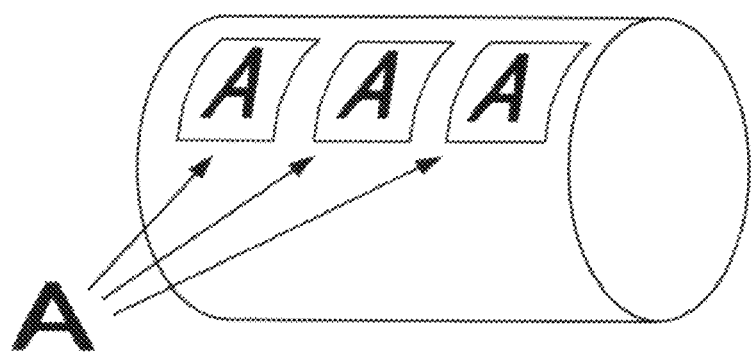
FIG. 73 is a schematic illustration showing a print pattern copy.
Figure 74:
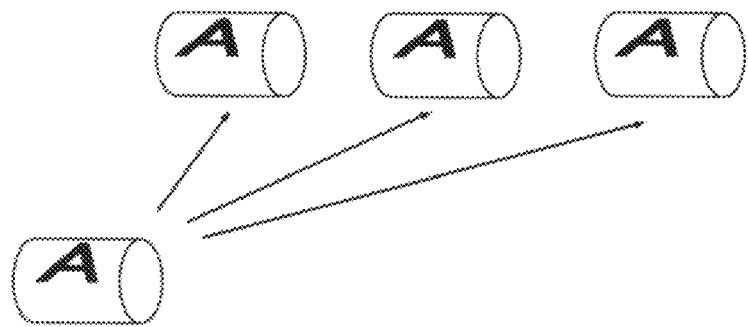
FIG. 74 is a schematic illustration showing a profile copy.

FIG. 72 shows a Pallet Counter Setting dialog box 280, which forms batch print setting means, appearing on a screen. When using a copy and paste function in order to use existing laser processing data when setting processing conditions through the processing condition setting means 3C, a copy mode is selectively specified from various modes including a Print Pattern in which the processing data excluding the three-dimensional work profile is copied and a Profile Included in which thorough processing data on the three-dimensional work profile and the processing pattern are copied in a Copy Mode menu 282. When pressing OK button, the processing data are copied in the copy mode that the user specified. The Print Pattern copy can be utilized to paste a plane print pattern to a work surface as shown in FIG. 73. On the other hand, the Profile Included copy can be utilized to paste a work surface profile and a three-dimensional print pattern together as a new print block as shown in FIG. 74. More specifically, in order to execute the copy and paste function by means of the processing condition setting means 3C, a Copy button 283 in the tool bar of the edit display window 202 is clicked to extract data of the original settings after choosing a destination print block, and then a Paste button 283 in the tool bar of the edit display window 202 is clicked to paste a copied print block in the edit display window 202. In this instance, it is possible to specify a pasting position by a mouse pointer. It is permitted to copy either a print pattern or a work profile irrespective of settings specified in the Pallet Counter Setting dialog box 280. For example, when specifying an original and thereafter destination, a right mouse button is pressed to display a pop-up menu including a Select Paste Profile dialog box to let the user choose and paste Print Pattern or Profile Included. It is permitted to provide separate copy buttons, namely a Print Pattern copy button and a Profile Included copy button, individually for the Print Pattern copy and the Profile Included copy, respectively, in the tool bar, or separate paste buttons, namely a Print Pattern paste button and a Profile Included paste button in the tool bar. Herewith, the user can use a desired copy mode without specifying a copy function. In the case where the user needs frequent switching of copy functions, the user can choose a desired copy function quickly and conveniently. In this way, since the user can copy processing conditions that have been set, the copy function is contributive to laborsaving in setting work of a number of process blocks. It is of enabled to change detailed printing conditions for pasted print blocks, so that the user can set printing conditions efficiently.

In a batch processing mode, a desired processing pattern is applied in a predetermined processing sequence to work surfaces arranged in rows. The term "pallet printing" as used herein shall mean and refer to printing same or similar print patterns on a plurality of works arranged in a grid pattern or an offset pattern. The pallet printing is often used to print a trade name, a model number and a serial number on IC chips arranged in a line. In many instances, the pallet printing is applied to stationary works placed on, for example, a standing conveyor or a pallet. However, the pallet printing is also applied to moving works.

The batch processing by the use of a conventional two dimensional laser marker prints copies of a plane print pattern on works. On the other hand, as shown in FIG. 73, the pallet print by the use of three-dimensional laser marker of the present invention can perform batch printing in the Print Pattern copy mode such as shown in FIG. 73 and the Profile Included copy mode such as shown in FIG. 74.

Figure 75:
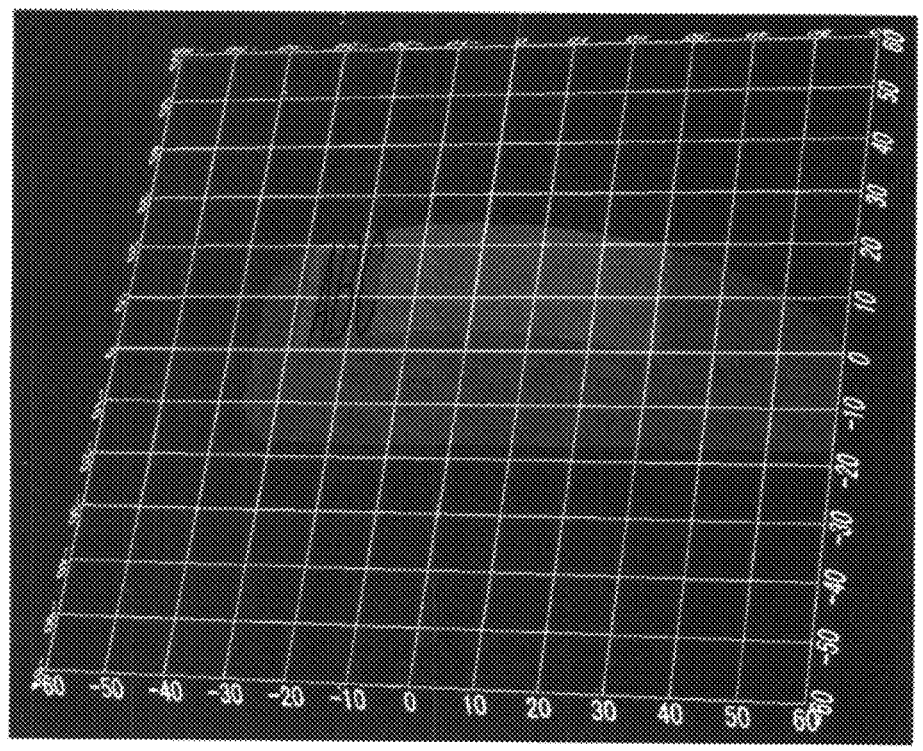
FIG. 75 is a photographic illustration showing an original print pattern for print pattern copy.
Figure 76:
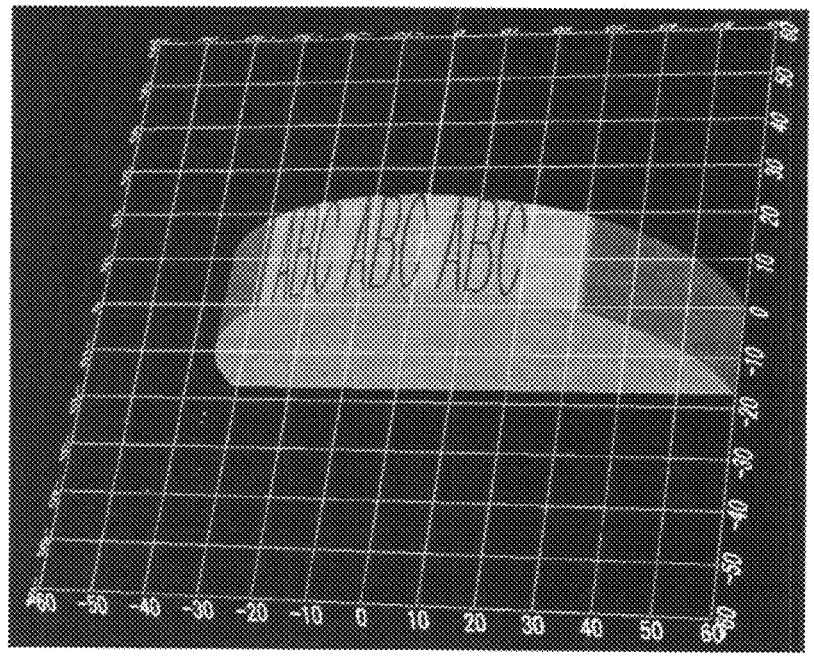
FIG. 76 is a photographic illustration showing copied print patterns by print pattern copy.

FIGS. 75 and 76 show the pallet print in which a plane print pattern is pasted. In the pallet print, a plane print pattern is copied, converted into three-dimensional print pattern and pasted to a work surface as shown in FIG. 75. Subsequently, a number of copies is specified in the Pallet Print Setting dialog box described later. In this instance shown in FIG. 76, three print blocks are created and arranged in one line and three columns.

Figure 77:
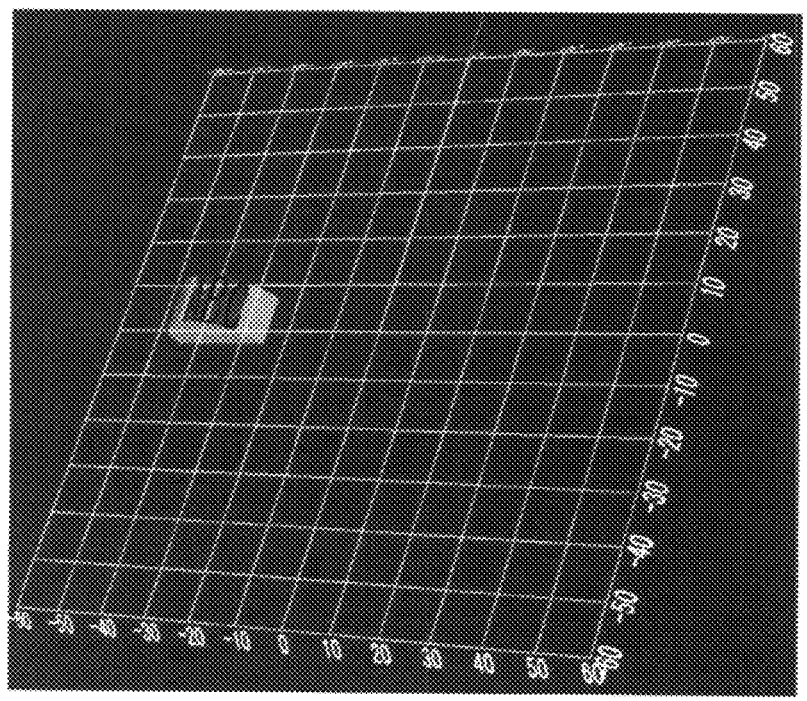
FIG. 77 is a photographic illustration showing an original profile for profile copy.

FIGS. 77 and 78 show the pallet print in which a three-dimensional print pattern on a work profile is pasted. In this pallet print, a three-dimensional print pattern with a work profile included therein is copied as shown in FIG. 77. Subsequently, a number of copies is specified in the Pallet Print Setting dialog box. In this instance shown in FIG. 78, six print blocks are created and arranged in two lines and three columns.

Figure 79:
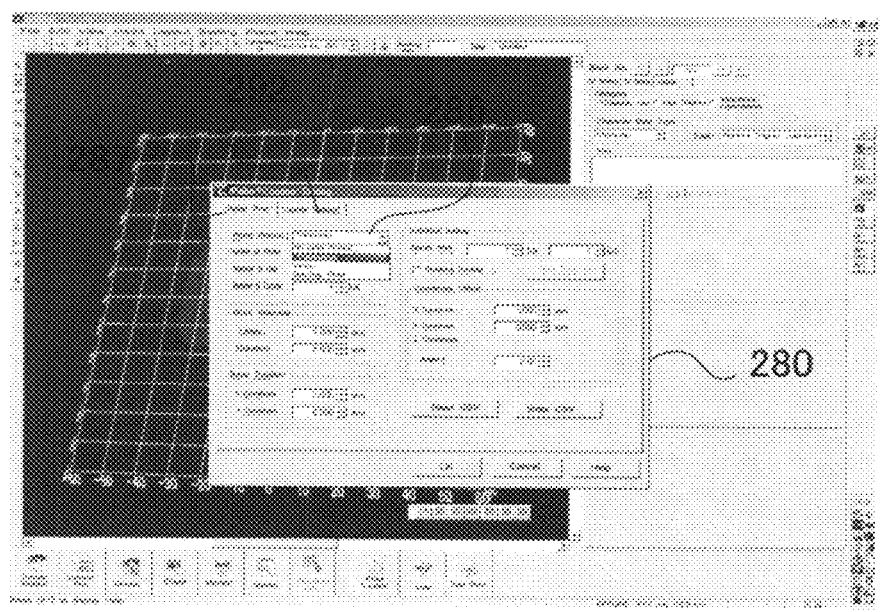
FIG. 79 is a photographic illustration showing a pallet/counter setting dialog box.

FIG. 79 shows a Pallet Counter Setting dialog box 280 as batch print setting means. The pallet print can take in a character string pattern including variable numbers into a print pattern. In the Pallet Counter Setting dialog box 280, when enabling a Pallet Print tab 287, a Priority Direction box 286 appears to let the user choose a priority print direction from a pull-down menu including options such as Transverse, Vertical, Specified Order, besides Validate/Invalidate. If the user chooses Invalidate in the pull-own menu, the pallet print is invalidated. However, if the user chooses any option in the pull-own menu, the pallet print is automatically validated. The Transverse carries out print in the direction of a line, and the Vertical carries out print in a direction of column. However, the Specified Order carries out print in an individually specified order.

Figure 80:
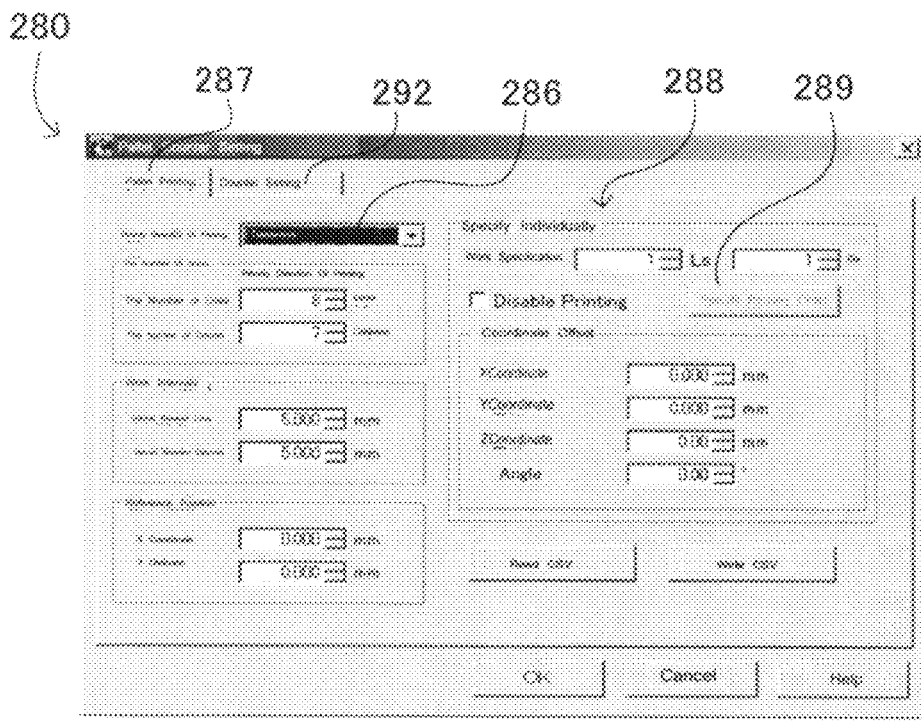
FIG. 80 is a photographic illustration showing a pallet/counter setting window in which a pallet printing dialog box is opened and a vertical direction is specified in a priority printing direction menu box.
Figure 81:
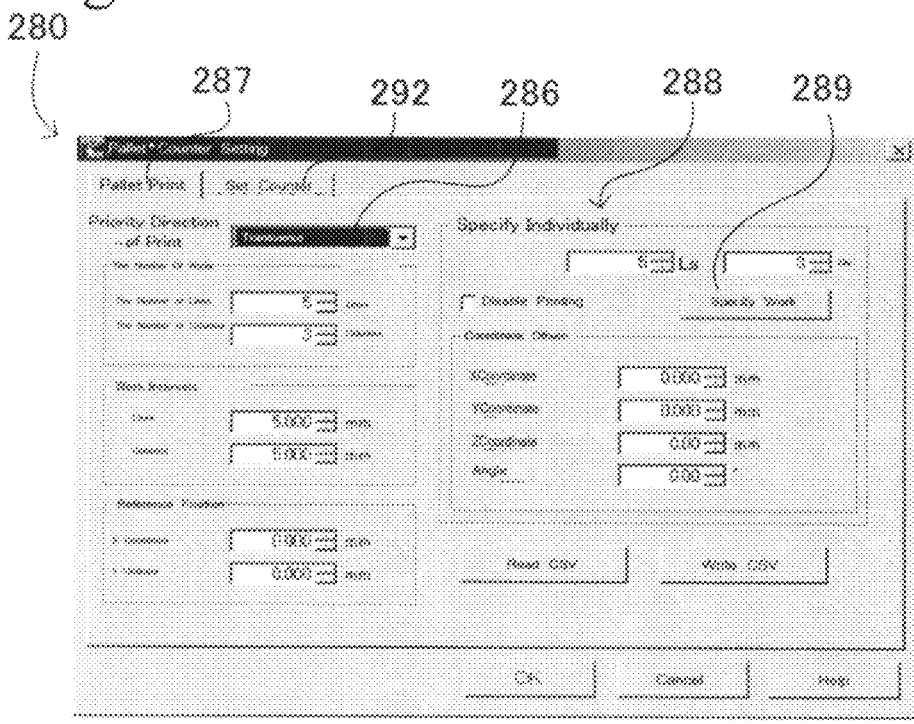
FIG. 81 is a photographic illustration showing a pallet/counter setting window in which a pallet printing dialog box is opened and a specified order is specified in a priority printing direction spin box.
Figure 82:
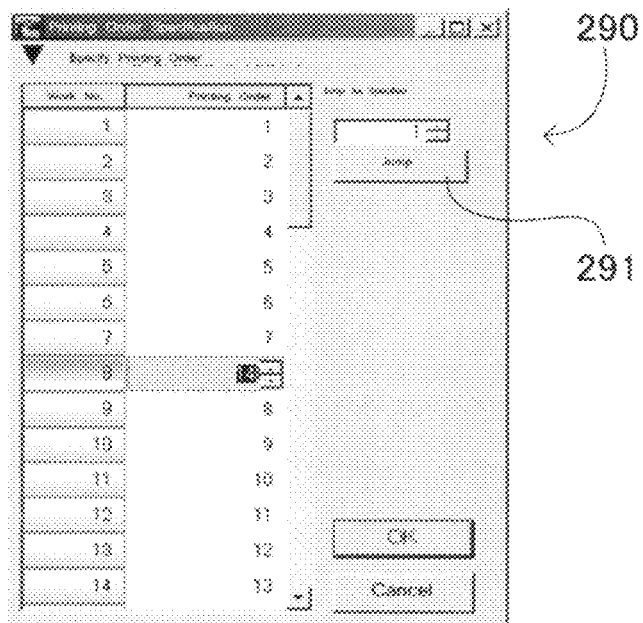
FIG. 82 is a photographic illustration showing an order setting dialog box.

FIGS. 80 and 81 shows the Pallet Print dialog box chosen by enabling the Pallet Print tab 287 in the Pallet Counter Setting dialog box 280. As shown in FIG. 80 in which the Transverse was chosen in the Priority Direction box 286, the user specifies numbers of lines and columns according to an arrangement of works in a Line and a Column spin box. It is practicable to provide a warning when line and column settings specified in the Pallet Counter Setting dialog box 280 are wrong. The warning may include error messages such as "Improper range is specified" and "Specify in a range of ○×○" which encourages the user to try another specification. Further, as shown in FIG. 81 in which the Specified Order was chosen in the Priority Direction box 286, the user specifies numbers of lines and columns of works for which a printing order should specified in a Work Specification box in an Individual Setting dialog box 288. In this instance, 15 works are arranged in five lines and three columns. Incidentally with the number of lines and columns, an Order Setting button 289 is validated. Subsequently, when the user presses the Order Setting button 289 in the Individual Setting dialog box 288, an Order Setting box 290 appears as shown in FIG. 82. In this Order Setting box 290, the user specifies printing order numbers for individual works. The Order Setting box 290 has a Jump button 219 which is pressed after specifying any work number that the user wants to jump to the specified work number in a Work Number spin box if there are a large number of works to be ordered. This Jump button 291 permits the user to print varying numbers such as serial numbers on works not in an arranged order but in any order that the user intends.

Figure 83:
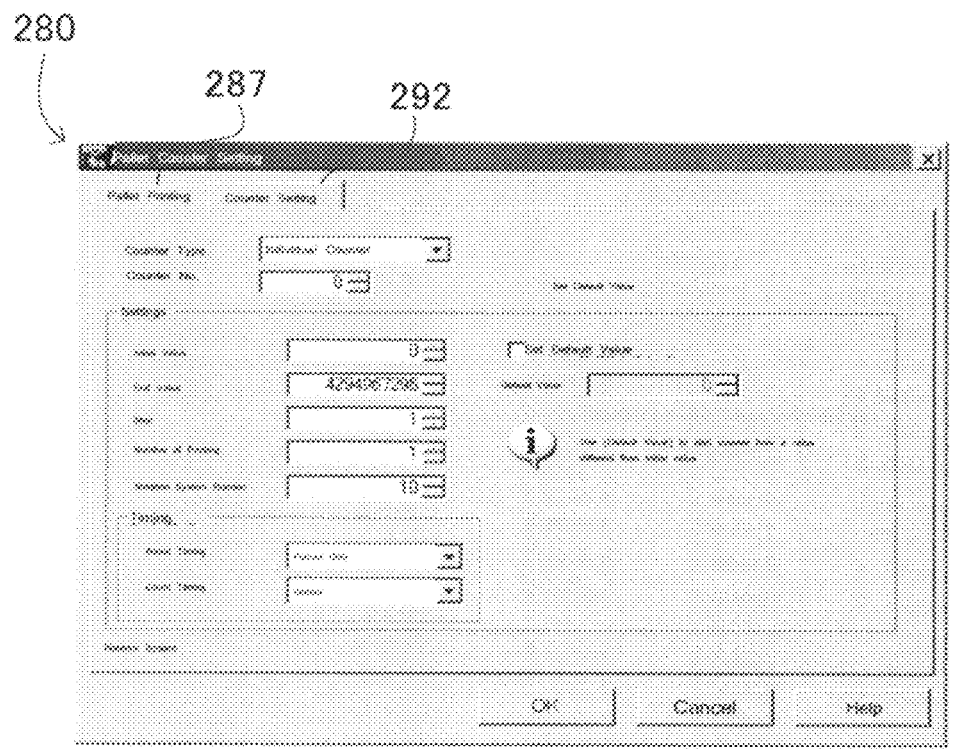
FIG. 83 is a photographic illustration showing a pallet/counter setting window in which a counter setting dialog box is opened.
Figure 84:
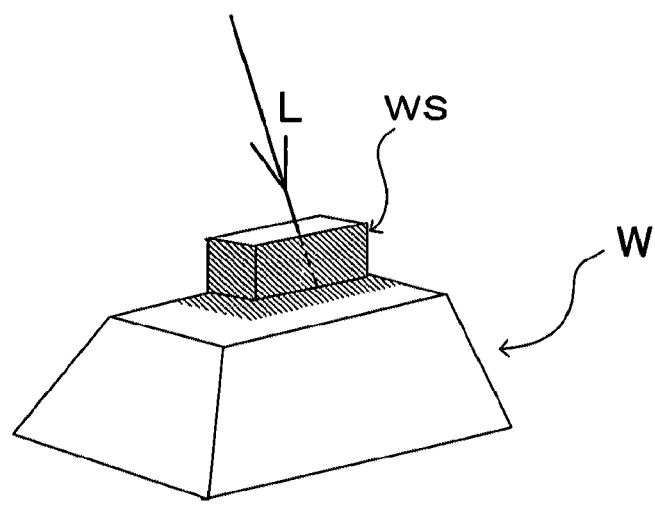
FIG. 84 is an illustration explaining an occurrence of an unprintable area of a work.
Figure 85:
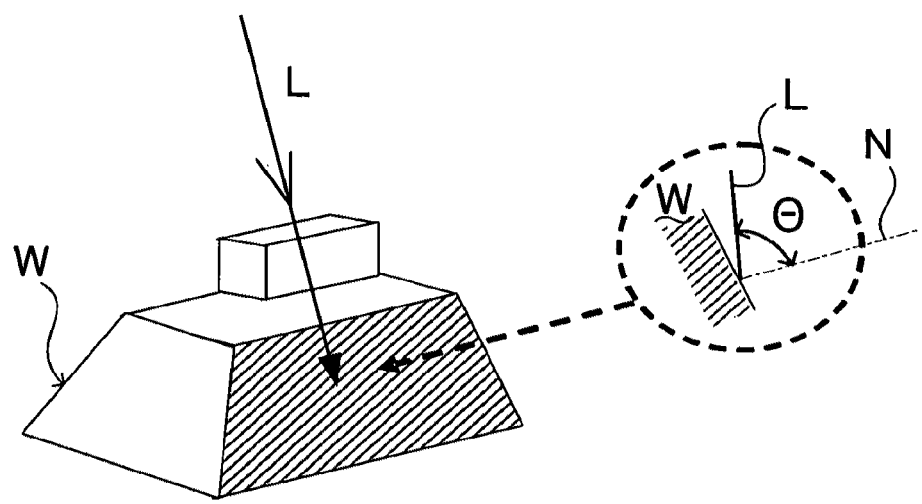
FIG. 85 is an illustration explaining an occurrence of a defective area of a work due to an incident angle of a laser beam being too small.

FIG. 83 shows a Counter Setting dialog box as batch print setting means which appears when enabling a Counter Setting tab 292 in the Pallet Counter Setting dialog box 280. The batch print setting means is used to change a serial number included in a print pattern such as a character string by one increment or decrement to be printed on a work in conformity with a printing order. For example, a serial number of a lead-off work is specified as an initial value. The serial number is changed by one imminent every printing. It is not always necessary to bring a count into concert with a printed serial number included a print pattern. In this way, the variable number included in a print pattern is changed by a predetermined common difference in ascending order or descending order. The variable number may be chosen from a group of a decimal number, a binary number, a hexadecimal number and a binary-coded hexadecimal number.

A processing pattern may be chosen from a set of templates each of which defines a pattern and processing sequence. The template defines a process printing position at any point of the processing pattern, for example, at upper left or lower right. It is practicable to set a processing pattern in order to fulfill demands in the following process such as picking up works and packaging them in stacks. The works are manipulated and put on a tray in a predetermined order by a robot arm or the like. However, if the works are manipulated in a different order from an arranging order for processing, an adverse consequence occurs. In particular, in the case where the works have sequential numbers such as serial numbers and/or another administrative number, works packaged together have not always sequential numbers. Such a case makes it hard to trace the works in future. For this reason, it is essential to take into account that processed works are arranged on a tray in a processed order. If the robot is unchangeably fixed in operation sequence or if it is difficult for the user to change an operation sequence of the robot arm, it is necessary to print works in the same order as the operation sequence of the robot arm. Specifically, when printing works in the same order as an order in which the arm robot stacks the works one on top of the other, the works in a package are arranged in an order of serial numbers. For this purpose, it is effective to specify a printing order according to the user's intention.

It is also practicable to specify a printing order and an order in which serial numbers are assigned to works individually. That is, while specifying serial numbers for works in an order in which the works are handled in the following process, the user specifies a printing order in an order that makes a printing job efficiently. In such a case, since the serial numbers of the works are not always ordered in a printing order, the print pattern setting means provides a processing pattern that has information about an arranging order of serial numbers and a printing order individually. Further, the control unit 1A is configured so that, while works are printed in the printing order, nevertheless, the serial numbers included in the individual print patterns are arranged not in the printing order but in an order suitable for the following process.

It is to be understood that although the present invention has been described with regard to embodiments thereof various other embodiments and variants may occur to those skilled in the art, which are within the scope and spirit of the invention, and such other embodiments and variants are intended to be covered by the following claims.

What is claimed is:

1. A laser processing system for processing a work surface within a working area with a predetermined processing pattern by the use of a laser beam, said laser processing system comprising:
    laser generating means for generating a laser beam for processing;
    scanning means for two-dimensionally scanning a work surface with said laser beam within a scanning area that is scanned by said laser beam;
    control means for controlling said laser generating means and said scanning means so as to process said work surface by said laser beam according to laser processing conditions;
    work setting means for setting as said laser processing conditions a position of said work surface within said scanning area and a three-dimensional profile of said work surface;
    processing pattern setting means for setting as said processing conditions a processing pattern and a position of said processing pattern on said work surface;
    data generating means for generating laser processing data for said work surface according to said laser processing conditions;
    display means for displaying representation of said laser processing data in three dimensions;
    a defective area detection device to detect a defective work surface area of said work surface that is an area of said work surface hidden from laser beam irradiation and a defective work surface area of said work surface that is a feeble area of said work surface exposed to laser beam irradiation at an angle within a predetermined range of angle depending upon said laser processing conditions set by said work setting means; and
    a warning device to provide a warning when said defective area detection device detects said defective work surface area; and
    wherein said work setting means comprises profile selecting means for selecting said three-dimensional profile of said work surface from a plurality of predetermined three-dimensional profiles and details setting means for setting details of said processing pattern on said selected three-dimensional profile of said work surface.

2. The laser processing system as defined in claim 1, wherein said warning device displays a frame in place of said processing pattern on said display means.

3. The laser processing system as defined in claim 2, wherein said warning device displays said processing pattern in said frame on said display means.

4. The laser processing system as defined in claim 1, wherein said scanning means comprises:
    a beam expander having a lens system which includes at least two lenses coaxially at an incident side and an exit side, respectively, for varying a focal length of said laser beam by varying a relative distance between said two lenses;
    a first scan mirror for deflecting said laser beam coming from said beam expander in a first direction to scan said work surface within said scanning area in said first direction; and
    a second scan mirror for deflecting said laser beam reflected by said first scan mirror in a second direction perpendicular to said first direction to scan said work surface within said scanning area in said second direction;

wherein said first scan mirror, said second scan mirror and said beam extender scan said work surface within said scanning area in said first direction in X-, Y- and Z-axis directions, respectively.

5. A laser processing system for processing a work surface within a working area with a predetermined processing pattern by the use of a laser beam, said laser processing system comprising:

laser generating means for generating a laser beam for processing;

scanning means for two-dimensionally scanning a work surface with said laser beam within a scanning area that is scanned by said laser beam;

control means for controlling said laser generating means and said scanning means so as to process said work surface by said laser beam according to laser processing conditions;

work setting means for setting as said laser processing conditions a position of said work surface within said two-dimensional scanning area and a three-dimensional profile of said work surface;

processing pattern setting means for setting as said processing conditions a processing pattern and a position of said processing pattern on said work surface;

data generating means for generating laser processing data for said work surface according to said laser processing conditions;

display means for displaying representation of said laser processing data in three dimensions;

a defective area detection device to detect a defective work surface area of said work surface that is an area of said work surface hidden from laser beam irradiation and a defective work surface area of said work surface that is a feeble area of said work surface exposed to laser beam irradiation at an angle within a predetermined range of angle depending upon at least said laser processing conditions set by said work setting means; and a warning device to provide a warning when said defective area detection device detects a presence of said defective work surface area; and wherein said work setting means comprises profile selecting means for selecting said three-dimensional profile of said work surface from a plurality of predetermined three-dimensional profiles and details setting means for setting details of said processing pattern on said selected three-dimensional profile of said work surface.

6. The laser processing system as defined in claim 5, wherein said warning device displays a frame in place of said processing pattern on said display means.

7. The laser processing system as defined in claim 6, wherein said warning device displays said processing pattern in said frame on said display means.

8. The laser processing system as defined in claim 5, wherein said scanning means comprises:

a beam expander having a lens system which includes at least two lenses coaxially at an incident side and an exit side, respectively, for varying a focal length of said laser beam by varying a relative distance between said two lenses;

a first scan mirror for deflecting said laser beam coming from said beam expander in a first direction to scan said work surface within said scanning area in said first direction; and a second scan mirror for deflecting said laser beam reflected by said first scan mirror in a second direction perpendicular to said first direction to scan said work surface within said scanning area in said second direction;

wherein said first scan mirror, said second scan mirror and said beam extender scan said work surface within said scanning area in said first direction in X-, Y- and Z-axis directions, respectively.

9. A laser processing system for processing a work surface within a working area with a predetermined processing pattern by the use of a laser beam, said laser processing system comprising:

laser generating means for generating a laser beam for processing;

scanning means for scanning a work surface with said laser beam within a scanning area;

control means for controlling said laser generating means and said scanning means so as to process said work surface according to laser processing conditions;

work setting means for setting as said laser processing conditions a position of said work surface within said two-dimensional scanning area and a three-dimensional profile of said work surface;

processing pattern setting means for setting as said processing conditions a processing pattern and a position of said processing pattern on said work surface;

data generating means for generating laser processing data for said work surface according to said laser processing conditions;

display means for displaying representation of said laser processing data in three dimensions;

a defective surface area detection device to detect a defective work surface area of said work surface that is an area of said work surface hidden from laser beam irradiation and a defective work surface area of said work surface that is a feeble area of said work surface exposed to laser beam irradiation at an angle within a predetermined range of angle depending upon at least said laser processing conditions set by said work setting means;

a warning device to hide said processing pattern from said display means when said processing pattern overlaps at least partly said defective work surface area; and a highlighting device to highlight said defective work surface area on said display means distinctly from a remaining part of said work surface; and wherein said work setting means comprises profile selecting means for selecting said three-dimensional profile of said work surface from a plurality of predetermined three-dimensional profiles and details setting means for setting details of said processing pattern on said selected three-dimensional profile of said work surface.

10. The laser processing system as defined in claim 9, wherein said warning device displays a frame in place of said processing pattern on said display means.

11. The laser processing system as defined in claim 10, wherein said warning device displays said processing pattern in said frame on said display means.

12. The laser processing system as defined in claim 9, wherein said scanning means comprises:

a beam expander having a lens system which includes at least two lenses coaxially at an incident side and an exit side, respectively, for varying a focal length of said laser beam by varying a relative distance between said two lenses;

a first scan mirror for deflecting said laser beam coming from said beam expander in a first direction to scan said work surface within said scanning area in said first direction; and a second scan mirror for deflecting said laser beam reflected by said first scan mirror in a second direction perpendicular to said first direction to scan said work surface within said scanning area in said second direction;

wherein said first scan mirror, said second scan mirror and said beam extender scan said work surface within said scanning area in said first direction in X-, Y- and Z-axis directions, respectively.

13. Laser processing data setting system for setting laser processing data according to a processing pattern based on which a laser processing system processes a work surface within a working area with said processing pattern by the use of a laser beam, said laser processing data setting system comprising:

work setting means for setting as said laser processing conditions a position of said work surface within said two-dimensional scanning area and a three-dimensional profile of said work surface;

processing pattern setting means for setting as said processing conditions a processing pattern and a position of said processing pattern on said work surface;

data generating means for generating laser processing data for said work surface according to said laser processing conditions;

display means for displaying representation of said laser processing data in three dimensions;

a defective surface area detection device to detect a defective work surface area of said work surface that is an area of said work surface hidden from laser beam irradiation and a defective work surface area of said work surface that is a feeble area of said work surface exposed to laser beam irradiation at an angle within a predetermined range of angle depending upon at least said laser processing conditions set by said work setting means; and a warning device to hide said processing pattern from said display means when said processing pattern overlaps at least partly said defective work surface area; and wherein said work setting means comprises profile selecting means for selecting said three-dimensional profile of said work surface from a plurality of predetermined three-dimensional profiles and details setting means for setting details of said processing pattern on said selected three-dimensional profile of said work surface.

14. A method of setting laser processing data according to a processing pattern based on which a laser processing system processes a work surface within a working area with said processing pattern by the use of a laser beam, said laser processing data setting method comprising the steps of: setting as laser processing conditions a position of said work surface within a two-dimensional scanning area scanned with said laser beam, a three-dimensional profile of said work surface, a processing pattern, and a position of said processing pattern on said work surface; displaying said processing pattern on display means; detecting a defective work surface area of said work surface that is an area of said work surface hidden from laser beam irradiation and a defective work surface that is a feeble area of said work surface exposed to laser beam irradiation at an angle within a predetermined range of angle depending upon at least said laser processing conditions set by said work setting means; and hiding said processing pattern from said display means when said processing pattern overlaps at least partly said defective work surface area; and wherein said method includes selecting said three-dimensional profile from a plurality of predetermined three-dimensional profiles and selecting details of said processing pattern on selected three-dimensional profile of said work surface resulting in said processing pattern for said three-dimensional profile.

15. The laser processing system as defined in claim 1, wherein said warning comprises a visual warning sign displayed on said display means.

16. The laser processing system as defined in claim 1, wherein said warning comprises an audible warning sign.

17. The laser processing system as defined in claim 1, wherein said warning means provides said warning when said processing pattern overlaps at least partly said defective work surface area.

18. The laser processing system as defined in claim 16, wherein said warning also comprises a visual warning sign displayed on said display means.

19. The laser processing system as defined in claim 17, wherein said visual warning sign comprises said defective work surface area displayed distinctly from a remaining area of said work surface on said display means.

20. The laser processing system as defined in claim 16, wherein said warning further comprises an audible warning sign.

21. The laser processing system as defined in claim 1, wherein said data generating means generates said laser processing data depending upon said selected three-dimensional profile of said work surface and said details of said processing pattern.

22. The laser processing system as defined in claim 1, wherein said defective area detection device detects as said defective work surface area of said work surface an area of said work surface that is exposed to laser beam irradiation at an angle within said predetermined range of angle.

23. The laser processing system as defined in claim 1, wherein said defective area detection device comprises angle varying means for varying said predetermined range of angle.

24. The laser processing system as defined in claim 1, wherein said display means further displays said three-dimensional profile of said work surface set by said work setting means.

25. The laser processing system as defined in claim 1, wherein said display means further displays said feeble area on said work surface based on a result of a detection by said defective area detection device.

26. The laser processing system as defined in claim 9, wherein said data generating means generates said laser processing data depending upon said selected three-dimensional profile of said work surface and said details of said processing pattern.

27. The laser processing system as defined in claim 9, wherein said defective area detection device detects as said defective work surface area of said work surface an area of said work surface that is exposed to laser beam irradiation at an angle within said predetermined range of angle.

28. The laser processing system as defined in claim 27, wherein said defective area detection device comprises angle varying means for varying said predetermined range of angle.

29. The laser processing system as defined in claim 9, wherein said display means further displays said three-dimensional profile of said work surface set by said work setting means.

30. The laser processing system as defined in claim 29, wherein said display means further displays said feeble area on said work surface based on a result of a detection by said defective area detection device.

31. The laser processing data setting system as defined in claim 13, wherein said data generating means generates said laser processing data depending upon said selected three-dimensional profile of said work surface and said details of said processing pattern.

32. The laser processing data setting system as defined in claim 13, wherein said defective area detection device detects as said defective work surface area of said work surface an area of said work surface that is exposed to laser beam irradiation at an angle within said predetermined range of angle.

33. The laser processing data setting system as defined in claim 32, wherein said defective area detection device comprises angle varying means for varying said predetermined range of angle.

34. The laser processing data setting system as defined in claim 13, wherein said display means further displays said three-dimensional profile of said work surface set by said work setting means.

35. The laser processing data setting system as defined in claim 34, wherein said display means further displays said feeble area on said work surface based on a result of a detection by said defective area detection device.

36. The method of setting laser processing data as defined in claim 14, wherein said defective work surface area of said work surface is detected as an area of said work surface that is exposed to laser beam irradiation at an angle within said predetermined range of angle.

37. The laser processing system as defined in claim 36, wherein said predetermined range of angle is variable.

38. The method of setting laser processing data as defined in claim 14, and further comprising the step of displaying said three-dimensional profile of said work surface set by said work setting means.

39. The method of setting laser processing data as defined in claim 38, and further comprising the step of displaying said defective work surface area based on a result of a detection.

\* \* \* \* \*